United States Patent
Hasegawa et al.

(10) Patent No.: US 9,788,375 B2
(45) Date of Patent: Oct. 10, 2017

(54) LIGHTING DEVICE AND ILLUMINATION APPARATUS USING SAME

(71) Applicant: Panasonic Intellectual Property Management Co., Ltd., Osaka (JP)

(72) Inventors: Junichi Hasegawa, Osaka (JP); Akinori Hiramatu, Nara (JP); Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 225 days.

(21) Appl. No.: 14/554,784

(22) Filed: Nov. 26, 2014

(65) Prior Publication Data

US 2015/0145436 A1 May 28, 2015

(30) Foreign Application Priority Data

Nov. 28, 2013 (JP) .................. 2013-246032
Nov. 28, 2013 (JP) .................. 2013-246033
Nov. 28, 2013 (JP) .................. 2013-246034

(51) Int. Cl.
G05F 1/00 (2006.01)
H05B 37/02 (2006.01)
(Continued)

(52) U.S. Cl.
CPC ..... H05B 33/0827 (2013.01); H05B 33/0815 (2013.01); F21S 8/026 (2013.01);
(Continued)

(58) Field of Classification Search
CPC .. H05B 33/0815; H05B 37/02; Y02B 20/347; Y02B 20/346; F21Y 2101/00; F21Y 2115/10
(Continued)

(56) References Cited

U.S. PATENT DOCUMENTS 6,107,754 A * 8/2000 Kim .................. H02M 7/53803
315/209 R
2007/0229450 A1 10/2007 Suzuki
(Continued)

FOREIGN PATENT DOCUMENTS

JP 2006-210435 A 8/2006
JP 2006-318773 A 11/2006
(Continued)

OTHER PUBLICATIONS

Japanese Office Action dated May 23, 2017 issued in corresponding Japanese Patent Application No. 2013-246032 and English summary thereof.

(Continued)

Primary Examiner — Alexander H Taningco
Assistant Examiner — Christian L Garcia
(74) Attorney, Agent, or Firm — Renner Otto Boisselle & Sklar, LLP

(57) ABSTRACT

A lighting device includes: a DC power source circuit; an output control circuit including a chopping switch to adjust an output current by chopping of the chopping switch; light source switches respectively connected to the light sources; and a control unit for controlling a time period for which a current flows in the light sources. The control unit controls the output control circuit such that an operation period for which the chopping is conducted and a stop period for which the chopping is stopped are repeated alternately and performs switchover of the light source switches to be sequentially and selectively turned on, and the switchover is conducted during the stop period with a time interval from a beginning of the stop period.

32 Claims, 34 Drawing Sheets

(51) Int. Cl.
*H05B 39/04* (2006.01)
*H05B 41/36* (2006.01)
*H05B 33/08* (2006.01)
*F21Y 101/00* (2016.01)
*F21S 8/02* (2006.01)
*F21S 8/00* (2006.01)
*F21Y 115/10* (2016.01)
*F21Y 113/13* (2016.01)

(52) U.S. Cl.
CPC ........... *F21S 8/038* (2013.01); *F21Y 2101/00* (2013.01); *F21Y 2113/13* (2016.08); *F21Y 2115/10* (2016.08); *H05B 37/02* (2013.01); *Y02B 20/346* (2013.01); *Y02B 20/347* (2013.01)

(58) Field of Classification Search
USPC ............ 315/294, 291, 312, 307, 297, 185 R; 362/231, 249.02; 345/102
See application file for complete search history.

(56) References Cited

U.S. PATENT DOCUMENTS

| | | | | |
|---|---|---|---|---|
| 2012/0292998 | A1* | 11/2012 | Nagayasu | H01H 33/38 307/43 |
| 2013/0015774 | A1* | 1/2013 | Briggs | H05B 33/0815 315/186 |
| 2013/0016310 | A1 | 1/2013 | Kanemitsu et al. | |
| 2013/0193877 | A1* | 8/2013 | Kuo | H05B 33/0818 315/307 |
| 2013/0271019 | A1* | 10/2013 | Tsai | H05B 33/0815 315/192 |
| 2015/0061527 | A1 | 3/2015 | Hamanaka | |

FOREIGN PATENT DOCUMENTS

| | | |
|---|---|---|
| JP | 2007-273691 A | 10/2007 |
| JP | 2009-9817 | 1/2009 |
| JP | 2010-232052 | 10/2010 |
| JP | 2010-282839 | 12/2010 |
| JP | 2011-108597 | 6/2011 |
| JP | 2011-258517 | 12/2011 |
| JP | 2012-204258 A | 10/2012 |
| JP | 2012-221714 | 11/2012 |
| JP | 2013-021117 A | 1/2013 |
| JP | 2013-105628 | 5/2013 |
| JP | 2015-050785 A | 3/2015 |
| WO | 2009/122488 A1 | 10/2009 |

OTHER PUBLICATIONS

Japanese Office Action dated May 23, 2017 issued in corresponding Japanese Patent Application No. 2013-246033 and English summary thereof.

Japanese Office Action dated May 23, 2017 issued in corresponding Japanese Patent Application No. 2013-246034 and English summary thereof.

* cited by examiner

FIG.5A

TABLE T1

| INTENSITY /COLOR ADJUSTMENT SIGNAL DATA Va(n) | BURST CONTROL TIME DATA TA(n) | OUTPUT CONTROL TIME DATA ta(n) | BURST CONTROL TIME DATA TB(n) | OUTPUT CONTROL TIME DATA tb(n) | BURST CONTROL TIME DATA TC(n) | OUTPUT CONTROL TIME DATA tc(n) | BURST CONTROL TIME DATA TD(n) | OUTPUT CONTROL TIME DATA td(n) |
|---|---|---|---|---|---|---|---|---|
| 0 | TA(0) | ta(0) | TB(0) | tb(0) | TC(0) | tc(0) | TD(0) | td(0) |
| 1 | TA(1) | ta(1) | TB(1) | tb(1) | TC(1) | tc(1) | TD(1) | td(1) |
| . . . | . . . | . . . | . . . | . . . | . . . | . . . | . . . | . . . |
| 255 | TA(255) | ta(255) | TB(255) | tb(255) | TC(255) | tc(255) | TD(255) | td(255) |

FIG.5B

TABLE T2

| INTENSITY /COLOR ADJUSTMENT SIGNAL DATA Va(n) | BURST CONTROL TIME DATA TA(n) | | OUTPUT CONTROL TIME DATA ta(n) | BURST CONTROL TIME DATA TB(n) | | OUTPUT CONTROL TIME DATA tb(n) | BURST CONTROL TIME DATA TC(n) | | OUTPUT CONTROL TIME DATA tc(n) | BURST CONTROL TIME DATA TD(n) | | OUTPUT CONTROL TIME DATA td(n) |
|---|---|---|---|---|---|---|---|---|---|---|---|---|
| 0 | TA(0) | | tas | TB(0) | | tbs | TC(0) | | tcs | TD(0) | | tds |
| 1 | TA(1) | | | TB(1) | | | TC(1) | | | TD(1) | | |
| ... | ... | | | ... | | | ... | | | ... | | |
| 255 | TA(255) | | | TB(255) | | | TC(255) | | | TD(255) | | |

FIG.5C

TABLE T3

| INTENSITY /COLOR ADJUSTMENT SIGNAL DATA Va(n) | BURST CONTROL TIME DATA TA(n) | OUTPUT CONTROL TIME DATA ta(n) | BURST CONTROL TIME DATA TB(n) | OUTPUT CONTROL TIME DATA tb(n) | BURST CONTROL TIME DATA TC(n) | OUTPUT CONTROL TIME DATA tc(n) | BURST CONTROL TIME DATA TD(n) | OUTPUT CONTROL TIME DATA td(n) |
|---|---|---|---|---|---|---|---|---|
| 0 | TAS | ta(0) | TBS | tb(0) | TCS | tc(0) | TDS | td(0) |
| 1 | | ta(1) | | tb(1) | | tc(1) | | td(1) |
| ... | | ... | | ... | | ... | | ... |
| 255 | | ta(255) | | tb(255) | | tc(255) | | td(255) |

FIG.5D

TABLE T4

| INTENSITY /COLOR ADJUSTMENT SIGNAL DATA Va(n) | OUTPUT CONTROL CURRENT DATA IA(n) | BURST CONTROL TIME DATA TA(n) | OUTPUT CONTROL TIME DATA ta(n) | BURST CONTROL TIME DATA TB(n) | OUTPUT CONTROL TIME DATA tb(n) | BURST CONTROL TIME DATA TC(n) | OUTPUT CONTROL TIME DATA tc(n) | BURST CONTROL TIME DATA TD(n) | OUTPUT CONTROL TIME DATA td(n) |
|---|---|---|---|---|---|---|---|---|---|
| 0 | A(0) | TA(0) | ta(0) | TB(0) | tb(0) | TC(0) | tc(0) | TD(0) | td(0) |
| 1 | A(1) | TA(1) | ta(1) | TB(1) | tb(1) | TC(1) | tc(1) | TD(1) | td(1) |
| . . . | | | | | | | | | |
| 255 | A(255) | TA(255) | ta(255) | TB(255) | tb(255) | TC(255) | tc(255) | TD(255) | td(255) |

FIG.6A

EXAMPLE OF TABLE T1

| Va (n) | RED | | GREEN | | BLUE | | WHITE | |
|---|---|---|---|---|---|---|---|---|
| | TA(n) | ta(n) | TB(n) | tb(n) | TC(n) | tc(n) | TD(n) | td(n) |
| 0 | 2.0ms | 2.5ms | 2.0ms | 2.5ms | 2.0ms | 2.5ms | 2.0ms | 2.5ms |
| 1 | 1.0ms | 1.5ms | 1.0ms | 1.5ms | 1.0ms | 1.5ms | 1.0ms | 1.5ms |
| ⋮ | ⋮ | ⋮ | ⋮ | ⋮ | ⋮ | ⋮ | ⋮ | ⋮ |
| 10 | 3.0ms | 3.5ms | 1.5ms | 2.0ms | 1.5ms | 2.0ms | 2.0ms | 2.5ms |
| 11 | 2.0ms | 2.5ms | 1.0ms | 1.5ms | 1.0ms | 1.5ms | 1.5ms | 2.0ms |
| ⋮ | ⋮ | ⋮ | ⋮ | ⋮ | ⋮ | ⋮ | ⋮ | ⋮ |
| 20 | 1.5ms | 2.0ms | 3.0ms | 3.5ms | 1.5ms | 2.0ms | 2.0ms | 2.5ms |
| 21 | 1.0ms | 1.5ms | 2.0ms | 2.5ms | 1.0ms | 1.5ms | 1.5ms | 2.0ms |
| ⋮ | ⋮ | ⋮ | ⋮ | ⋮ | ⋮ | ⋮ | ⋮ | ⋮ |
| 30 | 1.5ms | 2.0ms | 1.5ms | 2.0ms | 3.0ms | 3.5ms | 2.0ms | 2.5ms |
| 31 | 1.0ms | 1.5ms | 1.0ms | 1.5ms | 2.0ms | 2.5ms | 1.5ms | 2.0ms |
| ⋮ | ⋮ | ⋮ | ⋮ | ⋮ | ⋮ | ⋮ | ⋮ | ⋮ |
| 255 | ⋮ | ⋮ | ⋮ | ⋮ | ⋮ | ⋮ | ⋮ | ⋮ |

FIG.6B

EXAMPLE OF TABLE T2

| Va (n) | RED | | GREEN | | BLUE | | WHITE | |
|---|---|---|---|---|---|---|---|---|
| | TA(n) | ta(n) | TB(n) | tb(n) | TC(n) | tc(n) | TD(n) | td(n) |
| 0 | 3.0ms | | 3.0ms | | 3.0ms | | 3.0ms | |
| 1 | 1.5ms | | 1.5ms | | 1.5ms | | 1.5ms | |
| : | : | | : | | : | | : | |
| 10 | 3.0ms | | 1.5ms | | 1.5ms | | 3.0ms | |
| 11 | 2.0ms | | 1.5ms | | 1.5ms | | 1.5ms | |
| : | : | 3.5ms (tas) | : | 3.5ms (tbs) | : | 3.5ms (tcs) | : | 3.5ms (tds) |
| 20 | 2.0ms | | 1.5ms | | 1.5ms | | 3.0ms | |
| 21 | 1.5ms | | 2.0ms | | 1.5ms | | 1.5ms | |
| : | : | | : | | : | | : | |
| 30 | 1.5ms | | 1.5ms | | 3.0ms | | 3.0ms | |
| 31 | 1.5ms | | 1.5ms | | 2.0ms | | 1.5ms | |
| : | : | | : | | : | | : | |
| 255 | : | | : | | : | | : | |

FIG.6C

EXAMPLE OF TABLE T3

| Va (n) | Q3 | | Q4 | | Q5 | | Q6 | |
|---|---|---|---|---|---|---|---|---|
| | TA(n) | ta(n) | TB(n) | tb(n) | TC(n) | tc(n) | TD(n) | td(n) |
| 0 | | 2.5ms | | 2.5ms | | 2.5ms | | 2.9ms |
| 1 | | 2.2ms | | 1.5ms | | 1.8ms | | 2.7ms |
| ⋮ | | ⋮ | | ⋮ | | ⋮ | | ⋮ |
| 10 | | 3.3ms | | 2.0ms | | 2.7ms | | 2.5ms |
| 11 | 2.0ms (TAS) | 3.0ms | 1.5ms (TBS) | 1.5ms | 1.5ms (TCS) | 3.5ms | 2.5ms (TDS) | 3.4ms |
| ⋮ | | ⋮ | | ⋮ | | ⋮ | | ⋮ |
| 20 | | 2.3ms | | 3.5ms | | 3.0ms | | 3.5ms |
| 21 | | 3.5ms | | 2.5ms | | 3.1ms | | 3.0ms |
| ⋮ | | ⋮ | | ⋮ | | ⋮ | | ⋮ |
| 30 | | 3.0ms | | 2.0ms | | 3.5ms | | 2.8ms |
| 31 | | 2.5ms | | 1.5ms | | 2.5ms | | 3.2ms |
| ⋮ | | ⋮ | | ⋮ | | ⋮ | | ⋮ |
| 255 | | ⋮ | | ⋮ | | ⋮ | | ⋮ |

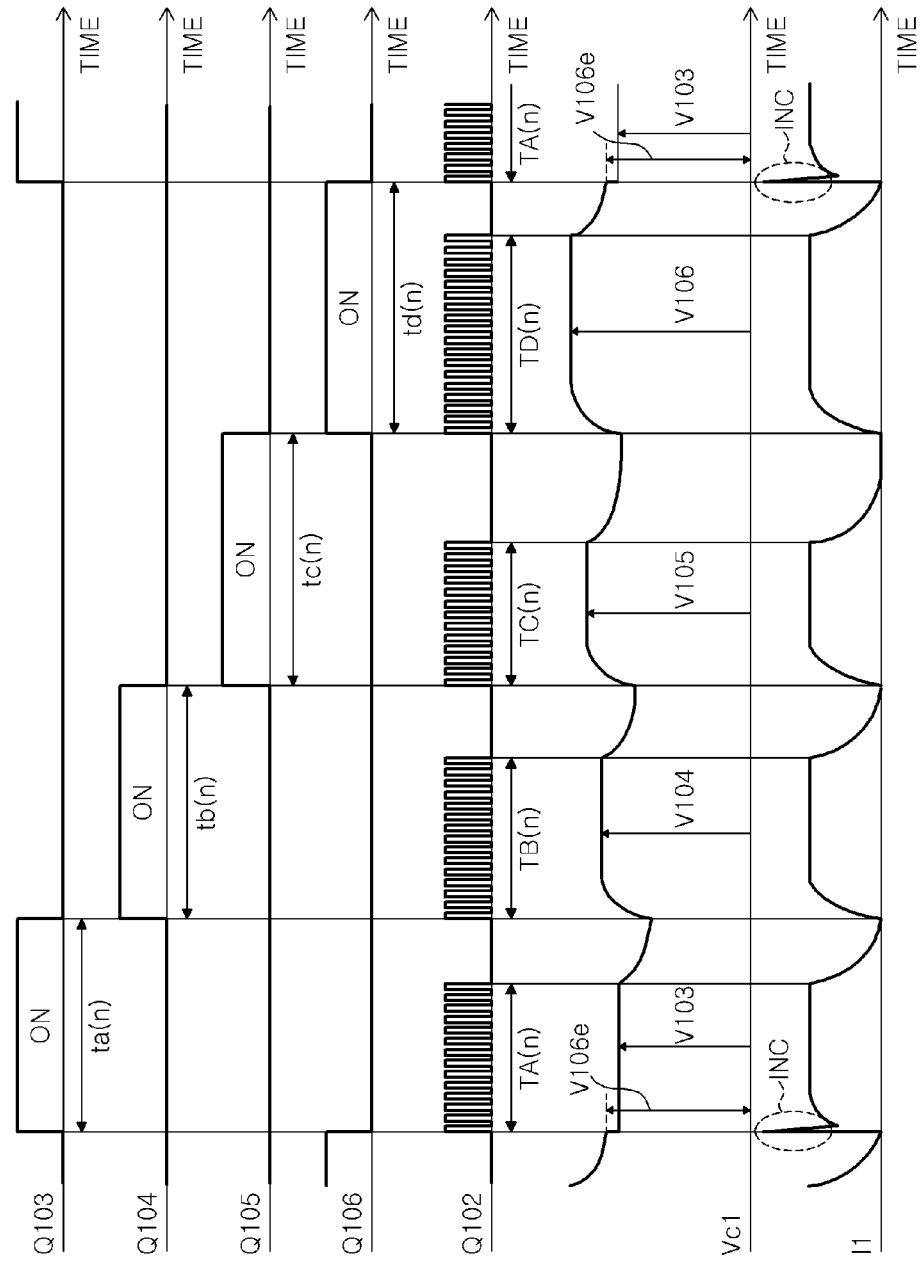

FIG.12

| Va (n) | Q3 | | | Q4 | | Q5 | | Q6 | |
|---|---|---|---|---|---|---|---|---|---|
| | TA(n) | ta(n) | ta(n) | TB(n) | tb(n) | TC(n) | tc(n) | TD(n) | td(n) |
| 0 | 3.0ms | | | 3.0ms | | 3.0ms | | 3.0ms | |
| 1 | 1.5ms | | | 1.5ms | | 1.5ms | | 1.5ms | |
| : | : | | | : | | : | | : | |
| 10 | 3.0ms | | | 1.5ms | | 1.5ms | | 3.0ms | |
| 11 | 2.0ms | | | 1.5ms | | 1.5ms | | 1.5ms | |
| : | : | 3.5ms (tas) | 0.5ms (txs) | : | 3.5ms (tbs) | : | 3.5ms (tcs) | : | 3.5ms (tds) |
| 20 | 2.0ms | | | 1.5ms | | 1.5ms | | 3.0ms | |
| 21 | 1.0ms | | | 2.0ms | | 1.5ms | | 1.5ms | |
| : | : | | | : | | : | | : | |
| 30 | 1.5ms | | | 1.5ms | | 3.0ms | | 3.0ms | |
| 31 | 1.5ms | | | 1.5ms | | 2.0ms | | 1.5ms | |
| : | : | | | : | | : | | : | |
| 255 | : | | | : | | : | | : | |

LIGHTING DEVICE AND ILLUMINATION APPARATUS USING SAME

CROSS-REFERENCE TO RELATED APPLICATION

This application claims priority to Japanese Patent Application Nos. 2013-246032, 2013-246033 and 2013-246034 filed on Nov. 28, 2013, the entire contents of which are incorporated herein by reference.

TECHNICAL FIELD

The present disclosure relates to a lighting device for lighting light sources of different colors to emit a light and to an illumination apparatus using the lighting device.

BACKGROUND ART

Recently, an illumination apparatus is used that includes a lighting device for lighting a light source unit having groups of semiconductor light emitting elements such as LEDs (Light Emitting Diodes) for emitting lights of different colors including green, blue, red or the like.

In such an illumination apparatus, the chromaticity or intensity of a combined light emitted therefrom can be adjusted by adjusting the intensity of light emitted from each LED group.

There is known a lighting device used in the illumination apparatus, which includes a DC power source circuit and constant current circuits respectively connected in series to LED groups, and in which switching elements included in the respective constant current circuits are controlled by the PWM (Pulse Width Modulation) control to thereby adjust the amounts of lights emitted from the LED groups.

Further, Japanese Unexamined Patent Application Publication No. 2011-258517 (JP2011-258517A) describes a technique in which switching elements are connected to two LED groups of different color temperatures to adjust a duty ratio while alternately turning on and off the LED groups regularly in a time-divisional manner. With this, the amounts of lights emitted from the LED groups are controlled to adjust the color temperature of a light, i.e., a combined light emitted from the two LED groups. According to the technique, it is not necessary to provide a constant current circuit for each LED group, and thus a size of the circuit of lighting device can be smaller and a cost thereof can be reduced.

However, the above-mentioned time-divisional manner, in which the LEDs are lit time-divisionally while adjusting the duty ratio, has problems in that, when a LED group to which a power is supplied is changed sequentially, the switching element may be under stress or an excessive inrush current may flow in a LED group which is turned on by the changing.

That is, since LEDs of different colors have different structures or materials, they have different voltage drops for the same current flow. Therefore, when the LED group to which the power is supplied is changed sequentially, the excessive inrush current may flow in the LED group turned on.

For the LED group in which the excessive inrush current flows, damage to the LED group or its switching element may occur, and the lifespan of the illumination apparatus may be shortened.

SUMMARY OF THE INVENTION

In view of the above, the present disclosure provides an illumination apparatus and a lighting device for lighting a plurality of light sources to emit lights of different colors in a time-divisional manner so that stress to semiconductor light emitting elements and/or switching elements can be suppressed and an excessive current can be prevented from flowing the light sources.

In accordance with an aspect of the present invention, there is provided a lighting device for lighting a light source unit including light sources which emit lights of different colors, each of the light sources being a semiconductor light emitting element. The lighting device includes: a DC power source circuit; an output control circuit including a chopping switch disposed on a power line extending from the DC power source circuit to the light source unit and configured to adjust an output current by a chopping operation of repeatedly turning on and off the chopping switch; a plurality of light source switches respectively connected in series to the light sources to form series load circuits; a control unit configured to control a time period for which a current flows in each of the light sources. Each of the series load circuits is connected in parallel to output terminals of the output control circuit.

The control unit is configured to control the output control circuit such that an operation period for which the chopping operation is conducted and a stop period for which the chopping operation is stopped are repeated alternately and to perform switchover of the light source switches to be selectively and sequentially turned on, and the switchover is conducted during the stop period with a time interval from a beginning of the stop period.

The control unit preferably adjusts the operation period and time lengths for which the respective light sources emit lights. The output control circuit may further include a capacitor that smoothes a ripple current generated by the chopping operation. A time period from the beginning of the stop period until the switchover may be set to be greater than a time constant when electric charges in the capacitor are released toward the series load circuits during the stop period.

The lighting device may include a discharge circuit which is disposed between the output terminals of the output control circuit in parallel to the series load circuits. The control unit may perform the switchover before completion of the stop period. The control unit preferably sets a target current value based on an instruction inputted from an outside, and the output control circuit performs the chopping operation so that the output current is adjusted to the set target current value.

In accordance with another aspect of the present invention, there is provided a lighting device for lighting a light source unit including at least three light sources having different voltage drops for a same current flow. The lighting device includes: an output control circuit configured to adjust an output DC power; at least three light source switches respectively connected in series to the at least three light sources to form series load circuits; and a control unit configured to control a current flowing in each of the at least three light sources. Each of the series load circuits is connected between output terminals of the output control circuit in parallel. The control unit switches over the at least three source switches in a repeated predetermined order such that ON-periods of the at least three light source switches do not overlap with each other.

In the repeated predetermined order, among the at least three light sources, any light source switch other than a light source switch connected to a light source having the smallest voltage drop is turned on next to a light source switch connected to a light source having the greatest voltage drop.

In the repeated predetermined order, among the at least three light sources, the light source switch connected to the light source having the greatest voltage drop may be turned on next to the light source switch connected to the light source having the smallest voltage drop.

The control unit may adjust a length of the ON-period of each of the at least three light source switches.

The lighting device may further include a DC power source circuit. The output control circuit includes a chopping switch connected between output terminals of the DC power source circuit. The control unit may adjust an output current from the output control circuit by a chopping operation of turning on and off the chopping switch repeatedly.

The control unit may adjust an operation period of the chopping operation in the ON-period of each of the at least three light source switches.

In the repeated predetermined order, before switchover of the at least three light source switches in which a voltage drop of a light source switch connected to a light source turned on after the switchover is smaller than a voltage drop of a light source switch connected to a light source turned on before the switchover, the control unit may turn off the chopping switch to stop the chopping operation during a stop period and resumes the chopping operation simultaneously with the switchover.

In the repeated predetermined order, before switchover of the at least three light source switches in which the voltage drop of the light source switch connected to the light source turned on after the switchover is larger than the voltage drop of the light source switch connected to the light source turned on before the switchover, the control unit may stop the chopping operation during a period shorter than the stop period and resumes the chopping operation simultaneously with the switchover.

In the repeated predetermined order, before switchover of the at least three light source switches in which the voltage drop of the light source switch connected to the light source turned on after the switchover is larger than the voltage drop of the light source switch connected to the light source turned on before the switchover, the control unit may not stop the chopping operation.

The lighting device may further include an impedance element which is connected between the output terminals of the output control circuit in parallel to the series load circuits.

The at least three light sources may emit lights of different colors.

In accordance with still another aspect of the present invention, there is provided an illumination apparatus including: the light source unit; and the lighting device described above.

In accordance with still another aspect of the present, there is provided a lighting device for lighting a light source unit including at least three light sources having different voltage drops for a same current flow. The device includes: an output control circuit configured to adjust an output DC power; at least three light source switches respectively connected in series to the at least three light sources to form series load circuits; and a control unit configured to control a current flowing in each of the at least three light sources. Each of the series load circuits is connected between output terminals of the output control circuit in parallel.

The control unit configured to perform switchover of the at least three light source switches in a repeated predetermined order such that ON-periods of the at least three light source switches do not overlap with each other.

In the repeated predetermined order, when switching over the at least three light source switches such that a light source switch connected to a light source having a relatively great voltage drop is turned off and a light source switch connected to a light source having a relatively small voltage drop is turned on, the control unit performs an inrush current suppression control to a series load circuit including the light source having the relatively small voltage drop in a case where a difference in the relatively great voltage drop and the relatively small voltage drop is of a greatest value.

In the repeated predetermined order, when switching over the at least three light sources such that the light source switch connected to the light source having the relatively great voltage drop is turned off and the light source switch connected to the light source having the relatively small voltage drop is turned on, the control unit preferably performs the inrush current suppression control to suppress an inrush current flowing in the series load circuit including the light source having the relatively small voltage drop.

The lighting device further includes an inrush current suppression circuit which is connected between the output terminals of the output control circuit in parallel to the series load circuits. The inrush current suppression circuit may include: an impedance element; and a switching element connected in series to the impedance element. The control unit turns on the switching element in the inrush current suppression control.

In the inrush current suppression control, the control unit intermittently turns on and off the light source switch included in the series load circuit subjected to the inrush current suppression control during an inrush current suppression period shorter than the ON-period of the light source switch. The lighting device may further include a current detection unit configured to detect a current flowing in each of the series load circuits.

In the inrush current suppression control, the control unit may turn on the light source switch included in the series load circuit subjected to the inrush current suppression control until a current value detected by the current detection unit reaches an allowable current value. When the current value detected by the current detection unit reaches the allowable current value, the control unit may intermittently turn on and off the light source switch during an inrush current suppression period which is shorter than a period obtained by subtracting a period for which the current value reaches the allowable current value after turning on the light source switch from the ON-period of the light source switch.

In the repeated predetermined order, the at least three light source switches are sequentially turned on in ascending order from a light source switch connected to a light source having the smallest voltage drop to a light source switch connected to the light source having the greatest voltage drop.

In the control unit, upon a lapse of the ON-period of the light source switch connected to the light source having the greatest voltage drop, may return to turn on again the light source switch connected to the light source having the smallest voltage drop and performs the inrush current suppression control.

The control unit may adjust a length of the ON-period of each of the at least three light source switches.

The lighting device may further include: a DC power source circuit. The output control circuit may include a chopping switch connected between output terminals of the DC power source circuit. The control unit preferably adjusts an output current from the output control circuit by a chopping operation of turning on and off the chopping switch repeatedly.

The control unit may adjust an operation period of the chopping operation in the ON-period of each of the at least three light source switches. In the repeated predetermined order, before switchover of the at least three light source switches in which the light source switch connected to the light source having the relatively great voltage drop is turned off and the light source switch connected to the light source having the relatively small voltage drop is turned on, the control unit may turn off the chopping switch to stop the chopping operation during a stop period and resumes the chopping operation simultaneously with the switchover.

In the repeated predetermined order, before switchover of the at least three light source switches in which the light source switch connected to the light source having the relatively small voltage drop is turned off and the light source switch connected to the light source having the relatively great voltage drop is turned on, the control unit may stop the chopping operation during a period shorter than the stop period and resumes the chopping operation of the chopping switch simultaneously with the switchover.

In the repeated predetermined order, before switchover of the at least three light source switches in which the light source switch connected to the light source having the relatively small voltage drop is turned off and the light source switch connected to the light source having the relatively great voltage drop is turned on, the control unit may not stop the chopping operation.

The at least three light sources may emit lights of different colors.

In accordance with still another aspect of the present invention, there is provided an illumination apparatus including: the light source unit; and the lighting device described in the above.

As set forth above, in the lighting device and the illumination apparatus in accordance with the above aspects, the operation period in which chopping operation is performed and the stop period in which the chopping operations is stopped are alternately repeated, and while the chopping switch is turned off during the stop period, one of the light source switches is turned on in turn.

Accordingly, a power output from the DC power source circuit via the output control circuit is supplied to the light source sequentially, so that the light sources are lit up in a time-divisional manner so as not to overlap with one another.

Further, the switchover of the light source switches is conducted during the stop period with a time interval from the beginning of the stop period, and accordingly the switchover of the light source switches is conducted when a current flowing in a series load circuit is decreased.

Accordingly, stress exerted to a semiconductor light emitting element or a light source switch included in the series load circuit can be reduced.

Additionally, in accordance with the above aspects of the present invention, for example, among the at least three light sources, switching from the light source switch connected to the light source of the relatively great voltage drop to the light source switch connected to the light source of the relatively small voltage drop can be avoided. Further, the switching causing the greatest difference in voltage drops can be avoided. Accordingly, the greatest inrush current possibly occurring in series load circuits can be avoided and excessive inrush current can be suppressed. As a result, damage and stress to the light sources and the light source switches can be relieved, and the lifespan of the lighting device can be prolonged.

In the repeated predetermined order of switching the light source switches, among switching from the light source switch connected to the light source of the relatively great voltage drop to the light source switch connected to the light source of the relatively small voltage drop, the greatest inrush current are likely to occur at the time of switching when the difference in voltage drops becomes greatest. In accordance with the aspects of the present invention, since inrush current suppression control is conducted at the switching where the greatest inrush currents are likely to occur, damage and stress to the light sources and the light source switches can be relieved, and the lifespan of the lighting device can be prolonged.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 4A shows a test example in which the burst control is conducted while FIG. 4B shows a comparative example in which the burst control is not conducted.

FIGS. 5A to 5D are diagrams of tables T1 to T4 included in the control unit 20 in accordance with a first embodiment, first to third modifications, respectively.

FIG. 6A is a diagram illustrating a specific example of the table T1 (the first embodiment), FIG. 6B is a diagram illustrating a specific example of the table T2 (the first modification), and FIG. 6C is a diagram illustrating a specific example of the table T3 (the second modification).

FIG. 8 is a timing chart for illustrating an inrush current.

FIG. 12 is a diagram for illustrating an example of a table storing various types of control parameter values for operations of the lighting device and the illumination apparatus in accordance with the fourth modification.

DETAILED DESCRIPTION (First Embodiment)

An illumination apparatus 100 in accordance with a first embodiment will be described with reference to FIGS. 1 to 4, and FIGS. 5A and 6A.

(Overall Configuration of Illumination Apparatus 100)

Figure 1:
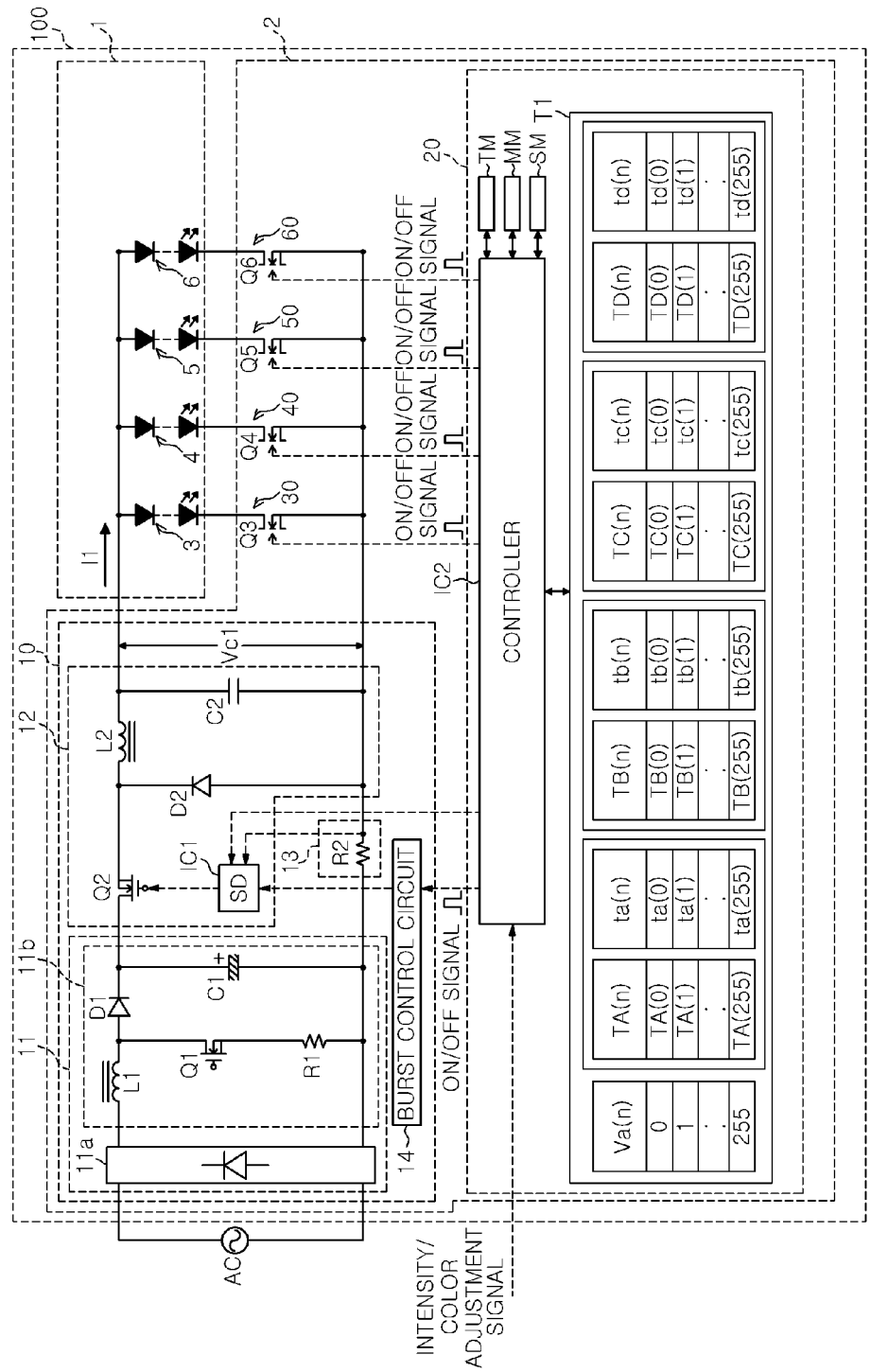
FIG. 1 is a circuit block diagram of an illumination apparatus 100 in accordance with a first embodiment.

As illustrated in FIG. 1, the illumination apparatus 100 includes a light source unit 1 including a plurality of light sources including LED (Light Emitting Diode) groups 3 to 6 which emit lights of different colors, and a lighting device 2 to operate the LED groups 3 to 6 of the light source unit 1 by flowing a current through the LED groups 3 to 6. The colors of lights emitted from the LED groups 3 to 6 are, e.g., red (R), green (G), blue (B), white (W), respectively.

In the light source unit 1 shown in FIG. 1, each of the LED groups 3 to 6 includes LEDs connected in series which emit the same color and have the same characteristics. However, the LED groups 3 to 6 may include a single red LED, green LED, blue LED, and white LED, respectively.

The lighting device 2 periodically repeats operations of lighting the LED groups 3 to 6 in turn at a significantly high rate that human eyes are not able to perceive turning on and off of the LEDs. With this configuration, a mixed light from the LED groups 3 to 6 is emitted from the light source unit 1. The chromaticity of the mixed light can be adjusted by adjusting the amounts of lights from the LED groups 3 to 6 individually when the LED groups 3 to 6 are lit.

The lighting device 2 includes light source switches Q3 to Q6 respectively connected in series to the LED groups 3 to 6 of the light source unit 1, a power unit 10 that supplies a DC power to the light source unit 1, and a control unit 20 that controls a time period for which a current flows in each of the LED groups 3 to 6. When the LED groups 3 to 6 are lit, the color or intensity of the combined light can be adjusted by adjusting light emitting periods of the LED groups 3 to 6.

Further, the LED group 3 and the light source switch Q3 connected in series configure a series load circuit 30. Likewise, the LED group 4 and the light source switch Q4 connected in series, the LED group 5 and the light source switch Q5 connected in series, and the LED group 6 and the light source switch Q6 connected in series configure a series load circuit 40, a series load circuit 50, and a series load circuit 60, respectively.

The power unit 10 includes a DC power source circuit 11 having a full-wave rectifier circuit 11a and a smoothing circuit 11b, and an output control circuit 12 that controls a current output from the DC power source circuit 11 to be supplied to the light source unit 1. In addition, the four series load circuits 30 to 60 are connected in parallel to the output terminals of the output control circuit 12.

The output control circuit 12 includes a switching element (chopping switch) Q2 that is turned on/off to connect/disconnect a power path from the DC power source circuit 11 to the light source unit 1, a semiconductor device (SD) IC1 that controls turning on/off of the switching element Q2 to output a constant current, and a current detecting circuit 13.

The control unit 20 receives an intensity/color adjustment signal to specify the color of the light emitted from the light source unit 1. In addition, the control unit 20 includes a controller (microcomputer) IC2, whose memory stores therein a table T1 in which light emitting periods or the like of the LED groups 3 to 6 are associated with each of the light emitting colors (in which intensity/color adjustment signals from the outside are associated with various control parameter values (data items)).

When the control unit 20 receives the intensity/color adjustment signal specifying a light intensity (brightness) and/or a light emitting color, it repeats periodically operations of controlling the semiconductor device IC1 of the output control circuit 12 and turning on one of the light source switches Q3 to Q6 in turn.

With this, in the light source unit 1, the operations of lighting the LED group 3, the LED group 4, the LED group 5, and the LED group 6 in turn are repeated regularly, so that they emit lights only within time periods specified by the intensity/color adjustment signal. As a result, a combined light having a color corresponding to the input intensity/color adjustment signal is emitted.

(Specific Configurations of the Units)

Hereinafter, specific configurations of the light source unit 1, the power unit 10, the light source switches Q3 to Q6, and the control unit 20 will be described.

(Light Source Unit 1)

The LEDs in the LED groups 3 to 6 are mounted on a substrate including a metallic base plate of which one surface is laminated with an insulation layer for a thermal conductivity. Alternatively, the LEDs may be mounted on a substrate including a ceramic base plate or a synthetic resin base plate which has a relatively fine heat radiation property and durability.

The LEDs of different colors are mounted on a substrate by a SMT (Surface-Mounting Technology) where bare chips of LEDs are packaged. However, the LED mounting manner is not limited to the SMT but may be a chip on board (COB) manner where bare chips of LEDs are directly mounted on a substrate.

The bare chips of the LEDs are, e.g., InGaN-based elements formed by laminating a light emitting layer on a transparent sapphire element substrate. The light emitting layer includes an n-type nitride semiconductor layer, an InGaN light emitting layer, and a p-type nitride semiconductor layer in this order.

A white LED is formed of a bare chip of blue LED. A phosphor coated on the bare chip of blue LED converts a wavelength of a part of blue light thereby a while light is emitted.

The bare chip includes a positive electrode in which a p-type electrode pad is formed on a p-type nitride semiconductor layer, and a negative electrode in which an n-type electrode pad is formed on an n-type nitride semiconductor layer. The positive electrode and the negative electrode are electrically connected to each other by a bonding wire.

The bonding wire is made of a fine line such as gold or the like and is connected to the electrodes via bumps. The bumps are made mainly of gold in order to enhance mounting strength and to reduce damage to a bare chip of an LED.

Typically, LEDs of different colors have different layer structures or different materials, and accordingly they have different forward voltages for the same current flow. In general, for the current flow of 10 mA, the forward voltages of a red LED, a green LED, and a blue LED and a white LED (if the white LED is made of the same diode as the blue LED) are approximately 1.8 V, 2.4 V, and 3.6 V, respectively.

Accordingly, the LED groups 3 to 6 have different forward voltages Vf for the same current flow.

(Power Unit 10)

The DC power source circuit 11 includes the full-wave rectifier circuit 11a and the smoothing circuit 11b.

The full-wave rectifier circuit 11a is a diode bridge circuit. The operation of the full-wave rectifier circuit 11a is well known in the art and thus will not be described.

The smoothing circuit 11b is a step-up chopper circuit of power factor improving. The smoothing circuit 11b includes an inductor L1, a switching element Q1, a diode D1, a capacitor C1, and a resistor R1 to detect a current flowing in the switching element Q1.

The output control circuit 12 is a step-down chopper circuit that includes an inductor L2, the switching element Q2, a capacitor C2, a diode D2, and the semiconductor device IC1.

For the step-down chopper circuit, the switching element Q2 acts as a chopping switch for chopping a DC voltage input thereto and outputs a ripple current to the inductor L2 by performing chopping operation of being turned on and off repeatedly.

The switching elements Q1 and Q2 are FETs (Field Effect Transistors). A frequency of the chopping operation (chopping frequency) of the switching element Q2 is, e.g., several tens kHz to several hundreds kHz.

The capacitor C2 smoothes a current output from the inductor L2.

(Semiconductor Device IC1 and Burst Control Circuit 14)

The semiconductor device IC1 includes a pulse oscillator circuit that repeatedly generates a pulse signal to turn on/off the switching element Q2, a protection circuit that suppresses an overcurrent from flowing in the switching element Q2 and the like. The semiconductor device IC1 generates a pulse signal transmitted to the switching elements Q2 and controls an output current I1 so as to aim at output control current data IA instructed by the control unit 20. In present embodiment, the target value of the output current, i.e., the output control current data IA is a constant value.

The burst control circuit 14 controls the operation of the semiconductor device IC1. Specifically, the burst control circuit 14 receives a start signal to start chopping and a termination signal to terminate the chopping from the controller IC2 of the control unit 20 to operate the semiconductor device IC1 to perform a chopping operation only within the time period between the start signal and the termination signal.

In addition, the chopping operation of the semiconductor device IC1 is paused before the start signal and after the termination signal and, thus, the switching element Q2 remains in an off-state.

Accordingly, for the time period between the start signal and the termination signal (chopping period), the switching element Q2 is turned on and off repeatedly so as to perform PWM control. Consequently, the output current I1 can be adjusted to the target value, i.e., the output control current data IA. Further, for a stop period between the termination signal and the start signal, the switching element Q2 remains in an off-state.

During the chopping period, the semiconductor device IC1 performs a current control aiming the output control current data IA instructed by the control unit 20 by a feedback control while monitoring the voltage signal from the current detecting circuit 13, as will be described below.

The current detecting circuit 13 includes a resistor R2 having a fixed resistance and outputs a voltage value across the resistor R2 to the semiconductor device IC1. Since the voltage value is proportional to the output current I1 output from the output control circuit 12, the semiconductor device IC1 can detect the value of output current I1 based on the voltage value received from the current detecting circuit 13.

The semiconductor device IC1 adjusts the width of oscillating pulse to adjusts the ON-period of the switching element Q2, so that the detected output current I1 becomes equal to the target value thereof, i.e., output control current data IA instructed by the control unit 20. That is, when the detected output current I1 is less than the output control current data IA, the semiconductor device IC1 increases the width of the oscillating pulse (i.e., the ON-period of the switching element Q2). On the other hand, when the detected output current I1 is more than the output control current data IA, the semiconductor device IC1 decreases the width of the oscillating pulse (i.e., the ON-period of the switching element Q2). By doing so, the output current I1 is controlled so that it is equal to the output control current data IA.

By controlling the switching element Q2 by the semiconductor device IC1 as described above, it is possible to supply a constant current (constant power) from the power unit 10 to the light source unit 1 during the chopping period.

In the foregoing description, the semiconductor device IC1 conducts the current control by varying a duty cycle of the oscillating pulses (ON-period of the switching element Q2). However, it is also possible to conduct current control by increasing the oscillating frequency, as will be described with respect to a third modification embodiment.

(Light Source Switches Q3 to Q6, and Series Load Circuits 30, 40, 50 and 60)

The light source switches Q3 to Q6 shown in FIG. 1 are MOSFETs (Metal Oxide Semiconductor Field Effect Transistors). However, the light source switches Q3 to Q6 may be bipolar transistors.

As described above, the series load circuit 30, 40, 50, and 60 are connected in parallel to the output terminals of the output control circuit 12.

The light source switches Q3 to Q6 are turned on selectively and sequentially according to instructions from the control unit 20. Accordingly, the output current from the power unit 10 is supplied to one of the series load circuits 30, 40, 50 and 60 of which light source switch Q3, Q4, Q5 or Q6 is turned on.

(Control Unit 20)

The control unit 20 includes: the controller IC2 that is a microcomputer to execute various control processes; a ROM (Read Only Memory) that stores therein the table T1 or various types of control programs; a volatile main memory MM such as a RAM (Random Access Memory) that temporarily stores therein data of various types of control parameters which is read from the table T1 to be used for control processes, a non-volatile sub memory SM such as EEPROM (Electrically Erasable Programmable Read Only Memory), a timer TM to count time and the like. In FIG. 1, the ROM is illustrated as the table T1 whereas the main memory MM and the sub memory SM are not shown. The functions of the timer TM or the sub memory SM may be parts of the functions of the controller IC2.

The intensity/color adjustment signal is input to the control unit 20, e.g., when a user operates a remote controller (not shown). The intensity/color adjustment signal specifies one of intensity/color adjustment signal data items Va(n) (n ranges, e.g., from 0 to 255) stored in the table T1, and the intensity/color adjustment signal is in the form of a DMX signal, a DALI signal, a UART signal or the like.

Upon receiving the intensity/color adjustment signal Va(n), the control unit 20 transmits a start signal to start the chopping operation or a termination signal to terminate the chopping operation to the burst control circuit 14 based on the received intensity/color adjustment signal Va(n). Additionally, the control unit 20 performs operations such as transmitting on/off signals to the gates of the light source switches Q3 to Q6.

The table T1 stored in the memory of the control unit 20 will be described. FIG. 5A shows the table T1 in FIG. 1.

In the table T1, the intensity/color adjustment signal data Va(n) is associated with the burst control time data TA(n), TB(n), TC(n) and TD(n) and with the output control time data ta(n), tb(n), tc(n) and td(n). The table T1 is stored in the ROM of the control unit 20.

The intensity/color adjustment signal data Va(n) includes combinations of colors and intensities of combined light emitted from the light source unit 1. In this instance, 256 types (from 0 to 255) of combinations are set.

The 256 types are combinations of chromaticities made by mixing white light, red light, green light and blue light at various ratios and various light intensities for each of the chromaticities. A user selects one of the combinations by a remote controller (not shown) to input it into the illumination apparatus 100. The symbol "n" of the intensity/color adjustment signal data Va(n) is a number from 0 to 255 that indicates the number of a combination selected by a user from the 256 types. For example, the tenth combination is indicated by the intensity/color adjustment signal data Va(10). In order to refer to the combinations collectively but not one specifically, the intensity/color adjustment signal data Va(n) is used.

The burst control time data TA(n), TB(n), TC(n) and TD(n) indicate time length for which a power is supplied to the LED groups 3 to 6, respectively, during one cycle. That is, the burst control time data TA(n), TB(n), TC(n) and TD(n) indicate time length for which the LED groups 3 to 6 emit lights to emit a light corresponding to each combination number from the light source unit 1. In order to refer to the combinations collectively but not one specifically, the burst control time data VA(n) is used. Further, the output control time data ta(n), tb(n), tc(n) and td(n) indicate lengths of ON-periods of the light source switches Q3 to Q6, respectively, during one cycle. Again, the symbol n indicates the number of the combination selected by a user. In order to refer to the combinations collectively but not one specifically, the output control time data ta(n) is used.

The length of the burst control time data TA(n) is set to be shorter than that of the output control time data ta(n). Likewise, the lengths of the burst control time data TB(n), TC(n) and TD(n) are set to be shorter than those of the output control time data tb(n), tc(n) and td(n), respectively. As will be described in detail below, the time differences correspond to the time lengths of stop periods during which chopping operations are stopped.

By adjusting the burst control time data TA(n), TB(n), TC(n) and TD(n), it is possible to individually adjust time durations for which light sources (i.e., LED groups) 3 to 6 emit lights to thereby adjust a color of the emitted light.

Further, by adjusting the output control time data ta(n), tb(n), tc(n) and td(n), it is possible to adjust intensity of the emitted light.

For the sake of easy understanding, it is assumed that the values of the output control time data ta(n), tb(n), tc(n) and td(n) are varied while the values of the burst control time data TA(n), TB(n), TC(n) and TD(n) are constant. In this instance, since the values of the burst control time data TA(n), TB(n), TC(n) and TD(n) are constant, on-time of each of the light sources 3 to 6 is not changed and accordingly the amount of the light emitted from each of them is not changed. Therefore, the chromaticity of the combined light is not changed.

However, by varying the values of the output control time data ta(n), tb(n), tc(n) and td(n), the time length for which each of the light sources 3 to 6 is turned off is changed in one cycle in which the light sources 3, 4, 5 and 6 are lit sequentially. As a result, the total length of off-times per cycle is changed. The intensity of a light emitted from the illumination apparatus 100 becomes lower when the total length of off-times per cycle is increased, while the intensity of light becomes higher when the total length of off-times is decreased. Accordingly, by adjusting the output control time data ta(n), tb(n), tc(n) and td(n), it is possible to adjust intensity of a light.

FIGS. 6A to 6C show a specific example of the table T1. In FIG. 6A, among 256 numbers of the intensity/color adjustment signal data V(n), only eight numbers (n=0, 1, 10, 11, 20, 21, 30 and 31), representatively, have numerical values for TA(n), ta(n), TB(n), tb(n), TC(n), tc(n), TD(n) and td(n). Numerical values for the rest of numbers are not shown.

In the specific example of the table T1 shown in FIG. 6A, for Va (0) and Va (1), each of the four LED groups 3 to 6 emits a light for the same period of time. Accordingly, when Va (0) or Va (1) is selected, a white light is emitted from the light source unit 1. When Va(1) is selected, however, the ratio of light emitting period in one cycle (duty cycle) is smaller than Va(0), and thus a light emission amount per unit time is slightly smaller.

On the other hand, for Va(10) and Va(11), the emission time of red color is set to be longer than the emission times of other colors. Accordingly, when Va (10) or Va (11) is selected, a light of mixed color, i.e., white mixed with red, is emitted from the light source unit 1.

For Va(20) and Va(21), the emission time of green color is set to be longer than the emission times of other colors. Accordingly, when Va (20) or Va (21) is selected, a light of mixed color, i.e., white mixed with green, is emitted from the light source unit.

For Va (30) and Va (31), the emission time of blue color is set to be longer than the emission times of other colors. Accordingly, when Va(30) or Va (31) is selected, a light of mixed color, i.e., white mixed with blue, is emitted from the light source unit 1.

(Control Operations by Control Unit 20)

Control operations performed by the control unit 20 based on the table T1 will be described with reference to the flowchart illustrated in FIG. 2.

Figure 3:
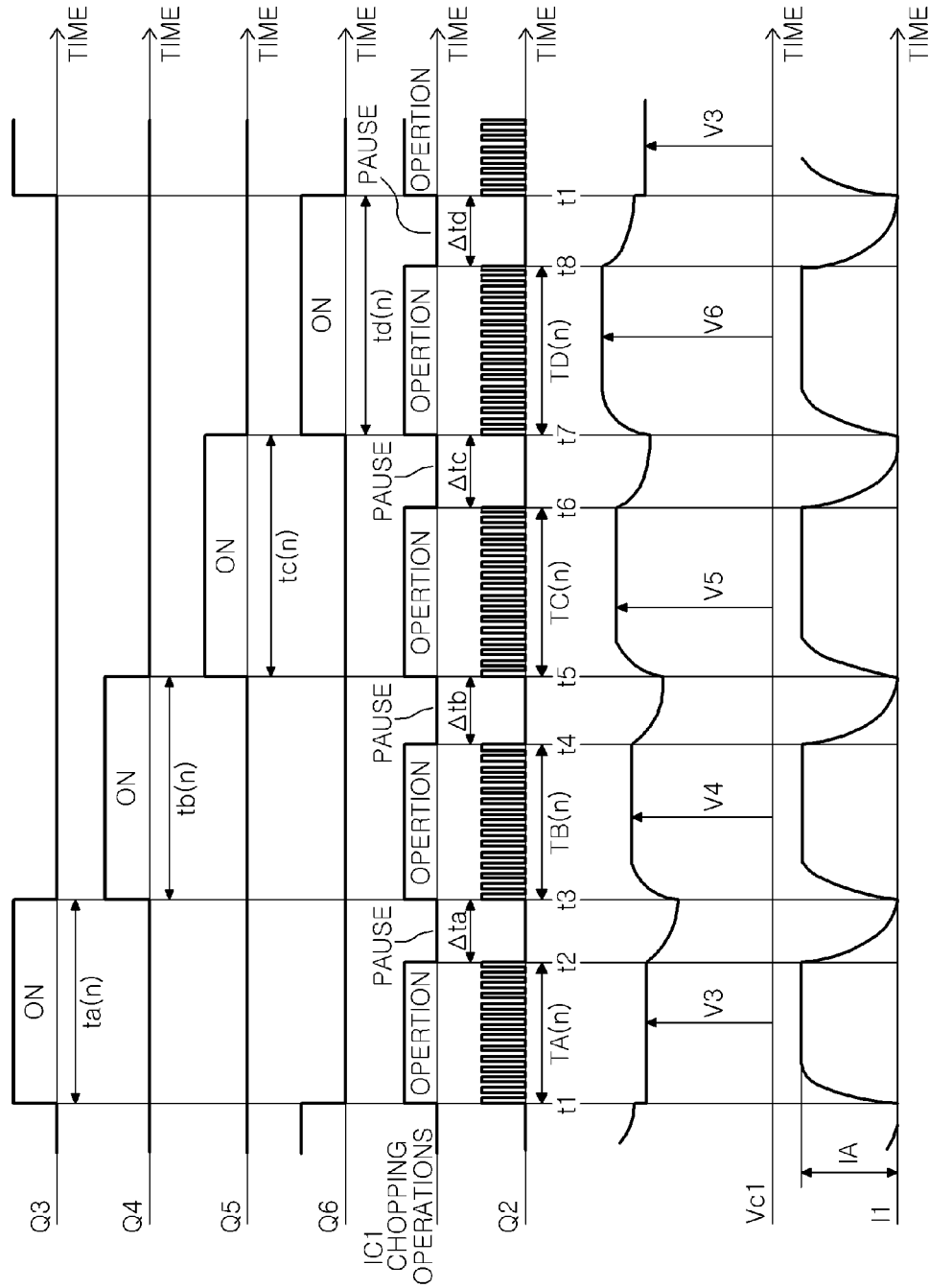
FIG. 3 is a waveform diagram showing voltages input to gate terminals of a switching element Q2 and light source switches Q3, Q4, Q5 and Q6 a current I1 output from an output control circuit 12, and a voltage Vc1 in the illumination apparatus 100.

FIG. 3 is a waveform diagram presenting results of the control operations by including gate voltages of light source switches Q3 to Q6, a gate voltage of a switching element Q2, a current I1 output from a power unit 10, and a voltage Vc1 at output terminals of the power unit 10.

Figure 2:
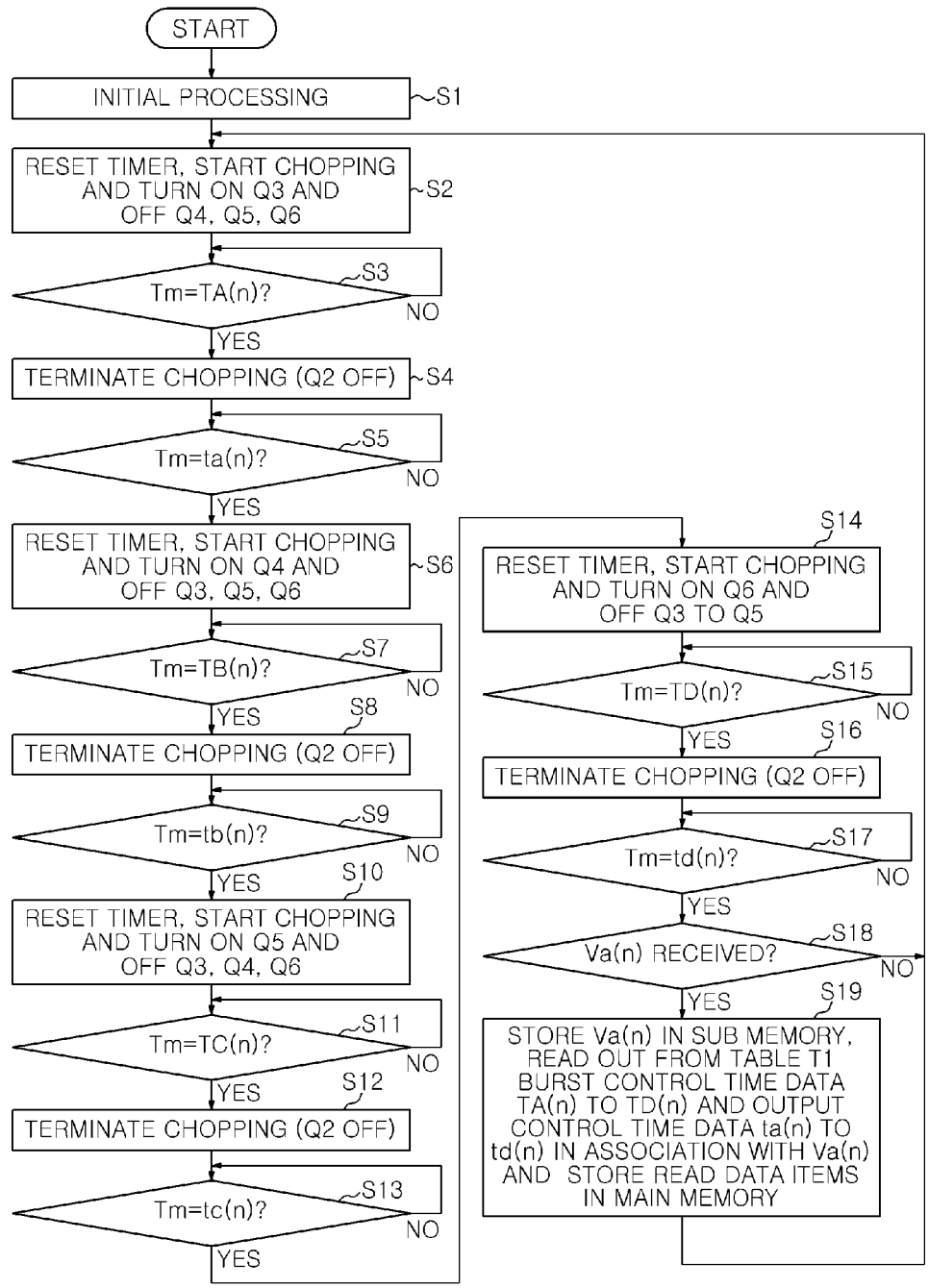
FIG. 2 is a flowchart illustrating control operations performed by a control unit 20 of the illumination apparatus 100.

When a power is supplied to the illumination apparatus 100, the flow illustrated in FIG. 2 is started, so that the first processing is carried out at step S1. Now, the first processing will be described below. At first, the controller IC2 reads the intensity/color adjustment signal data Va(n) stored in the sub memory SM. Further, the controller IC2 reads, from the table T1, the burst control time data TA(n), TB(n), TC(n) and TD(n) and the output control time data ta(n), tb(n), tc(n) and td(n) corresponding to the read intensity/color adjustment signal data Va(n) and stores these data items in the main memory MM. These operations are the initial processing of the flow in accordance with the first embodiment.

The intensity/color adjustment signal data Va(n) firstly read from the sub memory SM after a power is supplied is the intensity/color adjustment signal data stored last in the sub memory SM in the previous use. In other words, it is data that indicates the number of a combination which is the intensity/color adjustment setting selected last by a user in the previous use.

Further, the control unit 20 resets the timer TM to start it and instructs the burst control circuit 14 to start a chopping operation. In addition, the control unit 20 turns on the light source switch Q3 and turns off the light source switches Q4 to Q6 at step S2 and time t1 in FIG. 3. As used herein, the expression of "turning off a light source switch" means to keep the light source switch in an off-state when it is already in an off-state.

Next, it is monitored whether or not a Tm which is a value of the timer TM has reached the time of TA(n) or not at step S3. TA(n) is the burst control time data corresponding to the intensity/color adjustment signal data Va(n) stored in the main memory MM. If the intensity/color adjustment signal data read from the sub memory SM at step S1 is, e.g., Va(10), the burst control time data stored in the main memory MM is TA(10). Accordingly, the burst control time data TA(10) is considered to determine whether or not the Tm has been lapsed or not at step S3. The same applies to the symbol (n) used for various types of parameters in each of steps of the flow in the following descriptions.

When the Tm reaches the time of burst control time data TA(n), the control unit 20 instructs the burst control circuit 14 to terminate the chopping operation. Accordingly, the switching element Q2 is turned off at step S4 and time t2 in FIG. 3.

Subsequently, it is monitored whether or not the Tm reaches the time of output control time data ta(n) at step S5,
and if so, the control unit 20 resets the timer TM to start it and instructs the burst control circuit 14 to start a chopping operation. Accordingly, the semiconductor device IC1 starts the chopping operation of the switching element Q2. Further, the control unit 20 turns on the light source switch Q4 and turns off the light source switches Q3, Q5 and Q6. As a result, the light source switch Q4 is turned on instead of the light source switch Q3 at step S6 and time t3 in FIG. 3.

As a result of control through steps S2 to S6, the switching element Q2 is intermittently turned on and off between times t1 and t2 corresponding to the burst control time data TA(n), so that the output current I1 flows in the LED group 3 and the LED group 3 is lit to emit a red light. Further, the switching element Q2 remains in an off-state between times t2 and t3 and the output current I1 does not flow, so that the LED group 3 is not lit.

Next, it is monitored whether or not the Tm reaches the time of burst control time data TB(n) at step S7, and if so, the control unit 20 instructs the burst control circuit 14 to complete the chopping operation. Accordingly, the switching element Q2 is turned off at step S8, and time t4 in FIG. 3.

Subsequently, it is monitored whether or not the Tm reaches the time of output control time data tb(n) at step S9, and if so, the control unit 20 resets the timer TM to start it and instructs the burst control circuit 14 to start a chopping operation. Accordingly, the semiconductor device IC1 starts the chopping operation of the switching element Q2. Further, the control unit 20 turns on the light source switch Q5 and turns off the light source switches Q3, Q4 and Q6. As a result, the light source switch Q5 is turned on instead of the light source switch Q4 at step S10, and time t5 in FIG. 3.

As a result of control through steps S6 to S10, the switching element Q2 is intermittently turned on and off between times t3 and t4 corresponding to the burst control time data TB(n), so that the output current I1 flows in the LED group 4 and the LED group 4 is lit to emit a green light. Further, the switching element Q2 remains in an off-state between times t4 and t5 and the output current I1 does not flow, so that the LED group 4 is not lit.

Next, it is monitored whether or not the Tm reaches the time of burst control time data TC(n) at step S11, and if so, the control unit 20 instructs the burst control circuit 14 to complete the chopping operation. Accordingly, the switching element Q2 is turned off at step S12, and time t6 in FIG. 3.

Subsequently, it is monitored whether or not the Tm reaches the time of output control time data tc(n) at step S13, and if so, the control unit 20 resets the timer TM to start it and instructs the burst control circuit 14 to start a chopping operation. Accordingly, the semiconductor device IC1 starts the chopping operation of the switching element Q2. Further, the control unit 20 turns on the light source switch Q6 and turns off the light source switches Q3, Q4 and Q5. As a result, the light source switch Q6 is turned on instead of the light source switch Q5 at step S14 and time t7 in FIG. 3.

As a result of control through steps S10 to S14, the switching element Q2 is intermittently turned on and off between times t5 and t6 corresponding to the burst control time data TC(n), so that the output current I1 flows in the LED group 5 and the LED group 5 is lit to emit a blue light. Further, the switching element Q2 remains in an off-state between times t6 and t7 and the output current I1 does not flow, so that the LED group 5 is not lit.

Next, it is monitored whether or not the Tm reaches the time of burst control time data TD(n) at step S15, and if so, the control unit 20 instructs the burst control circuit 14 to complete the chopping operation. Accordingly, the switching element Q2 is turned off at step S16, and time t8 in FIG. 3.

Subsequently, it is monitored whether or not the Tm reaches the time of output control time data td(n) at step S17. If the Tm has reached td(n) at time t1 (next to time t8) in FIG. 3 and no intensity/color adjustment signal data Va(n) is received (i.e., a user does not change the intensity/color adjustment setting, "No" at step S18), the control unit 20 returns the flow to step S2 and repeats the processes from step S2. Accordingly, the light source switch Q3 is turned on instead of the light source switch Q6.

As a result of control through steps S14 to S18 and S2, the switching element Q2 is intermittently turned on and off between times t7 and t8 corresponding to the burst control time data TD(n), so that the output current I1 flows in the LED group 6 and the LED group 6 is lit to emit a white light. Further, between times t8 and t1, the switching element Q2 remains in an off-state and the output current I1 does not flow, so that the LED group 6 is not lit up.

On the other hand, if intensity/color adjustment signal data Va(n) is received, (i.e., a user has changed the intensity/color adjustment setting, "Yes" at step S18), the control unit 20 stores the received intensity/color adjustment signal data Va(n) in the sub memory SM. Further, the control unit 20 read the burst control time data TA(n), TB(n), TC(n) and TD(n) and the output control time data ta(n), tb(n), tc(n) and td(n) from the Table T1 which correspond to the intensity/color adjustment signal data Va(n), and stores them in the main memory MM at step S19. Then, the control unit 20 returns the flow to step S2 and repeats the processes from step S2.

If the intensity/color adjustment signal data newly received at step S18 is, e.g., Va(20), the intensity/color adjustment signal data Va(20) is stored in the sub memory SM at step S19. Further, in the main memory MM, the burst control time data TA(20), TB(20), TC(20) and TD(20) and the output control time data ta(20), tb(20), tc(20) and td(20) are stored. Accordingly, if it has returned to step S2 from step S19, the burst control time data TA(20), TB(20), TC(20) and TD(20) and the output control time data ta(20), tb(20), tc(20) and td(20) are used in the processes from the following step S2 to step S18.

The control unit 20 repeats the same operations of the above steps S2 to S19 as one cycle.

Accordingly, the LED groups 3 to 6 in the illumination apparatus 100 time-divisionally emit lights during time periods corresponding to the burst control time data TA(n), TB(n), TC(n) and TD(n), respectively, each of which corresponds to a number specified in the intensity/color adjustment signal data Va(n).

When shipping the illumination apparatus 100 to a market, a default intensity/color adjustment signal data Va(n) is stored in the sub memory SM. When the illumination apparatus 100 is used first, the default intensity/color adjustment signal data Va(n) is read from the sub memory SM. Then, the burst control time data TA(n), TB(n), TC(n) and TD(n) and the output control time data ta(n), tb(n), tc(n) and td(n) corresponding to the read default intensity/color adjustment signal data Va(n) are read from the table T1 and are stored in the main memory MM. These data items stored in the main memory MM are used for control processes from step S2 to step S18. Afterward, if a user inputs an intensity/color adjustment setting, the burst control time data TA(n), TB(n), TC(n) and TD(n) and the output control time data ta(n), tb(n), tc(n) and td(n) corresponding to the default intensity/color adjustment signal data Va(n) are overwritten by data items corresponding to the newly input setting (newly received intensity/color adjustment signal data Va(n)). The same is applied to the embodiments and modifications to be described below.

(Time Divisional Operation of Illumination Apparatus 100 and Effects Thereof)

By the control operations based on the flowchart described above, the light source switches Q3 to Q6 are selectively turned on. In one cycle of the time period equal to the sum of ta(n), tb(n), tc(n) and td(n), the LED groups 3 to 6 emit lights during time lengths corresponding to the burst control time data TA(n), TB(n), TC(n) and TD(n), respectively, so that red, green, blue and white lights are emitted according to ratios of the time lengths, and the cycle is repeated.

Accordingly, the cycle in which the LED groups 3 to 6 are time-divisionally turned on once per cycle is repeated, and a light of the color that is specified by the intensity/color adjustment signal data Va(n) is emitted.

As such, by lighting the LED groups 3 to 6 in the time-divisional manner, it is possible to easily adjust the color of the emitted light while changing the brightness of each of the LED groups 3 to 6. Additionally, the single output control circuit 12 is employed to output a current to the LED groups 3 to 6 and, therefore, the LED groups 3 to 6 do not require individual constant current circuits. Therefore, the circuit can be smaller and the cost can be saved.

Since the LED groups 3 to 6 are lit in the time-divisional manner, flickering may be observed by human eyes if one cycle (ta(n)+tb(n)+tc(n)+td(n)) is long. However, by setting one cycle to be approximately 15 ms or shorter, it is possible to prevent human eyes from observing flickering. Further, by setting one cycle to be approximately 10 ms or shorter, it is possible to further prevent flickering.

In the example of the table T1 illustrated in FIG. 6A, the time period of one cycle (ta(n)+tb(n)+tc(n)+td(n)) is set to be between 6 ms and 10 ms.

(Burst Control and Effects Thereof)

According to the above-described control operations by the control unit 20, an operation period in which the switching element Q2 performs the chopping operation and a stop period in which the chopping operation is stopped are alternately repeated, as shown in the operation waveforms in FIG. 3. During the stop period, the switching element Q2 is in an off-state.

Herein, such a control scheme in which the operation period and the stop period are alternately repeated is referred to as burst control.

Four chopping periods and four stop periods are included in one cycle. The lengths of the four stop periods are equal to [ta(n)−TA(n)], [tb(n)−TB(n)], [tc(n)−TC(n)], [td(n)−TD(n)], respectively.

In the operation waveforms shown in FIG. 3, switching timing of the light source switches Q3 to Q6 is set to be between the beginning of stop period (when chopping operation is completed) and the termination of stop period (when the next chopping operation is started).

In the present embodiment, the switching timing of the light source switches Q3 to Q6 is within the stop period, in particular, is simultaneously with the termination of the stop period. Accordingly, the time intervals Δta, Δtb, Δtc and Δtd from the beginning of the stop period to switching timing of the light source switches Q3 to Q6 are equal to the length of each stop period. That is, the following equations are established: Δta=ta(n)−TA(n); Δtb=tb(n)−TB(n); Δtc=tc(n)−TC(n); and Δtd=td(n)−TD(n).

Hereinafter, the effect of performing the switchover of the light source switches Q3 to Q6 within the stop period with a time interval from the beginning of the stop period, will be described.

Figure 4A:
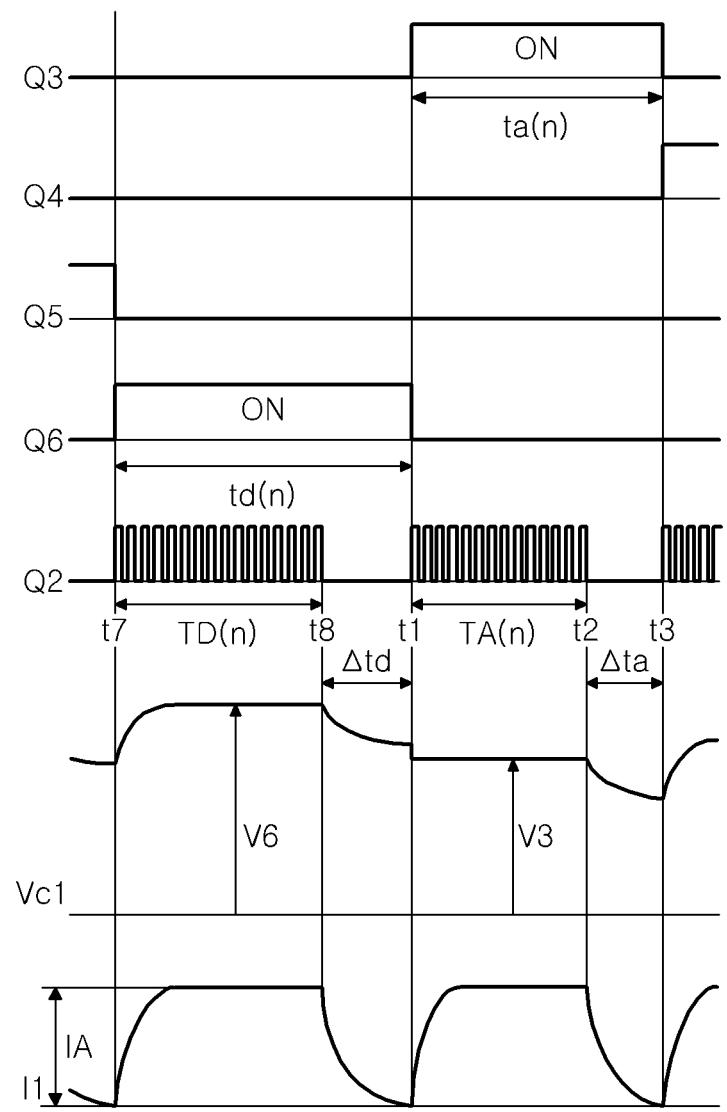
FIGS. 4A and 4B are waveform diagrams for illustrating an effect of burst control, and specifically.
Figure 4B:
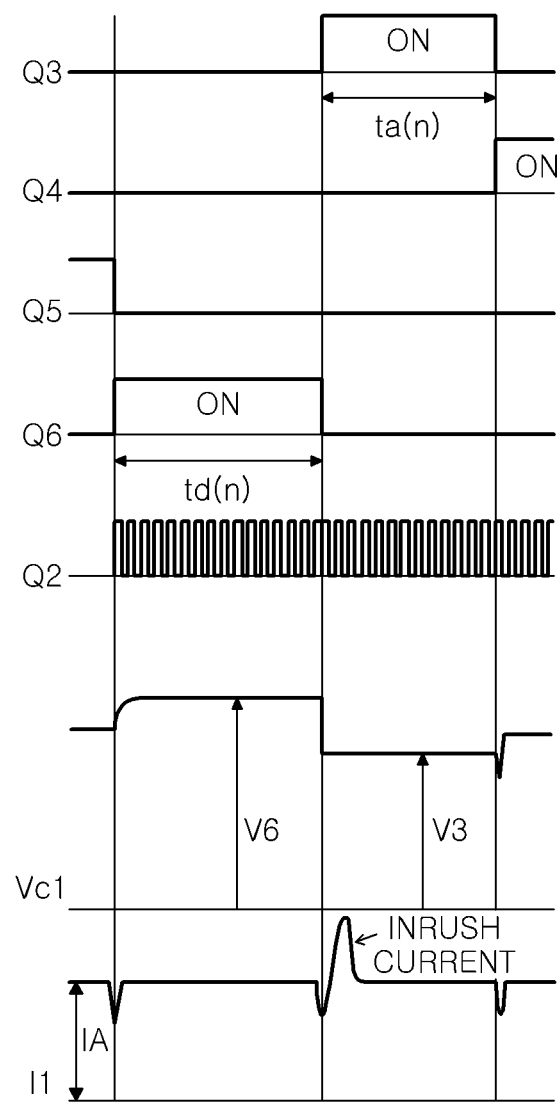

FIGS. 4A and 4B are waveform diagrams for illustrating the effect of the burst control, and specifically, FIG. 4A shows a test example in which the burst control is conducted while FIG. 4B is shows a comparative example in which no burst control is conducted.

In both of the test example and comparative example, the light source switches Q3 to Q6 are turned on once per cycle, and the LED groups 3 to 6 are lit in this order.

FIGS. 4A and 4B only show the time period for which the light source switch Q6 is turned on so that the LED group 6 is lit, and the time period for which the light source switch Q3 is turned on so that the LED group 3 is lit in the next cycle.

As shown in FIG. 4B, in the comparative example where no burst control is conducted, a stop period is not provided in the chopping operation of the switching element Q2, and the light source switches Q3 to Q6 are turned on/off while the chopping operation is performed. In this comparative example, the LED groups 3 to 6 are respectively lit for the time periods corresponding to the ON-periods (ta(n), tb(n), tc(n) and td(n)) of the light source switches Q3 to Q6.

In the comparative example, if the light source switches Q3 to Q6 are turned on/off while the chopping operation of the switching element Q2 is conducted and, thus, a current flows to stress the light source switches Q3 to Q6. This may shorten the life spans of the light source switches Q3 to Q6.

In contrast, in the test example, as shown in FIG. 3 and FIG. 4A, stop periods in which the chopping operation is stopped are provided, and the light source switches Q3 to Q6 are switched over with time intervals Δta, Δtb, Δtc and Δtd from the beginning of the respective stop periods.

During each stop period, the electric charges accumulated in the capacitor C2 of the output control circuit 12 flow toward the light source unit 1 and, thus, the current I1 output from the power unit 10 decreases slowly, as shown in FIG. 3 and FIG. 4A. Accordingly, the voltage Vc1 at the output terminals of the output control circuit 12 also decreases slowly.

Accordingly, the light source switches Q3 to Q6 are turned on/off after the current I1 and the voltage VC1 have decreased, and thus the light source switches Q3 to Q6 are less stressed. In addition, with respect to the burst control, the amplitude of the output current I1 can be easily adjusted by controlling on/off intervals of the switching element Q2.

Further, as will be described below, when the LED groups 3 to 6 have different forward voltages Vf, an inrush current may occur in the series load circuits 30, 40, 50 and 60. In the test example where the burst control is conducted, such inrush current can also be suppressed.

Further, the LED groups 3 to 6 generally have different forward voltages Vf, and thus the magnitude of the voltage Vc1 at the output terminals of the output control circuit 12 depends on which one of the light source switches Q3 to and Q6 is turned on.

In FIG. 3, V3 to V6 indicate the magnitude of the voltage Vc1 when the light source switches Q3 to Q6 are turned on, respectively.

In the example shown in FIG. 3, as the forward voltages Vf of the LED groups 3 to 6 increase in that order, the voltage Vc1 also increases from V3 to V6 (i.e., v3 <V4 <V5 <V6). In the present embodiment, the LED group 6 (white LED) is made of a different LED from that of the LED group 5 (blue LED), and thus have a different (higher) forward voltage.

Accordingly, FIGS. 4A and 4B show a time period in which current flow is changed from the LED group 6 having a relatively high forward voltage Vf to the LED group 3 having a relatively low forward voltage Vf.

As shown in the comparative example in FIG. 4B, when the light source switches Q3 and Q6 are turned on and off during the chopping operation, respectively, the current flowing in the LED group 6 having a relatively high forward voltage Vf is moved to flow in the LED group 3 having a relatively low forward voltage Vf. At this time, an excessive inrush current may flow in the series load circuit 30 including the light source switch Q3 and the LED group 3.

Meanwhile, in the test example shown in FIG. 4A, the light source switches Q3 and Q6 are turned on and off, respectively, when the current I1 and the voltage Vc1 from the output control circuit 12 are decreased. Accordingly, it is possible to suppress an excessive inrush current from flowing in the series load circuit 30 and, thus, the light source switch Q3 and the LED group 3 are less stressed.

As described above, in accordance with the present embodiment, deterioration of the LED groups 3 to 6 due to an excessive inrush current can be prevented, and deterioration of the LEDs or the light source switches Q3 to Q6 due to stress can be suppressed. Therefore, the lifespan of the illumination apparatus can be prolonged.

(Time Interval Between Beginning of Stop Period and Switchover of Light Source Switches Q3 to Q6)

Time intervals Δta, Δtb, Δtc and Δtd from the beginning of the stop periods until switchover of the light source switches Q3 to Q6 are set to be longer than an on/off cycle of the switching element Q2 during the chopping operation.

Further, switchover of the light source switches Q3 to Q6 is preferably conducted when the output current I1 becomes as small as possible (almost zero).

After the stop period is started, the decreasing rate of the current I1 is determined by a time constant when electric charges in the capacitor C2 are released to the series load circuits 30, 40, 50 and 60.

In other words, at the beginning of the stop period, the current I1 is same as output control current data IA, and then it decreases to 37% of output control current data IA after a time period has elapsed which corresponds to the time constant when electric charges in the capacitor C2 are released to the series load circuits 30, 40, 50 and 60. Further, as more time elapses, the current I1 approximates zero.

From the above, it can be concluded that it is preferable to set the time intervals Δta, Δtb, Δtc and Δtd to be greater than the time constant when the electric charges in the capacitor C2 are released to the series load circuits 30, 40, 50 and 60 during the respective stop periods. Further, it can also be concluded that it is preferable to set the time intervals Δta, Δtb, Δtc and Δtd to be longer than a time period for which the output current I1 decreases to be approximately zero.

On the other hand, when the time intervals Δta, Δtb, Δtc and Δtd are set to be long, one cycle of ta(n)+tb(n)+tc(n)+td(n) also becomes long. If one cycle becomes too long, flickering may appear.

Therefore, in view of the above, the time intervals Δta, Δtb, Δtc and Δtd need to be set appropriately.

In the specific example of the table T1 shown in FIG. 6A, all of the time intervals of Δta, Δtb, Δtc and Δtd are set to be 0.5 ms.

From a design perspective, it is easy to set the four time intervals Δta, Δtb, Δtc and Δtd in one cycle to be the same. However, the time intervals may not be the same. For example, depending on time periods of the chopping operations, i.e., Ta(n), TB(n), TC(n) and TD(n), the time intervals of Δta, Δtb, Δtc and Δtd subsequent thereto may be changed, respectively.

(Summary of First Embodiment)

The illumination apparatus 100 includes: the DC power source circuit 11; the output control circuit 12 that adjusts an output current by performing a chopping operation to repeatedly turn on/off the switching element Q2 disposed on a power line connected between the DC power source circuit 11 and the light source unit 1; the light source unit 1 having LED groups 3 to 6 for emitting lights of different colors; and the control unit 20 that controls the current flowing in each of the LED groups 3 to 6. Further, the series load circuits 30, 40, 50 and 60 which include the LED groups 3 to 6 and the light source switches Q3 to Q6 respectively connected to the LED groups 3 to 6 in series are connected in parallel to the output terminals of the output control circuit 12.

In addition, in the lighting device 2 in accordance with the first embodiment, the control unit 20 adjusts the lengths of ON-periods of the light source switches Q3 to Q6. More specifically, the control unit 20 reads from the table T1 the output control time data ta(n), tb(n), tc(n) and td(n) corresponding to the intensity/color adjustment signal data Va(n) which is input by a user. Then, based on the read output control time data, the ON-periods of the light source switches Q3 to Q6 are adjusted, respectively.

With this, the stop periods during which the LED groups 3 to 6 are not lit can be adjusted and, thus, the sum of the stop periods in one cycle in a repeated order in which the light source switches Q3 to Q6 are sequentially switched over can be adjusted, thereby adjusting light intensity.

Additionally, the lighting device 2 in accordance with the first embodiment further includes the DC power source circuit 11. The output control circuit 12 includes the switching element Q2 (chopping switch) connected to an output terminal of the DC power source circuit 11. Further, the control unit 20 adjusts the output current I1 output from the output control circuit 12 by a chopping operation to repeatedly turn on/off the switching element Q2.

Therefore, the intensities of the lights emitted from the LED groups 3 to 6 can be adjusted, thereby adjusting intensity of a light. In addition, by changing on/off intervals of chopping operation, it becomes easier to adjust the amplitude of the output current I1 precisely, and accordingly it also becomes easier to adjust light intensity precisely.

In addition, in the lighting device 2 in accordance with the first embodiment, the control unit 20 adjusts the time period of chopping operation within the ON-period of each of the light source switches Q3 to Q6.

With this, it is possible to adjust the time periods in which the LED groups 3 to 6 are lit, and accordingly a color of a light, i.e., a combined light from the light source unit 1 is adjusted.

Herein, a stop period of chopping operation in a case where a voltage drop of a light source connected to a light source switch turned on after the switchover of light source switches Q3 to Q6 is smaller than a voltage drop of a light source connected to a light source switch turned on before the switchover is referred to as a first period.

The controller IC2 of the lighting device 2 in accordance with the first embodiment turns off the switching element Q2 to stop the chopping operation during the first period and resumes the chopping operation of the switching element Q2 simultaneously with switchover of light source switches Q3 to Q6. In the repeated order of switching over the light source switches Q3 to Q6, the controller IC2 performs the above control before turning off a light source switch connected to an LED group of a relatively great voltage drop and turning on a light source switch connected to an LED group of a relatively small voltage drop.

Accordingly, the stop period of chopping operation is provided at least before the switchover of the light source switches in which a light source switch connected to an LED group of a relatively great voltage drop is turned off and a light source switch connected to an LED group of a relatively small voltage drop turned on. Therefore, during the stop period, the output voltage Vc1 may be decreased to be below the voltage drop of the LED group connected to the light source switch to be turned on. In this manner, it is possible to suppress an inrush current so that damage and stress to LED groups or light source switches can be relieved and, thus, lifespans of the lighting device and the illumination apparatus can be prolonged.

Further, the control unit 20 operates the output control circuit 12 such that the operation period in which chopping operation is conducted and the stop period in which chopping operation is stopped to keep the switching element Q2 in an off-state are repeated alternately. Moreover, the switchover of the light source switches Q3 to Q6 is conducted such that the light source switches Q3 to Q6 are selectively and sequentially turned on. The switchover of the light source switches Q3 to Q6 is conducted during the stop period with a time interval from the beginning of the stop period.

Accordingly, a power output from the output control circuit 12 is supplied to the LED groups 3 to 6 sequentially, so that the LED groups 3 to 6 are lit in the time-divisional manner and thus on-times thereof do not overlap with one another.

Since the switchover of the light source switches Q3 to Q6 is conducted during the stop period with the time interval from the beginning of the stop period, the switchover is conducted when a small current flows in corresponding one of the series load circuits 30, 40, 50 and 60.

Therefore, the LED groups 3 to 6 and/or the light source switches Q3 to Q6 in the series load circuits 30, 40, 50 and 60 can be less stressed.

(First Modification)

An illumination apparatus 100 in accordance with the first modification has the same configuration as the illumination apparatus 100 in accordance with the first embodiment shown in FIG. 1. Further, the control operations by the control unit 20 are also conducted based on the flowchart illustrated in FIG. 2. In addition, in order to avoid redundant descriptions, the same elements as in the first embodiment are denoted by the like numerals throughout the modifications and embodiments below and descriptions thereof will be omitted.

In the present modification, however, the control unit 20 stores therein a table T2 as shown in FIG. 5B to perform control operations based on the table T2.

As the illumination apparatus 100 in accordance with the first embodiment, the illumination apparatus 100 in accordance with the present modification reads from the table T2 the burst control time data TA(n), TB(n), TC(n) and TD(n) based on a number specified by the intensity/color adjustment signal data Va(n), and the LED groups 3 to 6 are lit only during the time periods corresponding to the burst control time data TA(n), TB(n), TC(n) and TD(n) to emit a combined light.

However, in the illumination apparatus 100 in accordance with the present modification, different from the illumination apparatus 100 in accordance with the first embodiment, the output control time data ta(n), tb(n), tc(n) and td(n) stored in the table T2 are constant values as tas, tbs, tcs and tds, respectively. Therefore, the output control time data is not changed by the intensity/color adjustment signal data Va(n).

In the table T2, the values of the burst control time data TA(n), TB(n), TC(n) and TD(n) are set to be smaller than those of the output control time data tas, tbs, tcs and tds, even at the maximum.

FIG. 6B shows a specific example of the table T2. As FIG. 6A, in FIG. 6B, among 256 numbers of items of the intensity/color adjustment signal data V(n), only eight numbers (n=0, 1, 10, 11, 20, 21, 30 and 31) representatively have numerical values for TA(n), TB(n), TC(n) and TD(n). Numerical values for the rest of numbers are not shown.

In the table T2 in FIG. 6B, the values of TA(n), TB(n), TC(n) and TD(n) are set to be 3.0 ms or shorter, while values of the output control time data tas, tbs, tcs and tds are all set to be 3.5 ms. Therefore, each of stop periods is at least 0.5 ms.

When the control unit 20 performs the control operations based on the table T2, the effects of the time-divisional operation and the burst control described in the first embodiment can be achieved.

That is, the operation period in which the chopping operation of the switching element Q2 is conducted and the stop period in which the chopping operation is stopped are alternately repeated, and the switching element Q2 remains in an off-state during the stop period. Further, the switchover of the light source switches Q3 to Q6 is conducted during the stop period with a time interval from the beginning of the stop period.

Accordingly, the switchover of the light source switches Q3 to Q6 is conducted after the current I1 and the voltage Vc1 are decreased to specific extents and, thus, the light source switches Q3 to Q6 are less stressed. Additionally, it is possible to prevent an inrush current from flowing in the series load circuits 30, 40, 50 and 60.

In the illumination apparatus 100 in accordance with the first embodiment, the time period of one cycle changes depending on the intensity/color adjustment signal data Va(n). However, in the illumination apparatus 100 in accordance with the present modification, the time period of one cycle is constant and equal to the sum of tas, tbs, tcs and tds. For the specific example illustrated in FIG. 6B, the time period of one cycle is equal to 14 ms.

(Second Modification)

The illumination apparatus 100 in accordance with the second modification also has the same configuration as the illumination apparatus 100 in accordance with the first embodiment shown in FIG. 1. Further, control operations by the control unit 20 are conducted also based on the flowchart illustrated in FIG. 2.

In the present modification, however, the control unit 20 includes a table T3 shown in FIG. 5C to perform the control operations based on the table T3.

As the illumination apparatus 100 in accordance with the first embodiment, the illumination apparatus 100 in accordance with the present modification reads from the table T3 the output control time data ta(n), tb(n), tc(n) and td(n) based on a number specified by the intensity/color adjustment signal data Va(n), and the light source switches Q3 to Q6 are switched over based on the output control time data ta(n), tb(n), tc(n) and td(n).

However, in the illumination apparatus 100 in accordance with the present modification, different from the illumination apparatus 100 in accordance with the first embodiment, the burst control time data TA(n), TB(n), TC(n) and TD(n) stored in the table T3 are constant values, i.e., TAs, TBs, TCs and TDs, respectively. Therefore, the burst control time data are not changed by the intensity/color adjustment signal data Va(n).

In the table T3, the values of the output control time data ta(n), tb(n), tc(n) and td(n) are set to be greater than those of the burst control time data TAs, TBs, TCs and TDs, consistently.

FIG. 6C schematically shows a specific example of the table T3. In the example of the table T3 illustrated in FIG. 6C, e.g., when the intensity/color adjustment signal data Va(n) received by the controller IC2 is Va(10), the output control time data ta(10), tb(10), tc(10) and td(10) are 3.3 ms, 2.0 ms, 2.7 ms and 2.5 ms, respectively. The values of the burst control time data TA(10), TB(10), TC(10) and TD(10) are 2.0 ms (TAs), 1.5 ms (TBs), 1.5 ms (TCs) and 2.5 ms (TDs), respectively.

When the control unit 20 performs the control operations based on the table T3, the effects of the burst control described in the first embodiment can be achieved. That is, the operation period in which the chopping operation of the switching element Q2 is conducted and the stop period in which the chopping operation is stopped are alternately repeated, and the switching element Q2 remains in an off-state during the stop period. Further, the switchover of the light source switches Q3 to Q6 is conducted during the stop period with a time interval from the beginning of the stop period.

Accordingly, the switchover of the light source switches Q3 to Q6 is conducted after the current I1 and the voltage Vc1 have decreased and, thus, the light source switches Q3 to Q6 are less stressed. Additionally, it is possible to prevent an inrush current from flowing in the series load circuits 30, 40, 50 and 60.

In the illumination apparatus 100 in accordance with the first embodiment, the time periods in which the LED groups 3 to 6 are lit change depending on the intensity/color adjustment signal data Va(n). However, in the illumination apparatus 100 in accordance with the present modification, the values of the burst control time data TA(n), TB(n), TC(n) and TD(n) are constant and, thus, the ratio of time periods in which the LED groups 3 to 6 are lit does not change.

Accordingly, the color of the emitted light does not change even when the intensity/color adjustment signal data Va(n) changes. However, the lengths of stop periods can be changed by the intensity/color adjustment signal data Va(n) and, therefore, the ratio of light emitting periods in one cycle can be changed. Therefore, light intensity can be adjusted.

As such, by setting the burst control time data to be constant values, control becomes further simple. The illumination apparatus 100 in accordance with the present modification can be employed when the color tone of an emitted light needs to be kept but the brightness needs to be adjusted.

(Third Modification)

The illumination apparatus 100 in accordance with the third modification has the same configuration as the illumination apparatus 100 in accordance with the first embodiment shown in FIG. 1.

In the illumination apparatus 100 in accordance with the first embodiment, the output control current data IA is a constant value. However, in the illumination apparatus 100 in accordance with the present modification, the output control current data IA varies depending on the intensity/color adjustment signal data Va(n).

In the illumination apparatus 100 in accordance with the present modification, a table T4 illustrated in FIG. 5D is stored in the memory of the control unit 20 in place of the table T1.

As the table T1, the table T4 stores therein the intensity/color adjustment signal data Va(n), the burst control time data TA(n), TB(n), TC(n) and TD(n) and the output control time data ta(n), tb(n), tc(n) and td(n) associated with each other. However, in addition to this, the table T4 stores therein output control current data IA(n) (i.e., A(0) to A(255)) in association with the intensity/color adjustment signal data Va(n).

The output control current data IA(n) indicates a target value of the output current I1 when the output control circuit 12 performs a chopping operation.

The same flowchart as the flowchart illustrated in FIG. 2 is referenced for control operations by the control unit 20. However, at steps S1 and S19, the output control current data IA(n) is read from the table T4, in addition to the burst control time data TA(n), TB(n), TC(n) and TD(n) and the output control time data ta(n), tb(n), tc(n) and td(n).

Then, the output control current data IA(n) is output to the semiconductor device IC1. During a chopping operation period, the semiconductor device IC1 adjusts the output current I1 to the target current value, i.e., the output control current data IA(n) by monitoring a voltage signal from the current detecting circuit 13 and feedback-controlling.

Figure 7A:
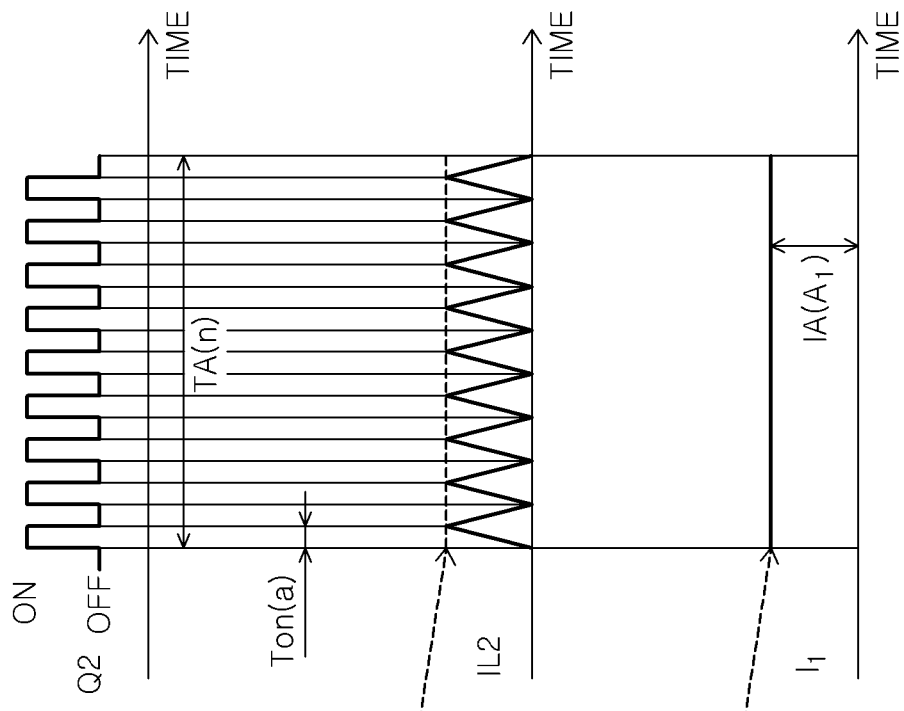
FIGS. 7A and 7B are timing charts for illustrating how a current I1 input to a light source unit 1 is adjusted according to the amplitude of output control current data IA.
Figure 7B:
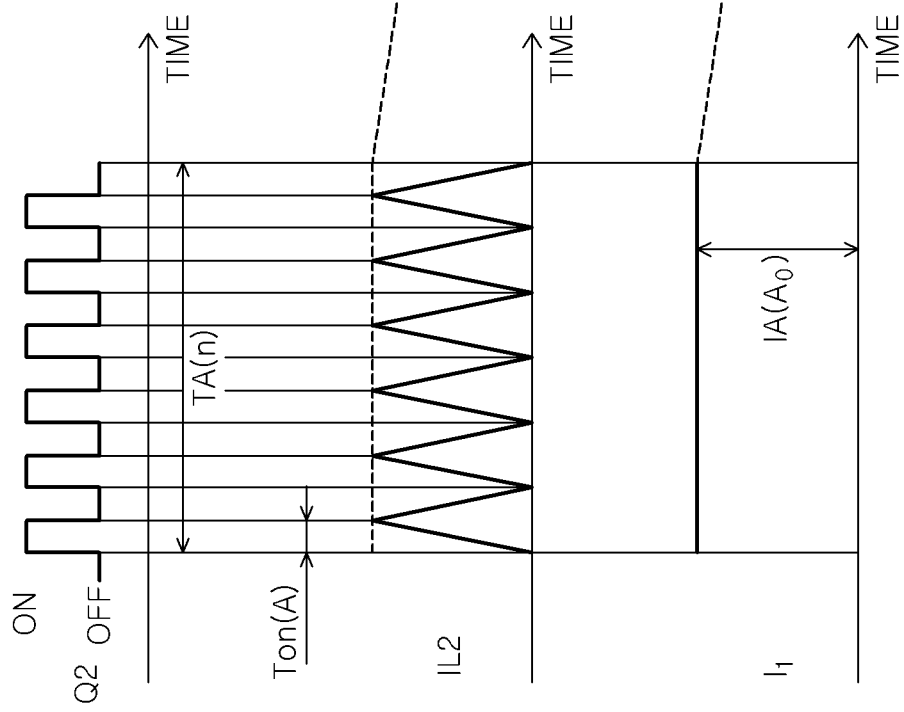

FIGS. 7A and 7B are timing charts for showing adjustment of the output current I1 input to the light source unit 1 according to the value of the output control current data IA(n) input to the semiconductor device IC1.

FIG. 7A is a timing chart when the value $A_0$ of the output control current data IA(n) is relatively great (e.g., 20 mA), while FIG. 7B is a timing chart when the value $A_1$ of the output control current data IA(n) is relatively small (e.g., 10 mA). In FIGS. 7A and 7B, on/off states of the switching element Q2, a ripple current flowing in the inductor L2, and the output current I1 from the output control circuit 12 are illustrated.

The semiconductor device IC1 narrows or widens an on-width (Ton) of each pulse for turning on/off the switching element Q2 according to the output control current data IA(n). Specifically, the semiconductor device IC1 monitors the output current I1 and widens the on-width (Ton) of the pulse when the output current I1 is smaller than the output control current data IA(n). On the other hand, the semiconductor device IC1 narrows the on-width (Ton) of the pulse when the output current I1 is greater than the output control current data IA(n).

As can be seen by comparison between FIGS. 7A with 7B, when the on-width of the pulse for the switching element Q2 is small, so is the amplitude of pyramid shapes of the ripple current IL2. As a result, the output current I1 becomes small as well.

As the semiconductor device IC1 controls the on-width of the pulse for the switching element Q2 in this manner, the output currents I1 can be adjusted to the output control current data IA(n), i.e., $A_0$ or $A_1$ as the target value, as illustrated in FIGS. 7A and 7B, respectively.

As can be seen from the on-off states of the switching element Q2 and waveforms of ripple current IL2 shown in FIGS. 7A and 7B, the ripple current IL2 increases during the ON-period of the switching element Q2, whereas the ripple current IL2 decreases during the off-time of switching element Q2. In the present modification, the semiconductor device IC1 controls the switching element Q2 such that the switching element Q2 is turned on when the ripple current IL2 is decreased to almost zero.

Accordingly, as can be seen in FIGS. 7A and 7B in which the frequency of the pulses for turning on/off the switching element Q2 is higher in FIG. 7B than in FIG. 7A, when the on-width of the pulse for turning on/off the switching element Q2 is smaller, the chopping frequency is higher.

Accordingly, when the target value of the output current I1, i.e., the output control current data IA(n) is smaller, the chopping frequency of the switching element Q2 becomes higher and, thus, it is possible to reduce an amount of a light emitted from the light source unit 1 without flickering observed.

In addition, in the illumination apparatus 100 in accordance with the present modification, a color of a light can be adjusted by changing time periods in which the LED groups 3 to 6 are lit based on the burst control time data TA(n), TB(n), TC(n) and TD(n) and an intensity of a light can be adjusted by changing the output control current data IA(n) to change the current amount.

Therefore, in accordance with to the present modification, it is possible to more simply adjust both the intensity and color of a light. In particular, it is possible to adjust the intensity of a light in a wider range.

(Fourth Modification)

In the first embodiment, the light source switches Q3 to Q6 are switched over in that order. Further, the magnitudes of the voltage drops across the light sources connected to the light source switches Q3 to Q6 have the relationship of V3 <V4 <V5 <V6, respectively. At the time of switchover of the light source switches Q3 to Q6, if a stop period is not long enough so that the output voltage Vc1 is greater than the voltage drop across a light source to be turned on next, an inrush current may occur.

As shown in FIG. 8, when a light source switch Q106 is turned off and a light source switch Q103 is turned on, the output voltage Vc1 decreases from V106 to V106e during the stop period. However, since V106e is greater than the magnitude of the voltage drop V103 across the light source connected to the light source switch Q103 to be turned on next, a voltage more than necessary is applied when the light source switch Q103 is turned on. Therefore, an inrush current (INC) flows.

Hereinafter, examples of suppressing such an inrush current more effectively will be described.

Figure 9:
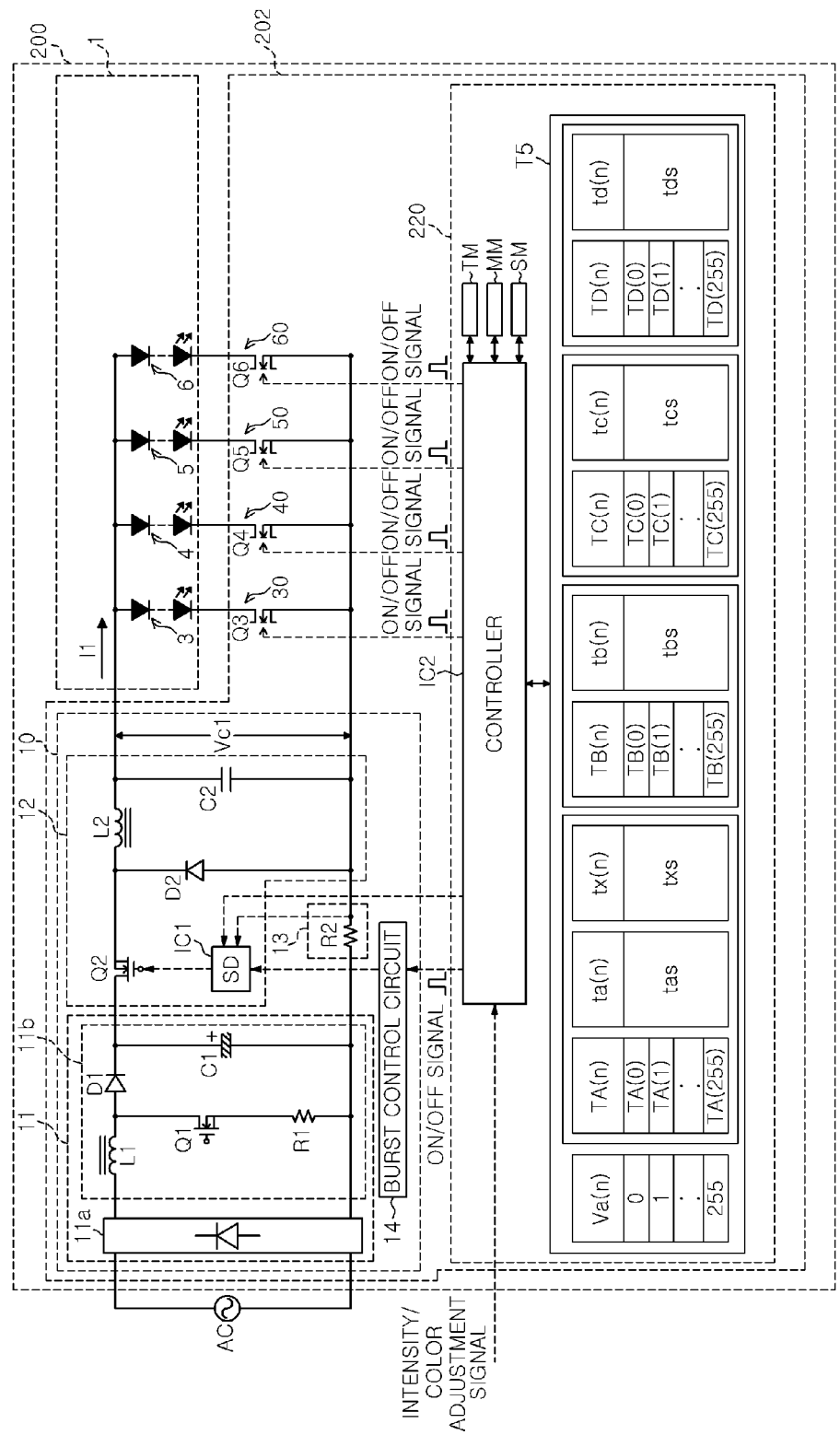
FIG. 9 is a circuit block diagram of a lighting device and an illumination apparatus in accordance with a fourth modification.

An illumination apparatus 200 and a lighting device 202 in accordance with a fourth modification will be described with reference to FIGS. 9 to 12. FIG. 9 is a circuit block diagram of the illumination apparatus 200 and a lighting device 202 in accordance with the present modification. The illumination apparatus 200 and a lighting device 202 shown in FIG. 9 have the same configurations as the illumination apparatus 100 and the lighting device 2 in accordance with the first embodiment, except for contents in a table in a control unit 220.

In a table T5 in accordance with the present modification, inrush current suppression control time data tx(n) is also stored, in addition to burst control time data TA(n), TB(n), TC(n) and TD(n) and output control time data ta(n), tb(n), tc(n) and td(n). These data items are associated with the items of intensity/color adjustment signal data Va(n) (n ranges, e.g., from 0 to 255), respectively. In the present modification, the output control time data ta(n), tb(n), tc(n) and td(n) and the inrush current suppression control time data tx(n) are constant values as tas, tbs, tcs, tds and txs, respectively.

FIG. 12 schematically shows a specific example of the table T5 in accordance with the present modification. In accordance with the present modification, in the example of the table T5 illustrated in FIG. 12, the constant values tas, tbs, tcs and tds of the respective output control time data ta(n), tb(n), tc(n) and td(n) are all 3.5 ms. If intensity/color adjustment signal data Va(10) is received at the controller IC2, the values of the burst control time data TA(n), TB(n), TC(n) and TD(n) are, e.g., 3.0 ms, 1.5 ms, 1.5 ms and 3.0 ms, respectively. The constant value txs of the inrush current suppression control time data tx(n) is 0.5 ms.

(Description on Operations of Controller IC2)

Figure 10:
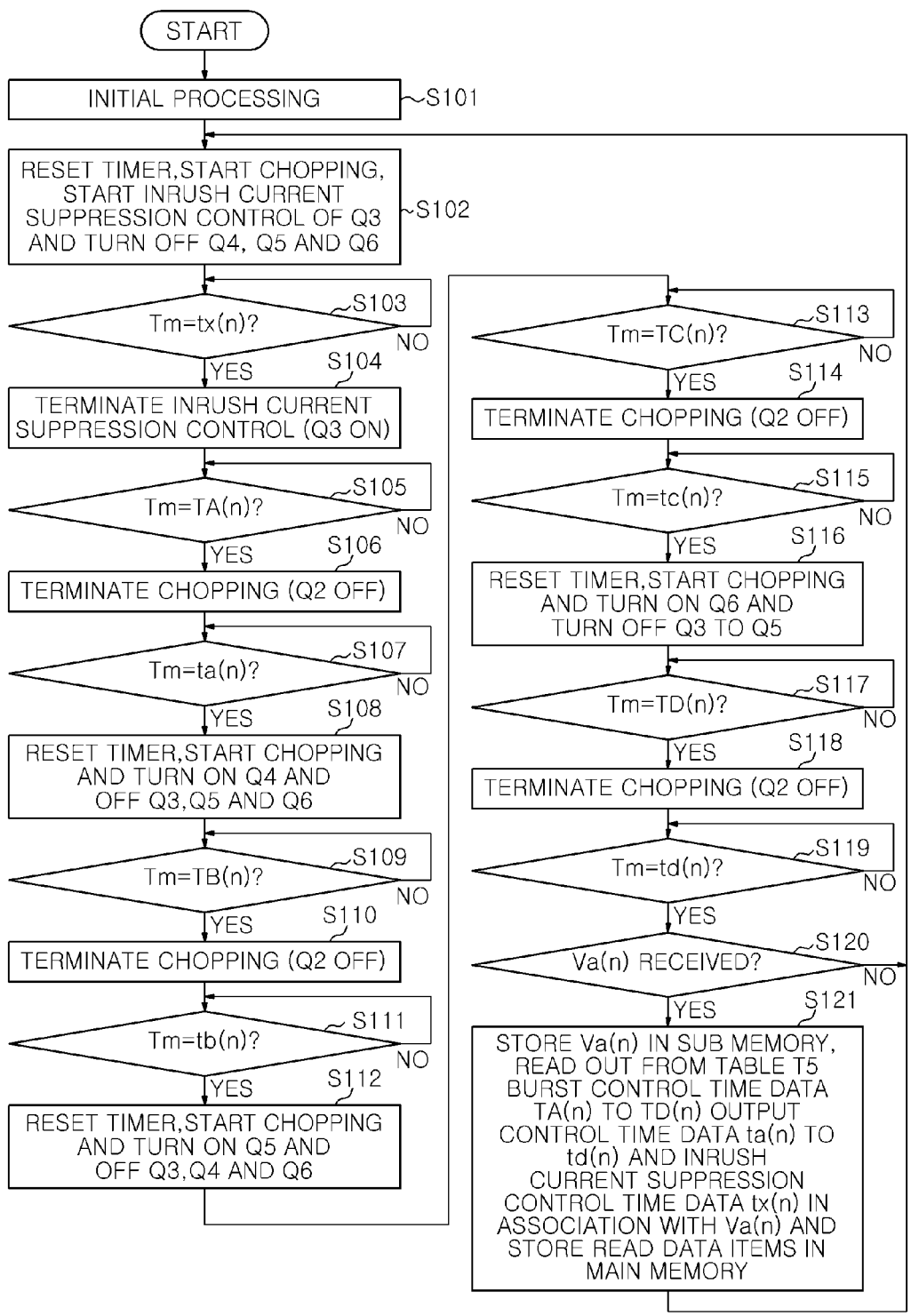
FIG. 10 is a flowchart for illustrating operations by a controller shown in FIG. 9.
Figure 11:
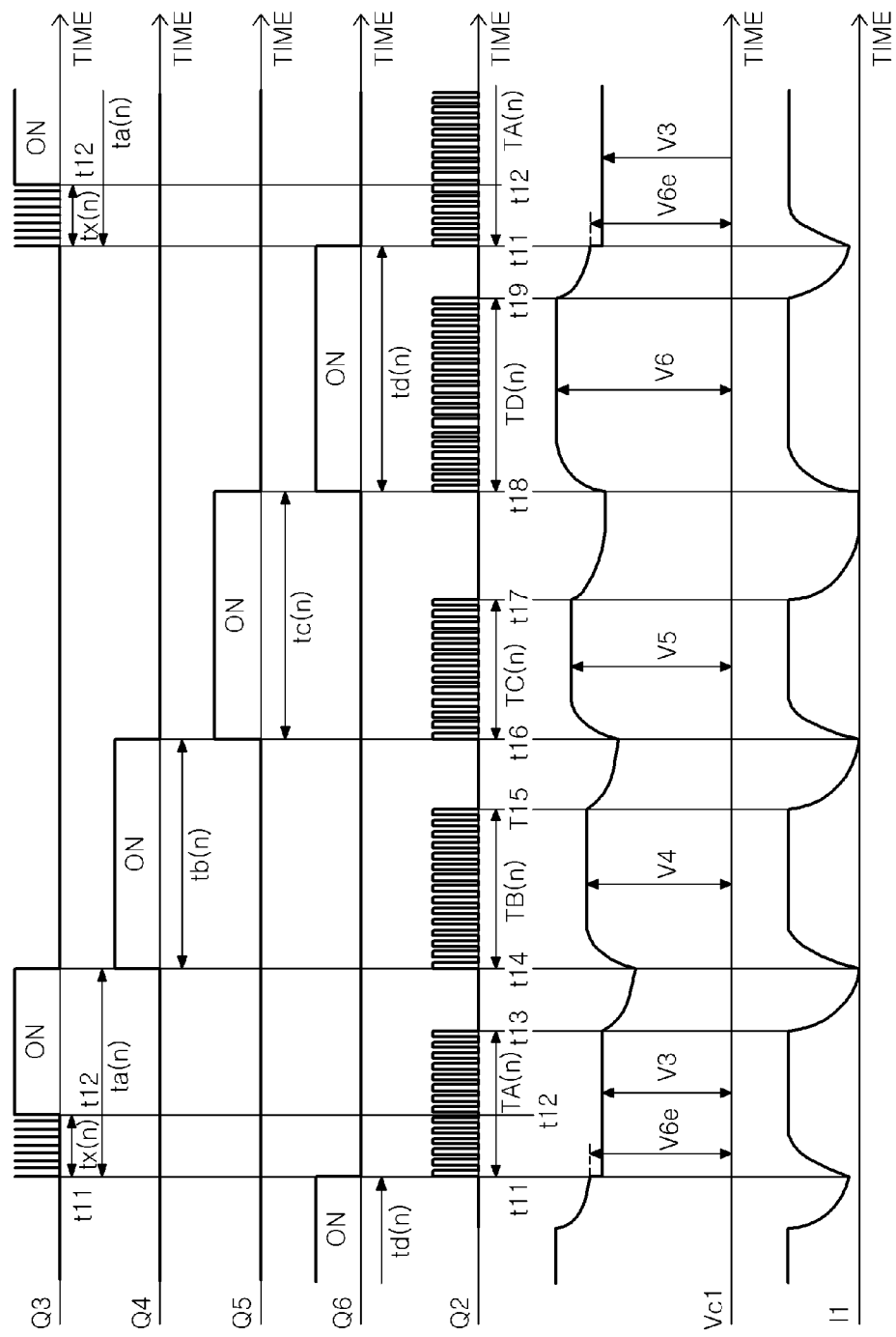
FIG. 11 is a timing chart for illustrating operations of the lighting device and the illumination apparatus of the fourth modification.

Hereinafter, control operations performed by the controller IC2 in accordance with the present modification based on the table T5 when the intensity/color adjustment signal data Va(n) is input will be described with reference to FIGS. 10 and 11. FIG. 10 is a flowchart illustrating control operations by the controller IC2. FIG. 11 is a timing chart for illustrating the control operations in the lighting device 202 and the illumination apparatus 200 in accordance with the present modification. Specifically, the timing chart shows gate voltages of the light source switches Q3 to Q6, a gate voltage of the switching element Q2, a voltage Vc1 at the output terminals of the power unit 10 and an output current I1 output from the power unit 10.

When a power is supplied to the illumination apparatus 200, the flow illustrated in FIG. 10 is started and, thus, the initial processing is carried out at step S101. The initial processing in accordance with the present modification is as follows. At first, the controller IC2 reads intensity/color adjustment signal data Va(n) stored in the sub memory SM.

Further, the controller IC2 reads from the table T5 the burst control time data TA(n), TB(n), TC(n) and TD(n), the output control time data ta(n), tb(n), tc(n) and td(n), and the inrush current suppression control time data (inrush current suppression period) tx(n) in association with the read intensity/color adjustment signal data Va(n), and stores these data in the main memory MM. The above processes are the initial processing of the flowchart in accordance with the present modification.

As the first embodiment, the intensity/color adjustment signal data Va(n) first read from the sub memory SM after the power supply is the intensity/color adjustment signal data stored last in the sub memory SM in the previous use. In other words, it is data that indicates the number of a combination which is the intensity/color adjustment setting selected last by a user in the previous use. Then, the controller IC2 resets the timer TM to start it and instructs the burst control circuit 14 to start a chopping operation. In addition, the controller IC2 starts to turn on and off the light source switch Q3 repeatedly and intermittently and turns off the light source switches Q4, Q5 and Q6 at step S102 and time t11 in FIG. 11.

Now, the repetitive and intermittent turning on/off of the light source switch Q3 will be described.

As illustrated in FIG. 11, when the light source switch Q6 connected to the LED group 6 of the greatest voltage drop is turned off and the light source switch Q3 connected to the LED group 3 of the smallest voltage drop is turned on at time t11 in FIG. 11, the voltage V6e immediately before the light source switch Q3 is turned on is greater than the voltage drop V3 across the light source connected to the light source switch Q3. Therefore, when the light source switch Q3 is just turned on, an inrush current may flow as shown in FIG. 8. In this regard, in accordance with the present modification, the light source switch Q3 is controlled so that it is turned on and off repeatedly and intermittently during an initial period), i.e., first inrush current suppression period tx(n) within the ON-period of the light source switch Q3, as shown in FIG. 11. (This control is the inrush current suppression control in accordance with the present modification).

With this, the current flowing in the series load circuit 30 can be limited and, thus, the inrush current can be prevented.

If the first inrush current suppression period tx(n) is long, it takes also long for the output current I1 to reach the value of the output control current data IA after switchover of the light source switches. This means that the amount of the light emitted from the light source stays under the target amount long after the switchover of the light source switches. This may cause flickering. It is sufficient to perform the inrush current suppression control only for a time period in which the inrush current is expected to flow immediately after the switchover of the light source switches. Therefore, in accordance with the present modification, the first inrush current suppression period tx(n) is set to be sufficiently short compared to the ON-period of the light source switch Q3 (ta(n)).

Although the inrush current suppression control time data tx(n) has a constant value txs in the present modification, it is not limited thereto. Depending on the intensity/color adjustment signal data Va(n), one of different values may be set or all of the different values may be set.

Referring back to the flow in FIG. 10, subsequent to step S102, it is monitored whether the Tm has reached the first inrush current suppression period tx(n) or not at step S103. When Tm has reached the first inrush current suppression period tx(n) ("Yes" at step S103), the controller IC2 turns on the light source switch Q3 continuously to complete the inrush current suppression control, at step S104 and time t12 in FIG. 11.

Subsequent steps S105 to S107 are identical to the steps S3 to S5 illustrated in the flowchart in FIG. 2, and thus descriptions thereof will be omitted.

At step S107, if the Tm has reached the time of output control time data ta(n) ("Yes" at step S107), the controller IC2 resets the timer TM to start it and instructs the burst control circuit 14 to start a chopping operation. In addition, the controller IC2 turns on the light source switch Q4 and turns off the light source switches Q3, Q5 and Q6 at step S108 and time t14 in FIG. 11. With this, the light source switch Q4 is turned on instead of the light source switch Q3.

Subsequent steps S109 to S111 are identical to the steps S7 to S9 illustrated in the flowchart in FIG. 2, and thus descriptions thereof will be omitted.

At step S111, if the Tm has reached the time of output control time data tb(n) ("Yes" at step S111), the controller IC2 resets the timer TM to start it and instructs the burst control circuit 14 to start a chopping operation. In addition, the controller IC2 turns on the light source switch Q5 and turns off the light source switches Q3, Q4 and Q6 at step S112 and time t16 in FIG. 11. With this, the light source switch Q5 is turned on instead of the light source switch Q4.

Subsequent steps from S113 to S115 are identical to the steps 11 to S13 illustrated in the flowchart in FIG. 2, and thus descriptions thereof will be omitted.

At step S115, if the Tm has reached the time of output control time data tc(n) ("Yes" at step S115), the controller IC2 resets the timer TM to start it and instructs the burst control circuit 14 to start a chopping operation. In addition, the controller IC2 turns on the light source switch Q6 and turns off the light source switches Q3, Q4 and Q5 at step S116 and time t18 in FIG. 11. With this, the light source switch Q6 is turned on instead of the light source switch Q5.

Next, it is monitored whether the Tm has reached the time of burst control time data TD(n) or not at step S117. When the Tm has reached the time of burst control time data TD(n), the controller IC2 instructs the burst control circuit 14 to complete the chopping operation to turn off the switching element Q2 at step S118 and time t19 in FIG. 11.

Subsequent steps from S119 and S120 are identical to the steps 17 and S18 of the flowchart in FIG. 2, and thus descriptions thereof will be omitted.

If no new intensity/color adjustment signal data Va(n) is received at step S120 ("No" at step S120), the flow returns to step S102, and steps S102 to S120 are repeated. When the flow returns to step S102 from step S120, the light source switch Q3 is turned on instead of the light source switch Q6.

If new intensity/color adjustment signal data Va(n) is received at step S120 ("Yes" at step S120), the controller IC2 stores the newly received intensity/color adjustment signal data Va(n) in the sub memory SM.

Further, the controller IC2 reads from the table T5 the burst control time data TA(n), TB(n), TC(n) and TD(n), the output control time data ta(n), tb(n), tc(n) and td(n), and the inrush current suppression control time data tx(n) in association with the newly received intensity/color adjustment signal data Va(n). Then, the controller IC2 stores the read data into the main memory MM at step S121.

Then, the flow returns to step S102, and the processes from steps S102 to S120 are repeated. In addition, by the processes at steps S121 and S102, the light source switch Q3 is turned on instead of the light source switch Q6.

In accordance with the present modification, among cases in which light source switches are switched over from a light source switch connected to a light source of a relatively great voltage drop to a light source switch connected to a light source of a relatively small voltage drop, the inrush current suppression control is conducted in the case where the difference in voltage drops is of the greatest value.

As described above, an inrush current can be suppressed in the illumination apparatus 200 in accordance with the present modification as well.

Further, in accordance with the present modification, the output control time data ta(n), tb(n), tc(n) and td(n) and the inrush current suppression control time data tx(n) are constant values. Therefore, when new intensity/color adjustment signal data Va(n) is received at step S121, only the burst control time data TA(n), TB(n), TC(n) and TD(n) may be read from the table T5 and stored in the main memory MM.

(Summary of Fourth Modification)

The features of the illumination apparatus 200 and the lighting device 202 in accordance with the present modification can be summarized as follows. For an inrush current suppression control, the controller IC2 intermittently turns on and off the light source switch Q3 during the first inrush current suppression period tx(n). The first inrush current suppression period tx(n) is shorter than the ON-period of the light source switch Q3 (ta(n)) included in a series load circuit (the series load circuit 30 in the present modification) for which inrush current suppression control is performed.

Accordingly, at the time when the light source switch Q6 of the greatest voltage drop is turned off and the light source switch Q3 of the smallest voltage drop is turned on, the current flowing in the series load circuit 30 can be limited and, thus, an inrush current can be suppressed.

(Fifth Modification)

The illumination apparatus in accordance with the fifth modification has the same configuration as the illumination apparatus 100 shown in FIG. 1. In addition, the table T1 in the microcomputer IC2 is also the same, but the operation of the illumination apparatus 100 is different.

Specifically, in the illumination apparatus 100 in accordance with the first embodiment, each chopping operation by the semiconductor device IC1 is started simultaneously with the switchover of the light source switches Q3 to Q6 (see t1, t3, t5 and t7 in FIG. 3). In contrast, in the illumination apparatus 100 in accordance with the present modification, each chopping operation by the semiconductor device IC1 is started after a short time interval ΔT has elapsed since the light source switches Q3 to Q6 are switched over.

Figure 13:
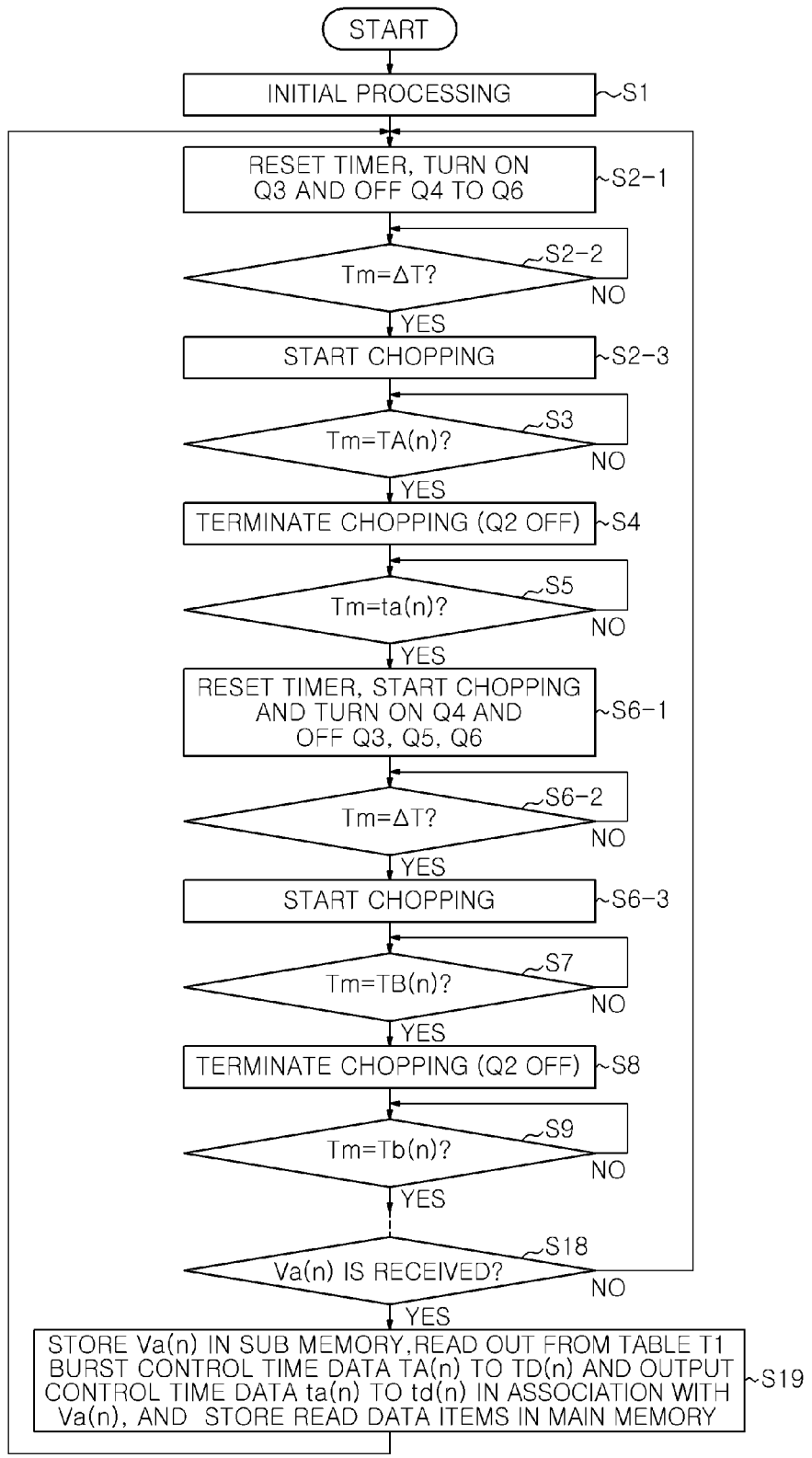
FIG. 13 is a flowchart illustrating control operations by a control unit 20 in accordance with a fifth modification.

FIG. 13 is a flowchart illustrating control operations by the control unit 20 in accordance with the present modification.

The flowchart in FIG. 13 is the same as the flowchart illustrated in FIG. 2, except for steps S2-1 to S2-3 executed instead of step S2. Accordingly, the switchover of the light source switches is conducted a time interval ΔT before the termination of the stop period. In other words, the chopping operation of the switching element Q2 is started after the time interval ΔT has elapsed since a turned-on light source switch is changed from the light source switch Q6 to the light source switch Q3.

Further, steps S6-1 to S6-3 are performed instead of step S6. Accordingly, the chopping operation of the switching element Q2 is started after the time interval ΔT has elapsed since a turned-on light source switch is changed from the light source switch Q3 to the light source switch Q4.

Although steps S10 to S17 are not illustrated in the flowchart in FIG. 13, the same can be applied to steps 10 and 14 of the flowchart in FIG. 2. That is to say, at step S10 in FIG. 2, the chopping operation of the switching element Q2 is started after the time interval ΔT has elapsed since a turned-on light source switch is changed from the light source switch Q4 to the light source switch Q5. Likewise, at step S14 in FIG. 2, the chopping operation of the switching element Q2 is started after the time interval ΔT has elapsed since a turned-on light source switch is changed from the light source switch Q5 to the light source switch Q6.

Figure 14:
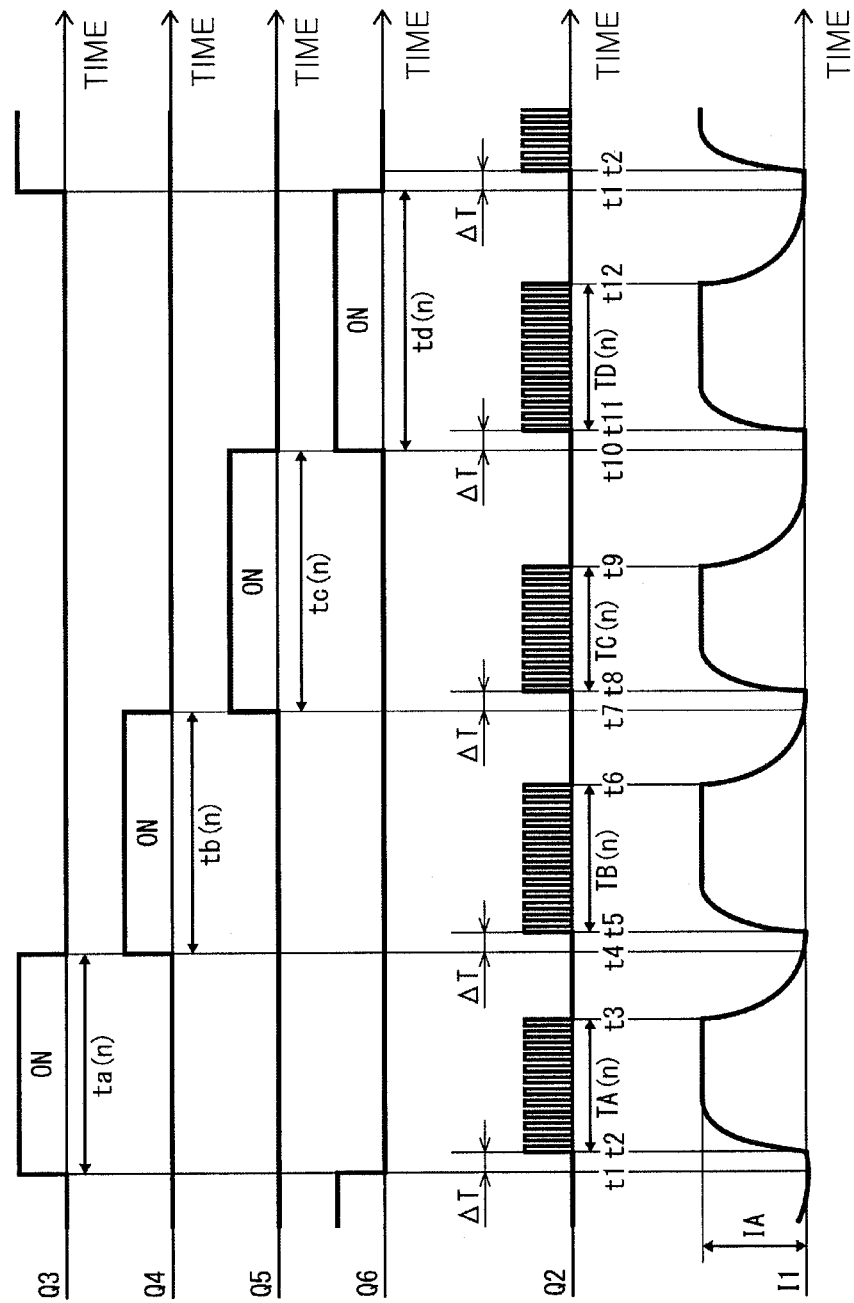
FIG. 14 is a waveform diagram showing gate voltages of light source switches Q3, Q4, Q5 and Q6, a gate voltage of a switching element Q2, and a current I1 output from a power unit 10 in an illumination apparatus of the fifth modification.

FIG. 14 is a waveform diagram showing results of the control operations. In FIG. 14, gate voltages of the light source switches Q3 to Q6, a gate voltage of the switching element Q2, and the current I1 output from the power unit 10 are shown.

As shown in FIG. 14, the switchover of the light source switches Q3 to Q6 is performed earlier than the completion of the stop period by the time interval ΔT (between t1 and t2, t4 and t5, t7 and t8, and t10 and t11 in FIG. 14).

(Effects of Illumination Apparatus 100 in Accordance with Fifth Modification)

In the illumination apparatus 100 in accordance with the first embodiment, the switchover of the light source switch elements Q3 to Q6 is conducted simultaneously with start of chopping operation of the switching element Q2. Therefore, basically no current flows at the time of switchover of the light source switch elements Q3 to Q6. However, if there is somewhat mismatch in the timing so that chopping operation is started earlier than the switchover of the light source switch elements Q3 to Q6, a current may flow at the time of the switchover.

In contrast, in the illumination apparatus 100 in accordance with the present modification, the switchover timing of the light source switches Q3 to Q6 is set to be earlier than the completion timing of the stop period by a time interval ΔT. Accordingly, even if the switchover timing of the light source switches Q3 to Q6 is slightly late or the start timing of chopping operation is early and if the timing deviation amount is less than the time interval ΔT, no current flows when the light source switches Q3 to Q6 are switched over.

Accordingly, in the illumination apparatus 100 in accordance with the present modification, it is ensured that switchover of the light source switches Q3 to Q6 can be conducted when a less current flows.

Therefore, it is possible to prolong the life spans of the light source switches Q3 to Q6 and the LED groups 3 to 6.

(Sixth Modification)

The illumination apparatus in accordance with the sixth modification has the same configuration as the illumination apparatus 100 shown in FIG. 1. In addition, the table T1 in the microcomputer IC2 is also the same, but the order of turning on the light source switches Q3 to Q6 is different from that of the first embodiment.

Figure 15:
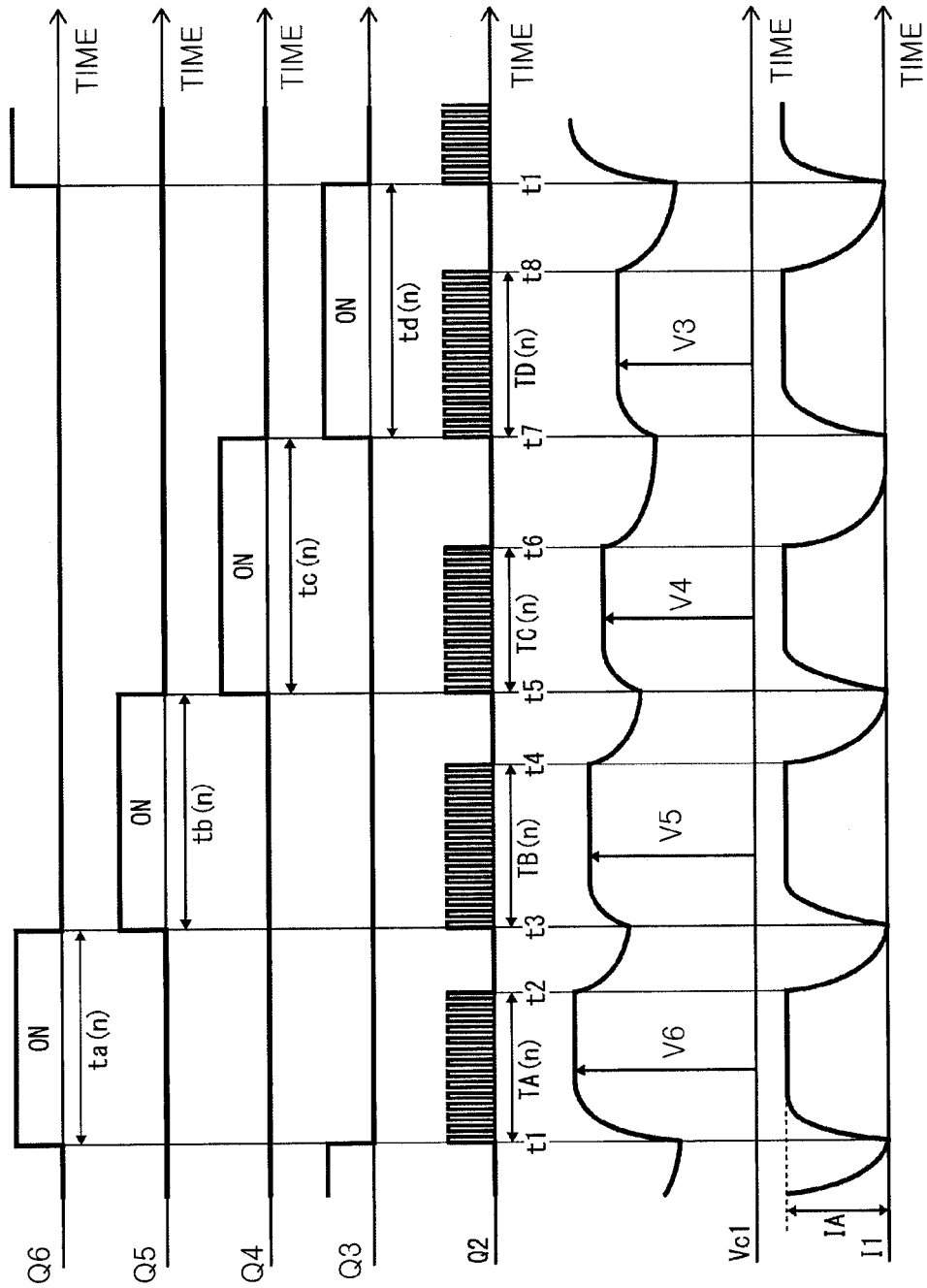
FIG. 15 is a timing chart for illustrating operations of a lighting device and an illumination apparatus in accordance with a sixth modification.

FIG. 15 is a timing chart for showing control operations in an illumination apparatus 100 in accordance with the present modification. Specifically, in FIG. 15, gate voltages of the lighting source switches Q3 to Q6, a gate voltage of a switching element Q2, an output voltage Vc1 at the output terminals of a power unit 10, and an output current I1 output from the power unit 10 are illustrated. As shown in FIG. 15, in the illumination apparatus 100 in accordance with the present modification, turning on the light source switches Q3 to Q6 is conducted in the order of Q6>Q5>Q4->Q3. Further, the magnitudes of the voltage drops V3, V4, V5 and V6 of the LED groups 3 to 6, respectively, have the relationship of V6 >V5 >V4 >V3.

That is, for the order of turning on light source switches in accordance with the present modification, turning on the light source switches is conducted from one connected to a LED group of the greatest voltage drop to one connected to a LED group of the second greatest voltage drop, and the like. By doing so, a voltage drop across an LED group connected to a light source switch to be turned on next is greater than the output voltage Vc1 at the termination of a stop period and, therefore, an inrush current shown in FIG. 8 does not occur.

Among cases of switching over from a light source switch connected to a light source of a relatively great voltage drop to a light source switch connected to a light source of a relatively small voltage drop, the greatest inrush current may flow in the case where the difference in voltage drops of light sources respectively connected to a light source switch being turned off and a light source switch being turned on is greatest.

In the present modification, the difference in voltage drops is greatest when the light source switches Q6 and Q3 are switched over (i.e., Q6→Q3). The lighting device 2 and the illumination apparatus 100 in accordance with the present modification, however, have the features described above and, thus, the combination of light source switches causing the greatest difference in voltage drops before and after the switchover can be avoided. Accordingly, it is possible to prevent an excessive inrush current so that the LED groups and the light source switches are less stressed, and lifespans of the lighting device and the illumination apparatus can be prolonged.

In the lighting device 2 in accordance with the present modification, among the at least three LED groups, i.e., LED groups 3 to 6, it is the light source switch Q6 connected to the LED group 6 of the greatest voltage drop that is to be turned on next to the light source switch Q3 connected to the LED group 3 of the smallest voltage drop (back to the first in the repeated turning-on order).

In the repeated turning-on order, there is no possibility that the light source switch Q3 connected to the LED group 3 of the smallest voltage drop is turned on next to the light source switch Q6 connected to the LED group 6 of the greatest voltage drop. Therefore, it is possible that switchover of light source switches Q6 and Q3 (i.e., Q6→Q3) which causes the greatest difference in voltage drops is avoided. Further, an excessive inrush current is suppressed, so that damage and stress to the light sources and light source switches are relieved, and the lifespan of the illumination apparatus can be prolonged.

(Seventh Modification)

Figure 16:
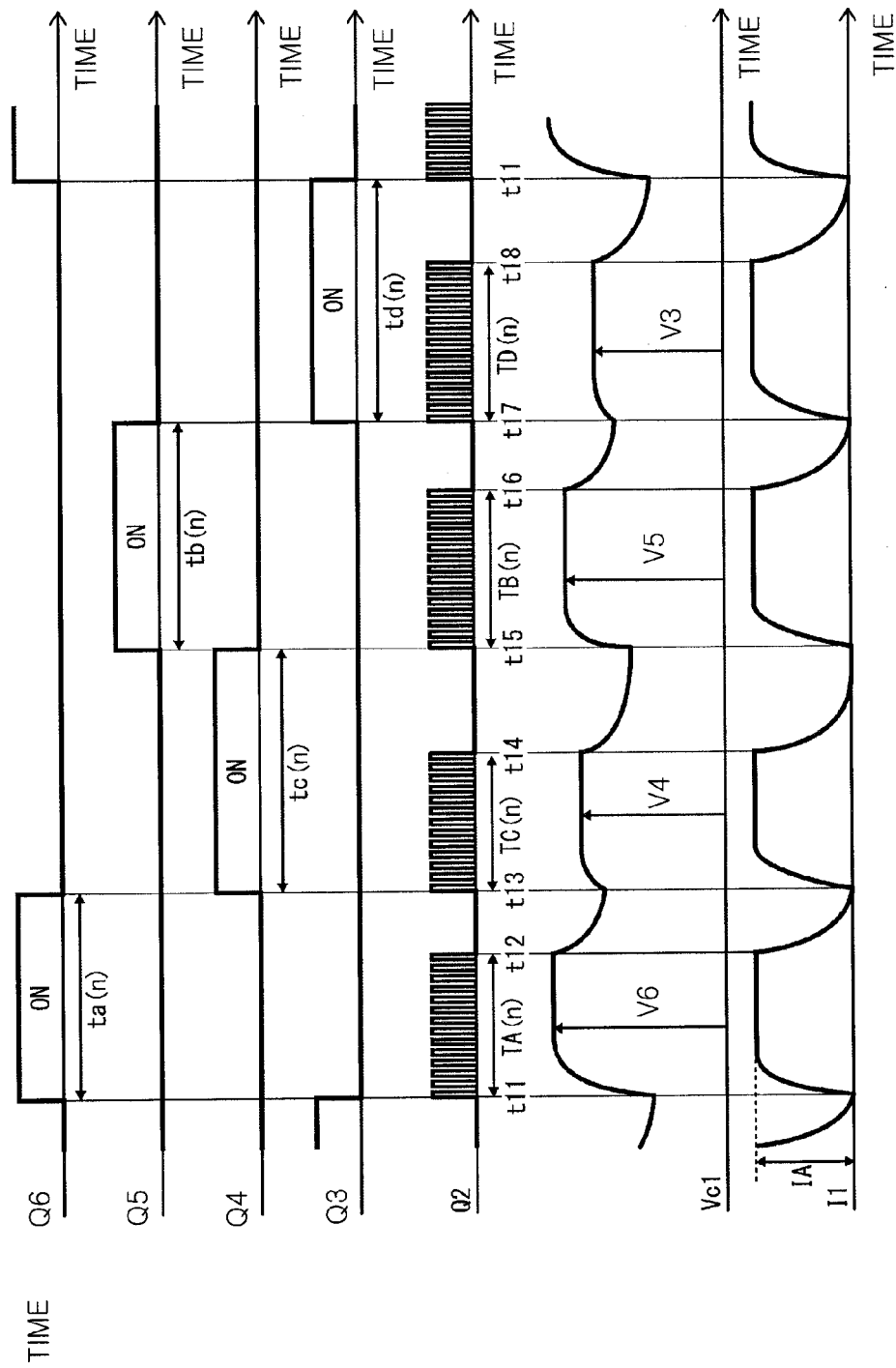
FIG. 16 is a timing chart for illustrating operations of a lighting device and an illumination apparatus in accordance with a seventh modification.

FIG. 16 is a timing chart for showing control operations in an illumination apparatus in accordance with the seventh modification. Specifically, in FIG. 16, the output voltage Vc1 at the output terminals of the power unit 10, the output current I1 output from the power unit 10, the gate voltage of the switching element Q2, and gate voltages of the lighting source switches Q3 to Q6 are presented.

The illumination apparatus in accordance with the present modification has the same basic configurations as the illumination apparatus 100 in accordance with the first embodiment, such as components, circuit configuration and parameter values stored in tables.

The only difference lies in the order of turning on light source switches Q3 to Q6 repeatedly performed as Q6→Q4→Q5→Q3, as shown in FIG. 16. In the repeated order of turning on light source switches in accordance with the present modification, the light source switch Q4 (connected to the LED group 4 of the second smallest voltage drop) is turned on next to the light source switch Q6 (connected to the LED group of the greatest voltage drop). Also in this turning-on order, the difference in voltage drops before and after switchover of light source switches is smaller than the difference in voltage drops in the case where the light source switch Q3 (connected to the LED group 3 of the smallest voltage drop) is turned on next to the light source switch Q6 (connected to the LED group 6 of the greatest voltage drop) (i.e., Q6→Q3). Accordingly, an inrush current can be suppressed. Therefore, LEDs or light source switches can be less stressed, and lifespans of the lighting device and the illumination apparatus can be prolonged.

(Eighth Modification)

Figure 17:
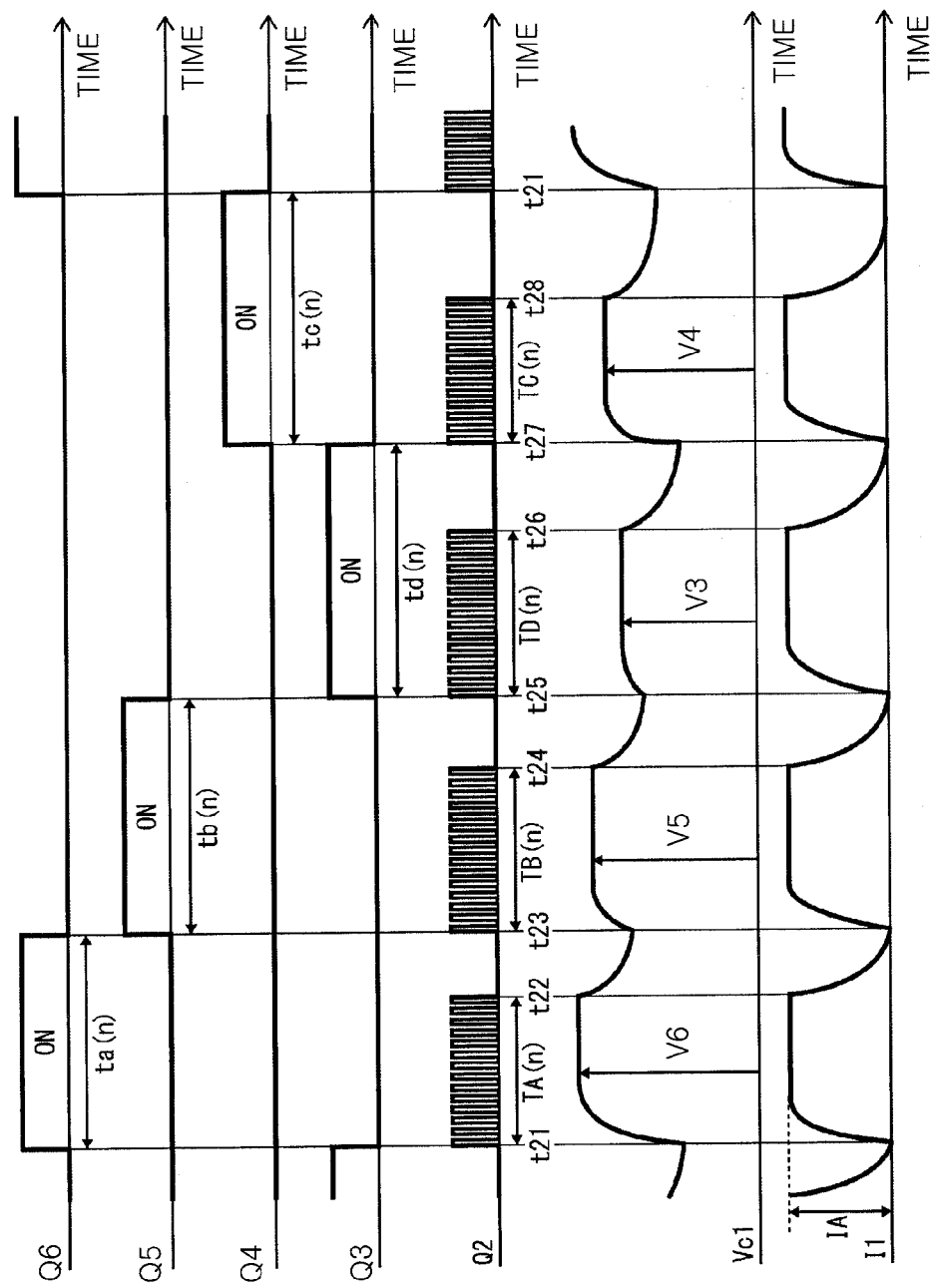
FIG. 17 is a timing chart for illustrating operations of a lighting device and an illumination apparatus in accordance with an eighth modification.

FIG. 17 is a timing chart for showing control operations in an illumination apparatus in accordance with the eighth modification. Specifically, in FIG. 17, the output voltage Vc1 at the output terminals of the power unit 10, the output current I1 output from the power unit 10, the gate voltage of the switching element Q2, and gate voltages of the lighting source switches Q3 to Q6 are shown. The illumination apparatus in accordance with the present modification has the same basic configurations as the illumination apparatus 100 in accordance with the first embodiment, such as components, circuit configuration, and parameter values stored in tables. The only difference lies in the order of turning on the light source switch Q3 to Q6 repeatedly performed as Q6→Q5→Q3→Q4, as shown in FIG. 17.

In the repeated order of turning on light source switches Q3 to Q6 in accordance with the present modification, the light source switch Q3 (connected to the LED group 3 of the smallest voltage drop) is next to the light source switch Q5 (connected to the LED group 5 of the second greatest voltage drop). Also in this turning-on order, the difference in voltage drops before and after the switchover of light source switches is smaller than the difference in voltage drops in the case where the light source switch Q3 (connected to the LED group 3 of the smallest voltage drop) is turned on next to the light source switch Q6 (connected to the LED group 6 of the greatest voltage drop) (i.e., Q6→Q3). Accordingly, an inrush current can be suppressed. Therefore, LEDs or light source switches can be less stressed, and lifespans of the lighting device and the illumination apparatus can be prolonged.

(Ninth Modification)

Figure 18:
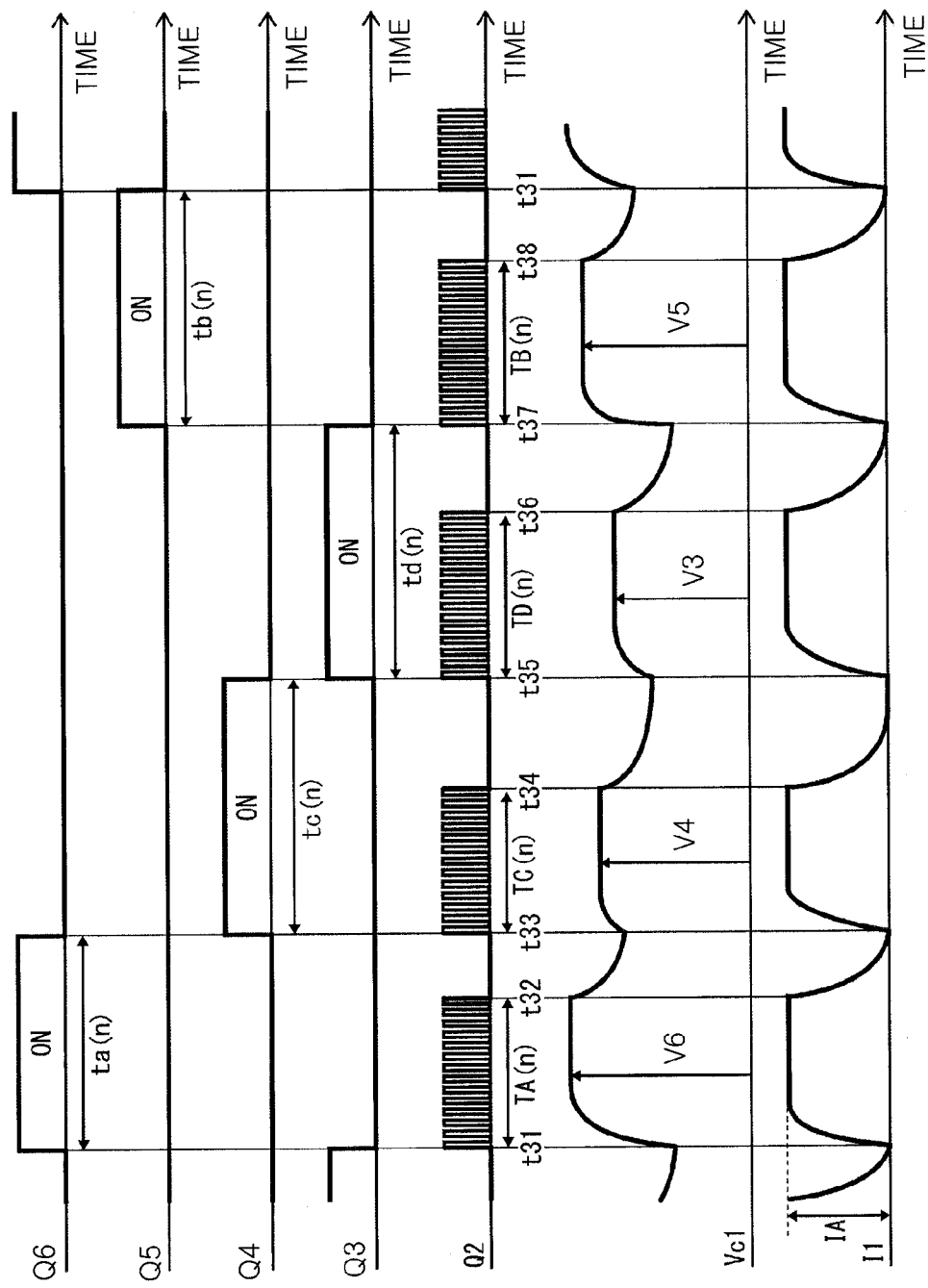
FIG. 18 is a timing chart for illustrating operations of a lighting device and an illumination apparatus in accordance with a ninth modification.

FIG. 18 is a timing chart for showing control operations for an illumination apparatus in accordance with the ninth modification. Specifically, in FIG. 18, the output voltage Vc1 at the output terminals of the power unit 10, the output current I1 output from the power unit 10, the gate voltage of the switching element Q2, and gate voltages of the lighting source switches Q3 to Q6 are shown. The illumination apparatus in accordance with the present modification has the same basic configurations as the illumination apparatus 100 in accordance with the first embodiment, such as components, circuit configuration and parameter values stored in tables. The only difference lies in the order of turning on the light source switches Q3 to Q6 repeatedly performed as Q6→Q4→Q3→Q5, as shown in FIG. 18.

In the repeated order of turning on light source switches Q3 to Q6 in accordance with the present modification, the light source switch Q4 connected to the LED group 4 of the second smallest voltage drop is next to the light source switch Q6 connected to the LED group 6 of the greatest voltage drop. Also in this turning-on order, the difference in voltage drops before and after the switchover of light source switches is smaller than the difference in voltage drops in the case where the light source switch Q3 (connected to the LED group 3 of the smallest voltage drop) is turned on next to the light source switch Q6 (connected to the LED group 6 of the greatest voltage drop) (i.e., Q6→Q3). Accordingly, an inrush current can be suppressed. Therefore, LEDs or light source switches can be less stressed, and lifespans of the lighting device and the illumination apparatus can be prolonged.

(Second Embodiment)

Figure 19:
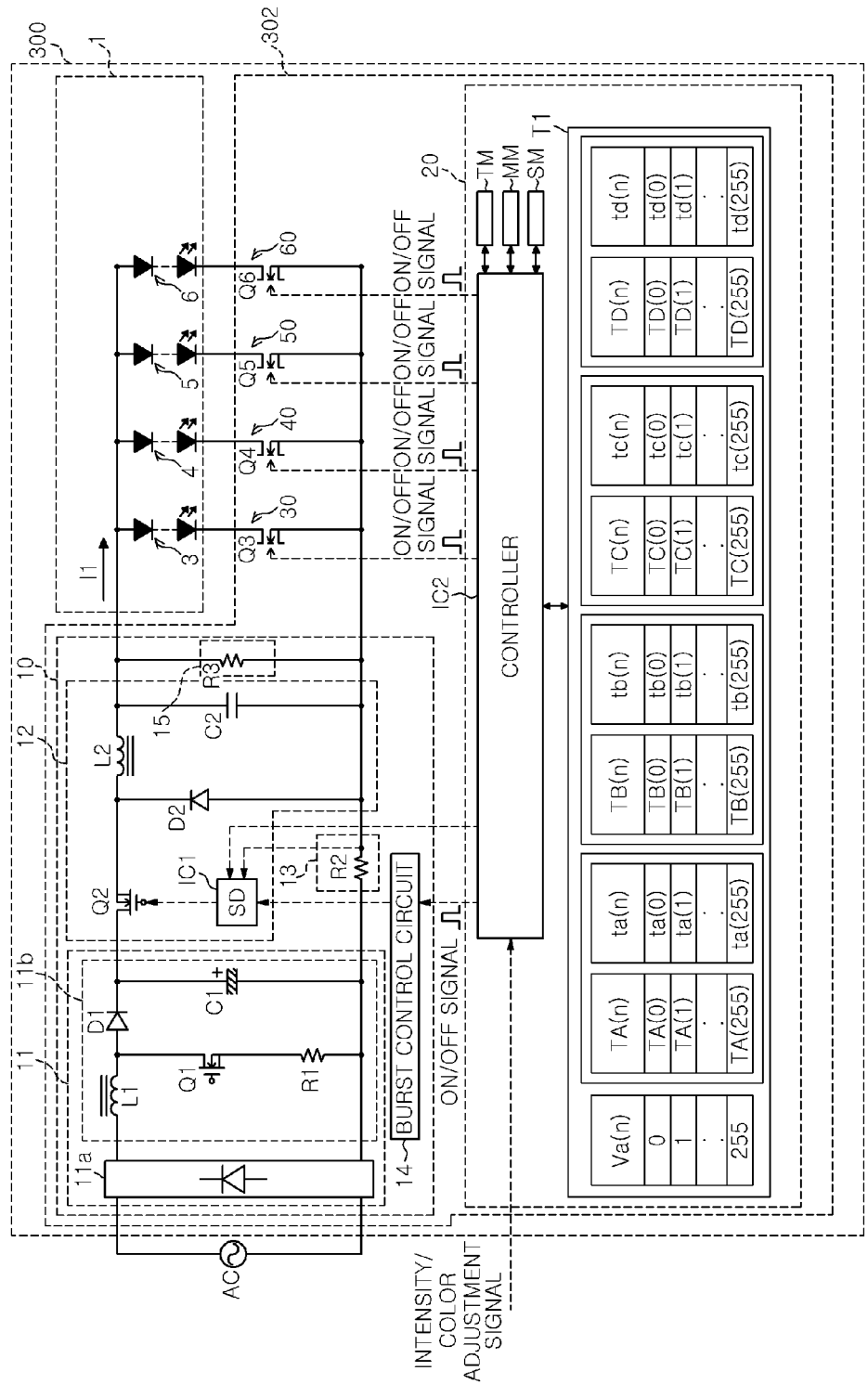
FIG. 19 is a circuit block diagram of an illumination apparatus 300 in accordance with a second embodiment.

FIG. 19 is a circuit block diagram of an illumination apparatus 300 in accordance with a second embodiment. In FIG. 19, the same elements as in the illumination apparatus 100 shown in FIG. 1 are denoted by the like numerals. The illumination apparatus 300 in accordance with the second embodiment has the same configuration as the illumination apparatus 100 in accordance with the first embodiment, except for that a discharge circuit 15 is connected between the output terminals of the output control unit 12 of the power unit 10 in a lighting device 302.

The operations of the illumination apparatus 300 are basically the same as those of the illumination apparatus 100 in accordance with the first embodiment. The control unit 20 performs control operations based on the flowchart in FIG. 2. The discharge circuit 15 provided in the power unit 10 is connected in parallel to four series load circuits 30, 40, 50 and 60. The discharge circuit 15 facilitates release of electric charges accumulated in the capacitor C2 while the switching element Q2 is in an off-state.

The discharge circuit 15 includes an impedance element, which is a resistor R3 in the present embodiment. However, the impedance element is not limited to the resistor R3 but may be any impedance element as long as it causes electric charges accumulated in the capacitor C2 to be released. For example, the discharge circuit 15 may be an LC circuit including a coil and a capacitor, or an inductance circuit.

As such, since the illumination apparatus 300 in accordance with the present embodiment includes the discharge circuit 15 at the output terminals of the power unit 10 in parallel to the series load circuits, electric charges accumulated in the capacitor C2 are released faster via the resistor R3 during a stop period of chopping operation, compared to the illumination apparatus 100. Therefore, the current I1 can decrease and the voltage Vc1 can be lowered faster during the stop period, so that the current I1 approximates zero in a shorter period of time.

Accordingly, the illumination apparatus 300 can achieve the same effect of suppressing an inrush current as the illumination apparatus 100 even if the length of the stop period is set to be shorter than in the illumination apparatus 100.

Therefore, it is possible that the LEDs or the light source switches can be less stressed, and lifespans of the lighting device and the illumination apparatus can be prolonged.

Moreover, by setting the length of the stop period to be shorter, one cycle in which the light source switches Q3 to Q6 are sequentially switched can be shorter, so that flickering may not occur.

Although a current flows in the discharge circuit 15 even during the time period of chopping operation, the current flowing in the discharge circuit 15 is not involved in lighting. Accordingly, it is preferable for the discharge circuit 15 to use an impedance element having an impedance at least ten times the highest one of impedances of the series load circuits 30, 40, 50 and 60, so that a small current flows in the discharge circuit 15.

(Third Embodiment)

Figure 20:
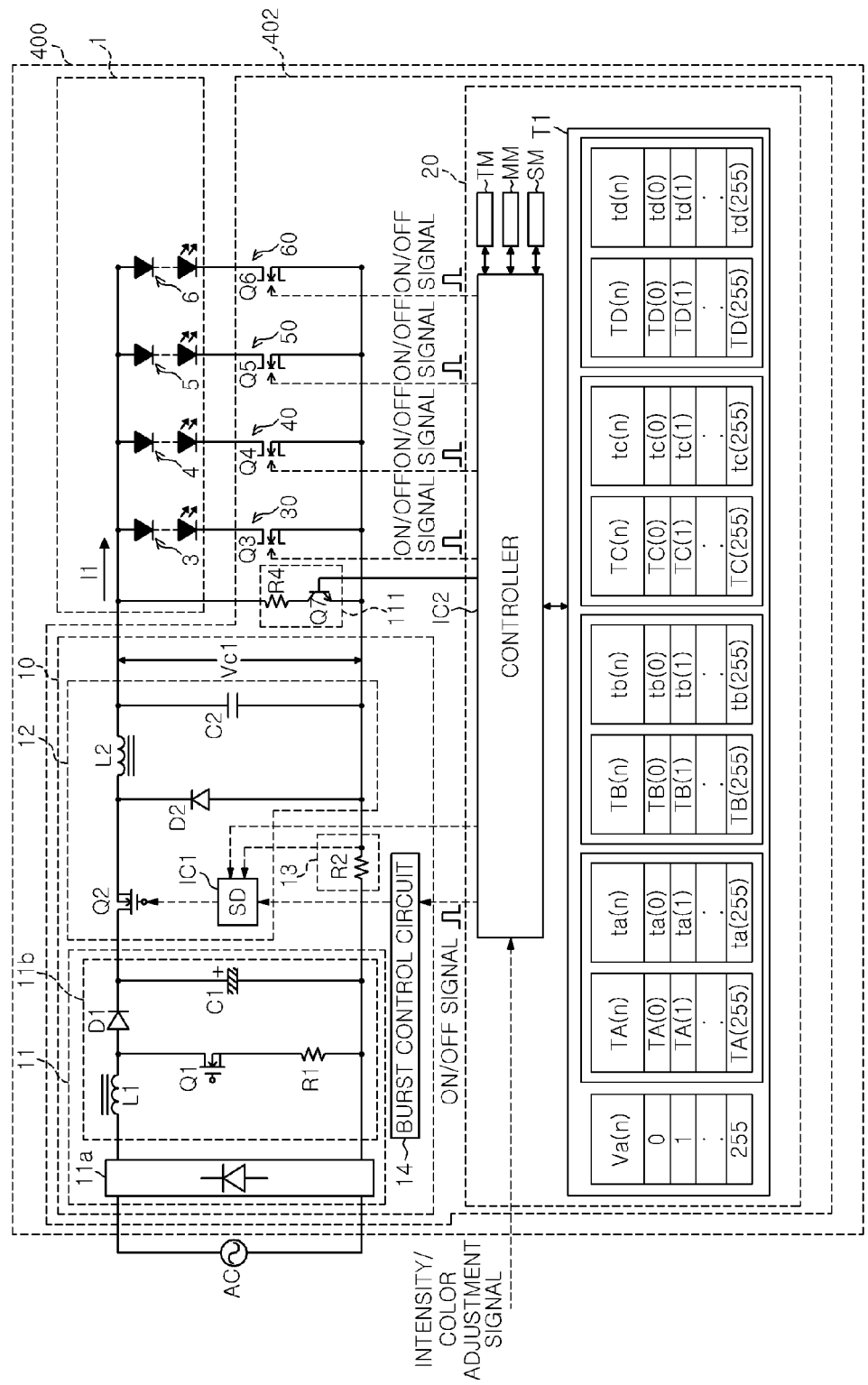
FIG. 20 is a circuit block diagram of a lighting device and an illumination apparatus in accordance with a third embodiment.

FIG. 20 is a circuit block diagram of an illumination apparatus 400 in accordance with the third embodiment. In FIG. 20, the same elements as in the illumination apparatus 100 shown in FIG. 1 are denoted by the like numerals.

The illumination apparatus 400 in accordance with the present embodiment has the same configurations as the illumination apparatus 100 in accordance with the first embodiment, except for that an inrush current suppression circuit 111 which is connected between output terminals of output control circuit 12 in parallel to the series load circuit 30, 40, 50 and 60. The inrush current suppression circuit 111 includes a resistor R4 as an impedance element and a switching element Q7 connected in series to the resistor R4.

The inrush current suppression circuit 111 is connected between the output terminals of the output control circuit 12 in parallel to the series load circuits 30, 40, 50 and 60. When the switching element Q7 is turned on, electric charges in the capacitor C2 of the output control circuit 12 are released via the resistor R4. The impedance element is not limited to the resistor but may be an LC circuit including a coil and a capacitor.

Hereinafter, control operations performed by the controller IC2 based on the table T1 when the intensity/color adjustment signal data Va(n) is input will be described with reference to FIGS. 21 and 22. Parts of the control operations identical to those performed by the control unit 20, i.e., the controller IC2 described by referring to the flowchart in FIG. 2 in accordance with the first embodiment will be omitted.

Figure 21:
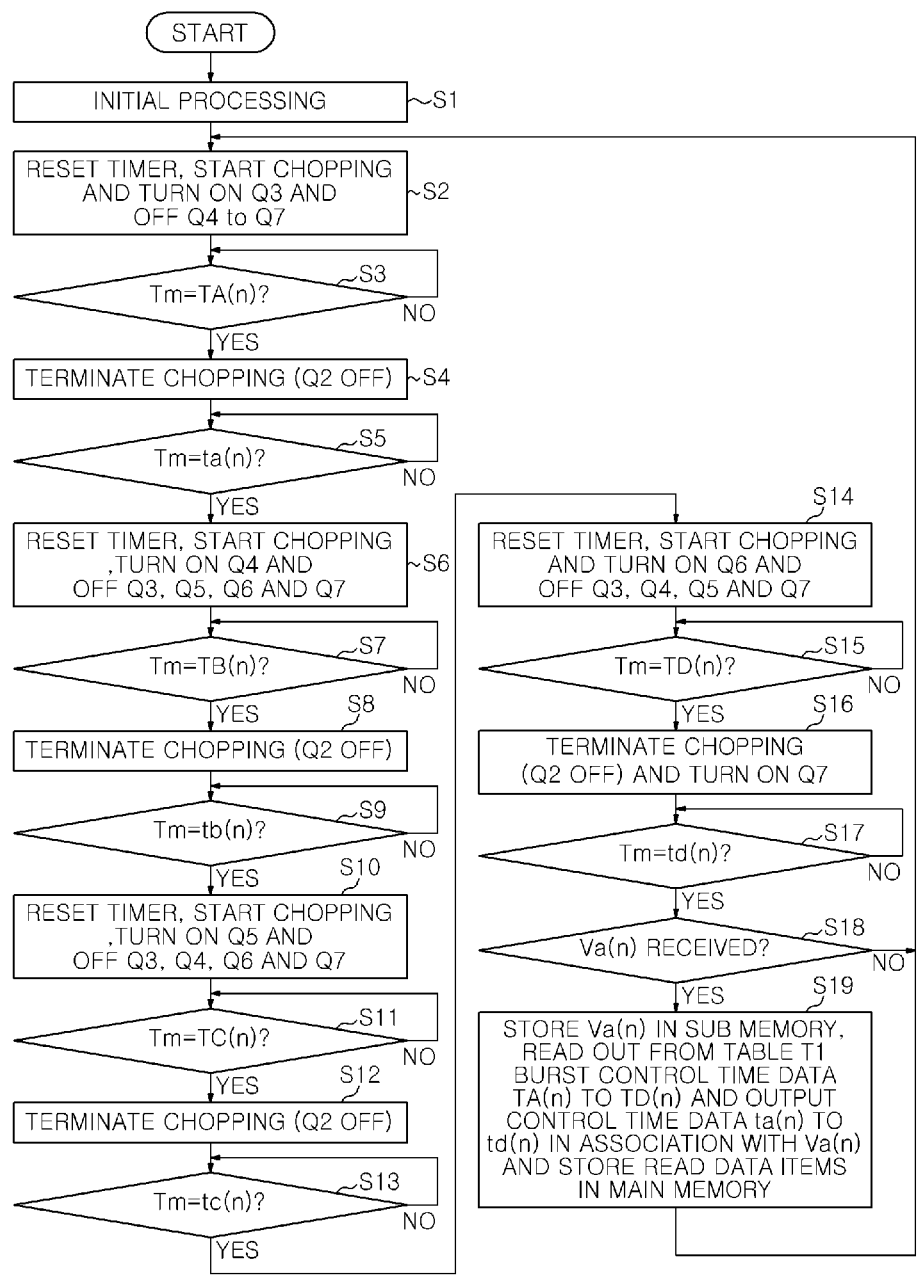
FIG. 21 is a flowchart for illustrating operations by a controller shown in FIG. 20.

FIG. 21 is a flowchart illustrating control operations by the controller IC2. FIG. 22 is a timing chart presenting gate voltages of the light source switches Q3 to Q6, gate voltages of switching elements Q2 and Q7, a voltage Vc1 at the output terminals of a power unit 10 and an output current I1 output from the power unit 10 in the control operations in FIG. 21.

When a power is supplied to the illumination apparatus 400, the flow in FIG. 21 is started and the initial processing is carried out at step S1.

Then, the controller IC2 resets the timer TM to start it and instructs the burst control circuit 14 to start a chopping operation. In addition, the controller IC2 turns on the light source switch Q3 and turns off the light source switches Q4, Q5, Q6 and Q7 at step S2 and time t1 in FIG. 22.

Next, it is monitored whether the value Tm of the timer TM has reached TA(n) or not at step S3.

Figure 22:
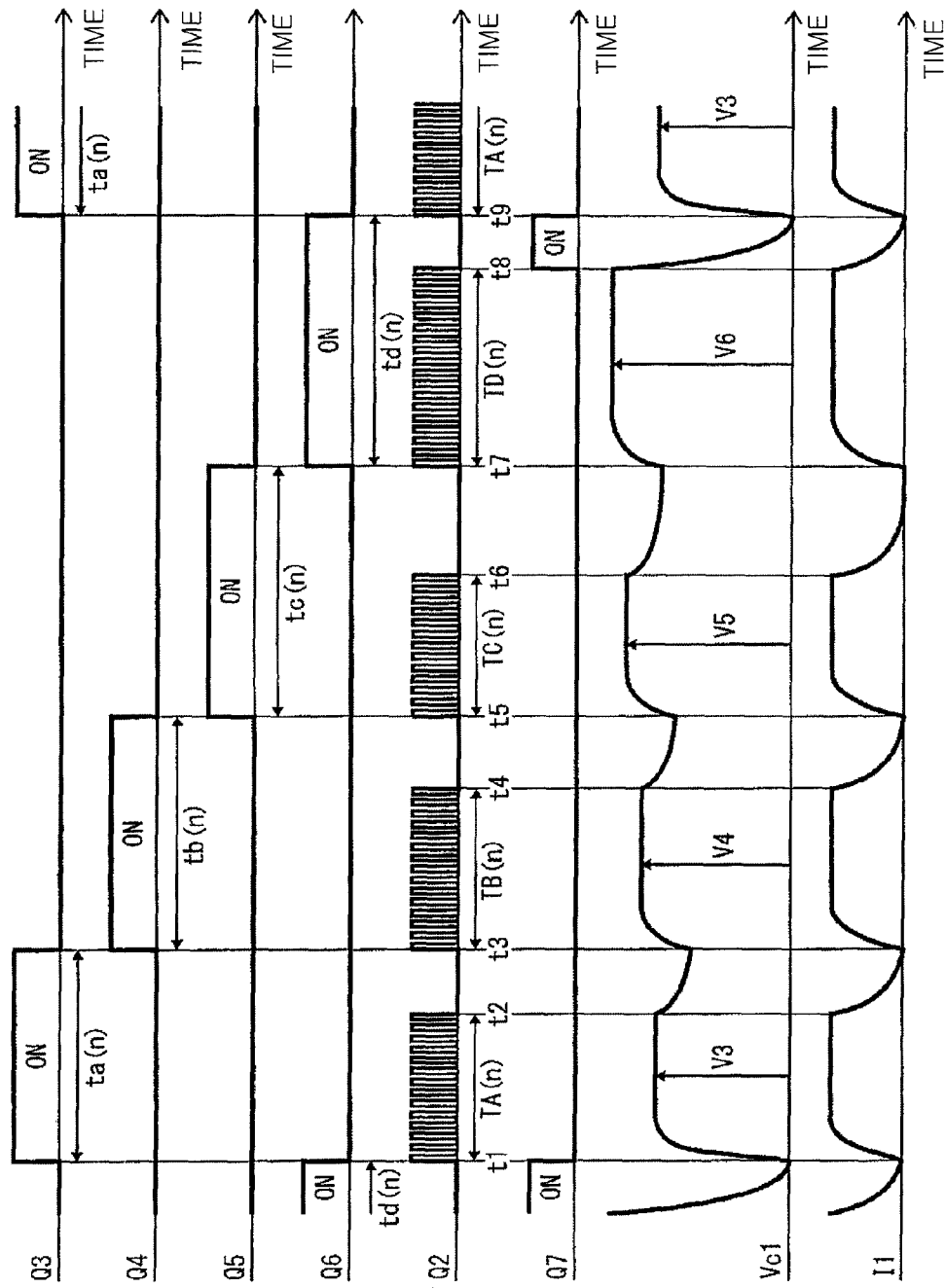
FIG. 22 is a timing chart for illustrating operations of a lighting device and an illumination apparatus in accordance with the third embodiment.

If the value Tm has reached TA(n) ("Yes" at step S3), the controller IC2 instructs the burst control circuit 14 to complete the chopping operation and, thus, the switching element Q2 is turned off at step S4 and time t2 in FIG. 22. Subsequently, it is monitored whether Tm has reached ta(n) or not at step S5. If Tm has reached ta(n) ("Yes" at step S5), the controller IC2 resets the timer TM to start it and instructs the burst control circuit 14 to start the chopping operation. In addition, the controller IC2 turns on the light source switch Q4 and turns off the light source switches Q3, Q5 and Q6 and the switching element Q7 at step S6 and time t3 in FIG. 22. With this, the light source switch Q4 is turned on instead of the light source switch Q3.

As a result of control through steps S2 to S5, the switching element Q2 is intermittently turned on and off between times t1 and t2 corresponding to the burst control time data TA(n), so that the output current I1 flows in the LED group 3 and the LED group 3 is lit to emit a red light. Further, the switching element Q2 remains in an off-state between times t2 and t3 and the output current I1 does not flow, so that the LED group 3 is not lit.

Next, it is monitored whether Tm has reached TB(n) or not at step S7. If Tm has reached the TB(n) ("Yes" at step S7), the controller IC2 instructs the burst control circuit to complete the chopping operation and, thus, the switching element Q2 is turned off at step S8 and time t4 in FIG. 22.

Subsequently, it is monitored whether Tm has reached tb(n) or not at step S9. If Tm has reached tb(n) ("Yes" at step S9), the controller IC2 resets the timer TM to start it and instructs the burst control circuit 14 to start the chopping operation. Further, the controller IC2 turns on the light source switch Q5 and turns off the light source switches Q3, Q4 and Q6 and the switching element Q7 at step S10 and time t5 in FIG. 22. With this, the light source switch Q5 is turned on instead of the light source switch Q4.

As a result of control through steps S6 to S9, the switching element Q2 is intermittently turned on and off between times t3 and t4 corresponding to the burst control time data TB(n), so that the output current I1 flows in the LED group 4 and the LED group 4 is lit to emit a green light. Further, the switching element Q2 remains in an off-state between times t4 and t5 and the output current I1 does not flow, so that the LED group 4 is not lit.

Next, it is monitored whether Tm has reached TC(n) or not at step S11. If Tm has reached the TC(n) ("Yes" at step S11), the controller IC2 instructs the burst control circuit 14 to complete the chopping operation and, thus, the switching element Q2 is turned off at step S12 and time t6 in FIG. 22.

Subsequently, it is monitored whether Tm has reached tc(n) or not at step S13. If Tm has reached tc(n) ("Yes" at step S13), the controller IC2 resets the timer TM to start it and instructs the burst control circuit 14 to start the chopping operation. In addition, the controller IC2 turns on the light source switch Q6 and turns off the light source switches Q3, Q4 and Q5 and the switching element Q7 at step S14 and time t7 in FIG. 22. With this, the light source switch Q6 is turned on instead of the light source switch Q5.

As a result of control through steps S10 to S13, the switching element Q2 is intermittently turned on and off between times t5 and t6 corresponding to the burst control time data TC(n), so that the output current I1 flows in the LED group 5 and the LED group 5 is lit to emit a blue light. Further, the switching element Q2 remains in an off-state between times t6 and t7 and the output current I1 does not flow, so that the LED group 5 is not lit.

Next, it is monitored whether Tm has reached TD(n) or not at step S15. If Tm has reached TD(n) ("Yes" at step S15), the controller IC2 instructs the burst control circuit 14 to complete the chopping operation to turn off the switching element Q2, and the switching element Q7 is turned on to start the inrush current suppression control at step S16 and time t8 in FIG. 22. At this time, the light source switches Q3, Q4 and Q5 remains in an off-state while the light source switch Q6 is in an on-state.

When the switching element Q7 is turned on and the inrush current suppression control is started, electric charges in the capacitor C3 are released via the resistor R4, so that the output voltage Vc1 at the output terminals of the power unit 10 decreases. The control process of turning on the switching element Q7 by the controller IC2 is the inrush current suppression control in accordance with the present embodiment.

Subsequently, it is monitored whether Tm has reached td(n) or not at step S17. If Tm has reached td(n), the controller IC2 determines whether or not new intensity/color adjustment signal data Va(n) has been received (i.e., whether or not a user has changed intensity/color adjustment setting and new intensity/color adjustment signal data Va(n) is input) at step S18. If no new intensity/color adjustment signal data Va(n) has been received (i.e., the user did not changed the intensity/color adjustment setting) ("No" at step S18), the flow returns to step S2, and steps S2 to S18 are repeated. If the flow returns to step S2 from step S18, the light source switch Q3 is turned on instead of the light source switch Q6. At this time, as a result of the release of electric charges by the resistor R4, the voltage Vc1 is reduced to a sufficiently low value (e.g., to a value lower than V3, in this instance) before the light source switch Q3 is turned on. (in the present embodiment, voltage Vc1 is lowered to zero). Accordingly, no inrush current flows when the light source switch Q3 is turned on next.

As a result of the control through steps S14 to S18 and step S2, the LED group 6 is lit between times t7 and t8 corresponding to the burst control time data TD(n) so as to emit a white light. Further, between times t8 and t9, the switching element Q2 remains in an off-state and the output current I1 does not flow, so that the LED group 6 is not lit. If new intensity/color adjustment signal data Va(n) is received at step S18 (i.e., a user has changed the intensity/color adjustment setting) ("Yes" at step S18), the controller IC2 stores the newly received intensity/color adjustment signal data Va(n) in the sub memory SM. Further, the controller IC2 reads from the table T1 the burst control time data TA(n), TB(n), TC(n) and TD(n) and the output control time data ta(n), tb(n), tc(n) and td(n) corresponding to the newly received intensity/color adjustment signal data Va(n) and stores the read data items in the main memory MM at step S19.

Then, the flow returns to step S2 and the processes from steps S2 to S18 are repeated.

In addition, by the processes of steps S19 and S2, the light source switch Q3 is turned on instead of the light source switch Q6. At this time, as described above, as a result of the release of electric charges by the resistor R4, the voltage Vc1 is reduced to a sufficiently low value before the light source switch Q3 is turned on. Therefore, no inrush current flows when the light source switch Q3 is turned on.

As shown in FIG. 22, in accordance with the present embodiment, during the stop periods between t2 and t3, t4 and t5, and t6 and t7 of chopping operations where no inrush current suppression control is conducted, the voltage Vc1 at the output terminals of the output control circuit 12 is reduced to a somewhat low value, but not zero. Accordingly, depending on the order of switching over the light source switches, as shown in FIG. 8, the voltage Vc1 lowered during a stop period may be greater than a voltage drop across a light source connected to a light source switch to be turned on next. When it happens, an inrush current may occur at the time of switching over the light source switches.

On the other hand, as shown in FIG. 22, in the illumination apparatus 400 in accordance with the present embodiment, the controller IC2 turns on the switching element Q7 in the inrush current suppression circuit 111 after the light source switch Q6 is turned off until the light source switch Q3 is turned on next, thereby performing the release of the electric charges by the resistor R4. With this, the voltage Vc1 is reduced to a value lower than the voltage drop V3 (down to zero in the present embodiment) before the light source switch Q3 is turned on. Therefore, an inrush current can be suppressed when the light source switch Q3 is turned on. As described above, the inrush current suppression control in accordance with the present embodiment is the control process of turning on the switching element Q7 to cause electric charges to be released via the resistor R4 and to thereby reducing the voltage Vc1.

Further, the controller IC2 performs the inrush current suppression control simultaneously with switchover to be described below to suppress an inrush current from flowing in a series load circuit after the switchover. That is, in the repeated order of switching over the light source switch Q3 to Q6, among cases of switching from a light source switch connected to a light source of a relatively great voltage drop to a light source switch connected to a light source of a relatively small voltage drop, the inrush current suppression control is conducted in the case where the difference in voltage drops of LED groups respectively connected to a light source switch being turned off and a light source switch being turned on is of the greatest value.

In the present embodiment, a voltage drop across a light source connected to a light source switch turned on after switching over the light source switches is smaller than a voltage drop across a light source connected to a light source switch turned on before the switchover only when switchover is conducted from the light source switch Q6 to the light source switch Q3 (i.e., when turning off the light source switch Q6 and turning on the light source switch Q3). Accordingly, the difference in voltage drops becomes greatest at the switching over from the light source switch Q6 to the light source switch Q3.

In addition, the illumination apparatus 400 in accordance with the present embodiment includes LED groups (light sources) 3 to 6 having different voltage drops for the same current flow and a lighting device 402. Among cases of switching over from a light source switch connected to a light source of a relatively great voltage drop to a light source switch connected to a light source of a relatively small voltage drop, the greatest inrush current is likely to flow in the case where the difference in voltage drops of LED groups respectively connected to a light source switch being turned off and a light source switch being turned on becomes greatest (in this instance, switching over from the light source switch Q6 to the light source switch Q3). In the lighting device 402 and the illumination apparatus 400 in accordance with the present embodiment, the inrush current suppression control is conducted in the switchover in which the difference in voltage drops become greatest, so that the greatest inrush current can be suppressed. Therefore, damage and stress to the LEDs and the light source switches can be relieved, and lifespans of the lighting device and the illumination apparatus can be prolonged.

In addition, in the lighting device 402 and the illumination apparatus 400 in accordance with the present embodiment, the inrush current suppression circuit 111 including the impedance element (resistor) R4 and the switching element Q7 connected in series to the impedance element R4 is connected between the output terminals of the output control circuit 12 in parallel to the series load circuit 30, 40, 50 and 60. For the inrush current suppression control, the controller IC2 turns on the switching element Q7.

When the switching element Q7 is turned on, electric charges in the capacitor C2 are released by the impedance element R4, so that the voltage at the output terminals of the output control circuit 12 is reduced. Accordingly, the voltage at the output terminals of the output control circuit 12 is reduced to a value lower than a value of a voltage drop across a light source connected to the light source switch to be turned on next, so that an inrush current can be suppressed when the next light source switch is turned on. Therefore, damage and stress to the LEDs and the light source switches can be relieved, and lifespans of the lighting device and the illumination apparatus can be prolonged.

In the lighting device 402 and the illumination apparatus 400 in accordance with the present embodiment, in the repeated predetermined order of switching over the light source switches, the switchover of the light source switches Q3 to Q6 is conducted from the light source switch Q3 connected to the light source 3 of the smallest voltage drop to the light source switch Q4 connected to the light source 4 of the second smallest voltage drop, and the like. When the ON-period of the light source switch Q6 connected to the light source 6 of the greatest voltage drop is over, the controller IC2 returns to the first of the repeated predetermined order to turn on the light source switch Q3 and conducts the inrush current suppression control.

When a voltage drop after switchover of light source switches is smaller than a voltage drop before the switchover, an inrush current may occur. Meanwhile, when a voltage drop after switchover of the light source switches is greater than a voltage drop before the switchover, the inrush current may not occur. In the lighting device 402 and the illumination apparatus 400 in accordance with the present embodiment, switchover of the light source switches is conducted in the order of from a light source switch connected to an LED group of a relatively small voltage drop to a light source switch connected to an LED group of a relatively large voltage drop.

Accordingly, a voltage drop after switchover of the light source switches is smaller than a voltage drop before the switchover only when switching over from the light source switch Q6 to the light source switch Q3. Therefore, the inrush current suppression control needs to be performed only at the switching over from the light source switch Q6 to the light source switch Q3 and, thus, it is easier to control. Additionally, although the inrush current suppression control in accordance with the fourth modification described above is implemented in a different way from that of the present embodiment, it exhibits the same effects.

(Fourth Embodiment)

As the inrush current suppression control, the method as described below can also be employed.

Figure 23:
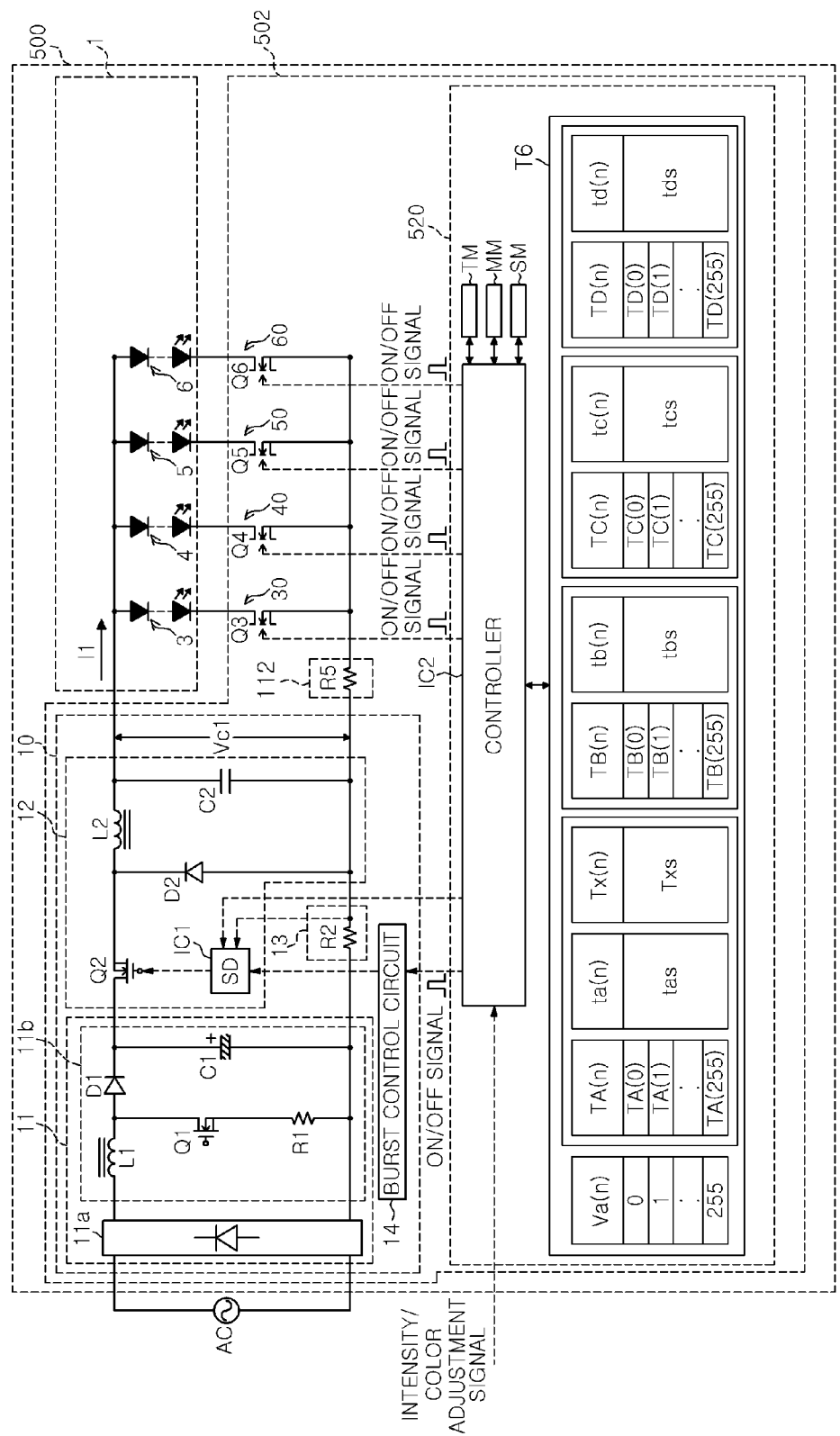
FIG. 23 is a circuit block diagram of a lighting device and an illumination apparatus in accordance with a fourth embodiment.

An illumination apparatus 500 and a lighting device 502 in accordance with the fourth embodiment will be described with reference to FIGS. 23 to 26. FIG. 23 is a circuit block diagram of the illumination apparatus 500 and the lighting device 502 in accordance with fourth embodiment. The illumination apparatus 500 and the lighting device 502 shown in FIG. 23 has the same configurations as the illumination apparatus 100 and the lighting device 2 in accordance with the first embodiment, except for a current detection unit 112 including a resistor R5, and a table T6 in a control unit 520.

In the table T6 in accordance with the present embodiment, burst control time data TA(n), TB(n), TC(n) and TD(n), output control time data ta(n), tb(n), tc(n) and td(n) and inrush current suppression control time data Tx(n) are stored. These data items are in association with intensity/color adjustment signal data Va(n) (n ranges from, e.g., 0 to 255). In the present embodiment, the output control time data ta(n), tb(n), tc(n) and td(n) and the inrush current suppression control time data Tx(n) are constant values as tas, tbs, tcs, tds and Txs, respectively.

(Description on Operations of Controller IC2)

Hereinafter, control operations performed by the controller IC2 in accordance with the embodiment based on the table T6 when the intensity/color adjustment signal data Va(n) is input will be described with reference to FIGS. 24A to 26.

Figure 24A:
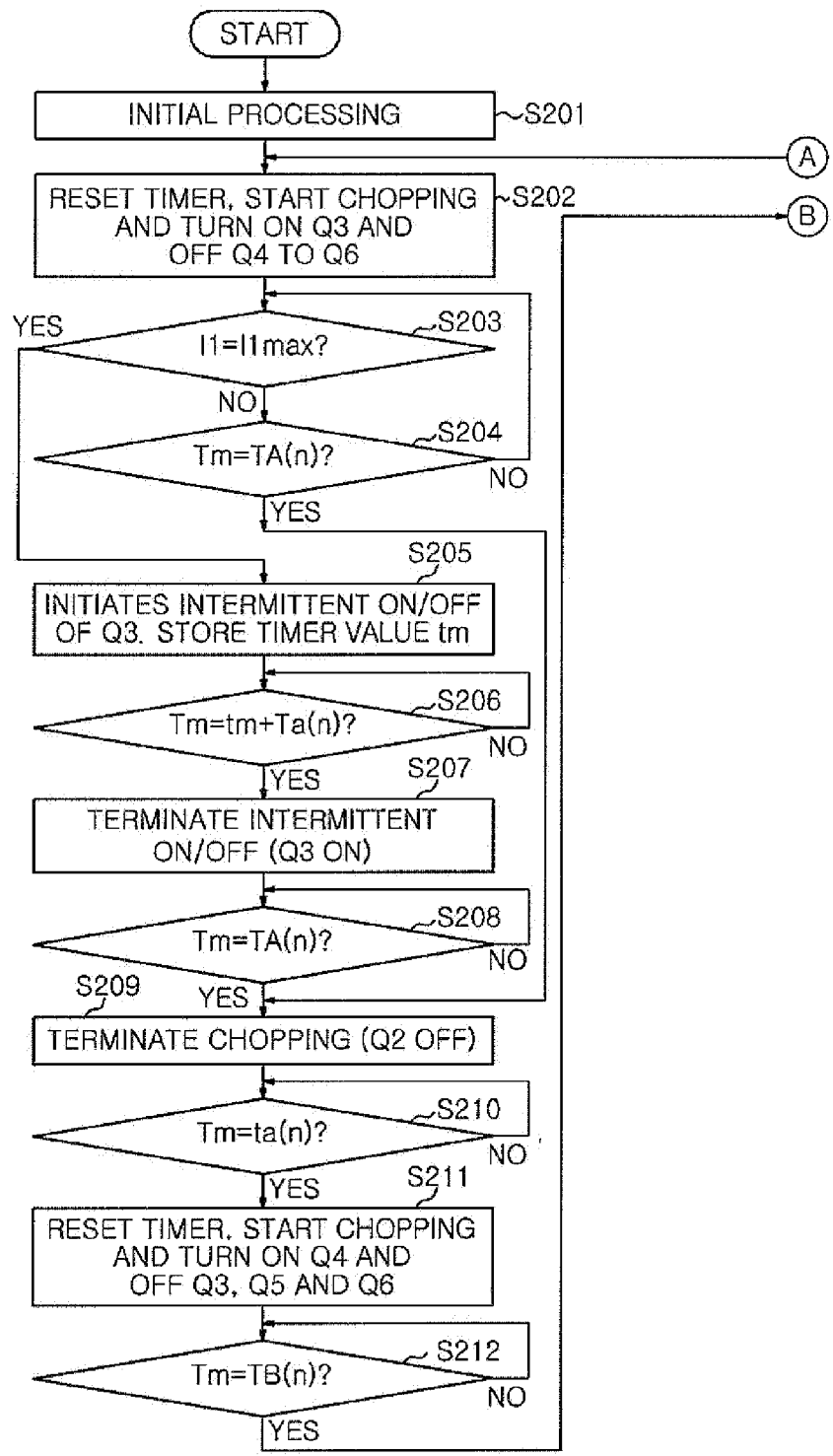
FIGS. 24A and 24B show a flowchart for illustrating operations by a controller shown in FIG. 23.
Figure 24B:
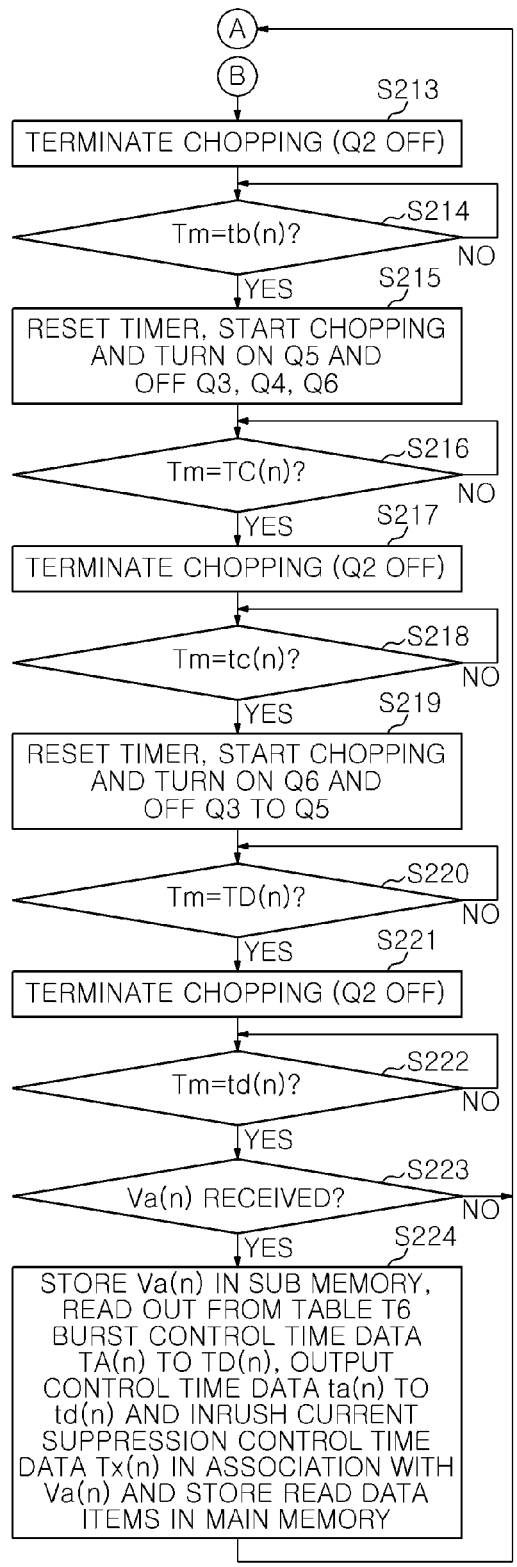
Figure 25:
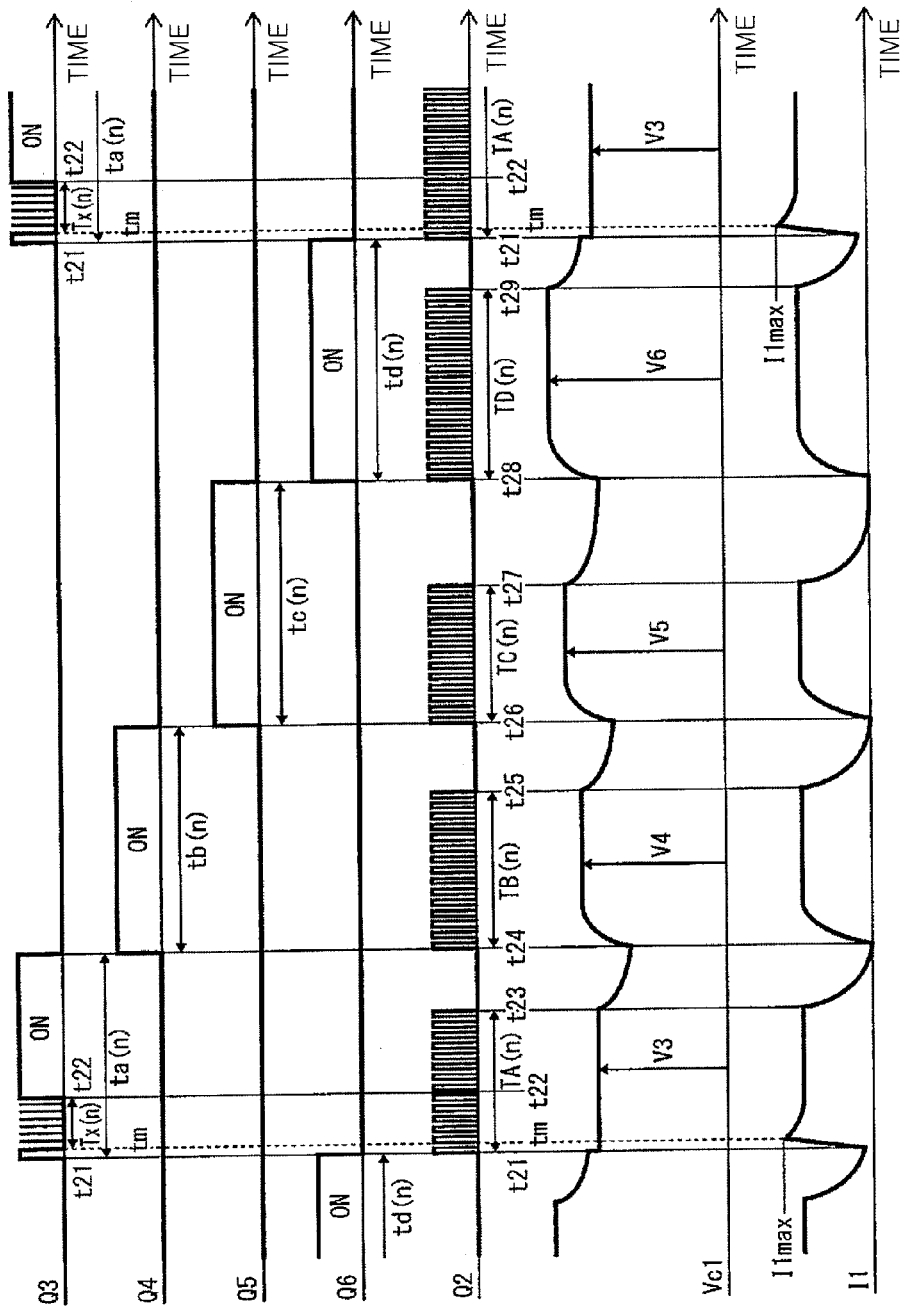
FIG. 25 is a timing chart for illustrating operations of the lighting device and the illumination apparatus in accordance with the fourth embodiment.
Figure 26:
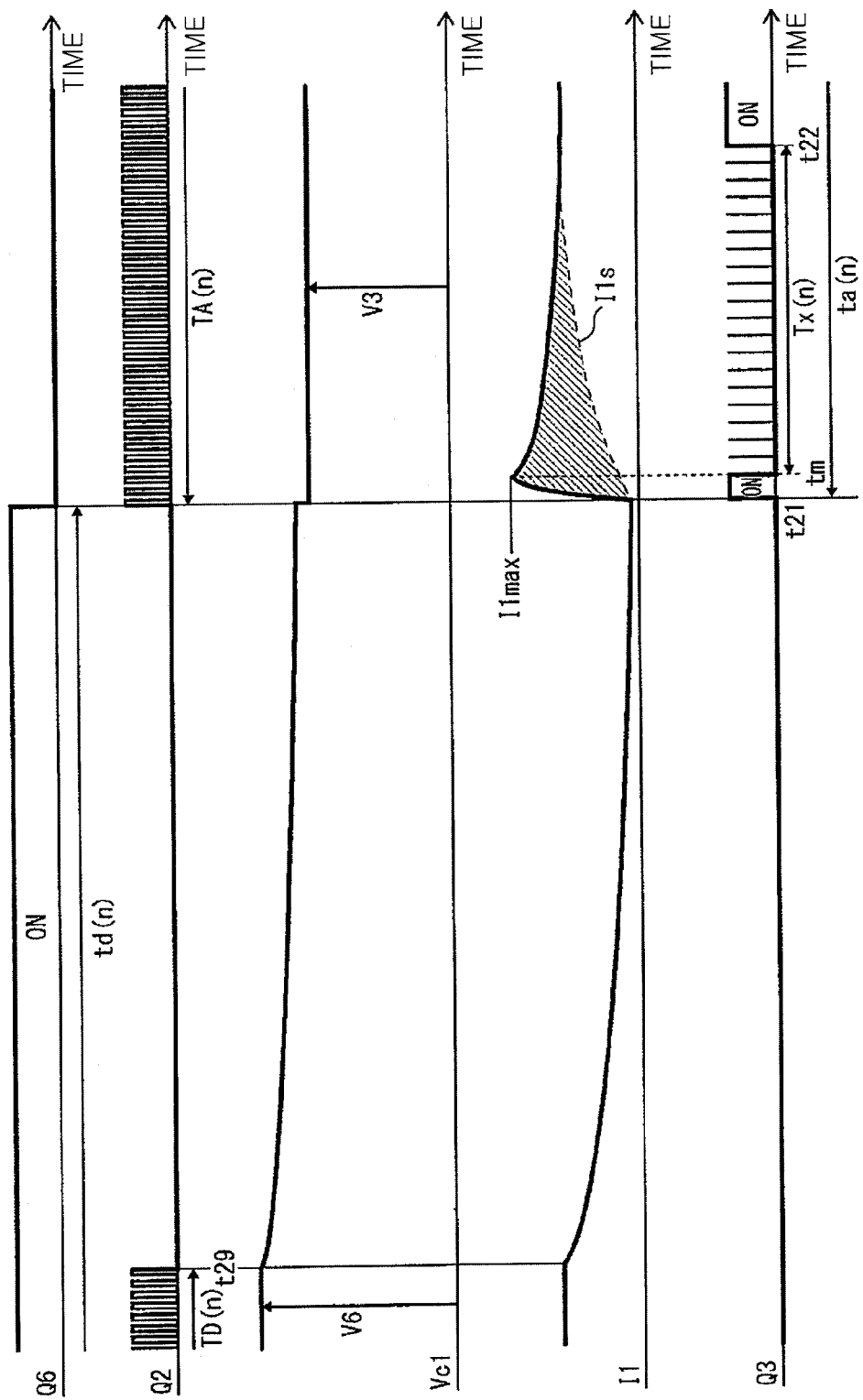
FIG. 26 is an enlarged view of an essential part of the timing chart shown in FIG. 25.

FIGS. 24A and 24B show a flowchart illustrating the control operations by the controller IC2. FIG. 25 is a timing chart for illustrating the control operations in the lighting device 502 and the illumination apparatus 500 in accordance with the fourth embodiment. Specifically, in the timing chart, gate voltages of the light source switches Q3 to Q6, a gate voltage of a switching element Q2, a voltage Vc1 at the output terminals of a power unit 10, and an output current I1 output from the power unit 10 are presented. FIG. 26 is an enlarged view of an essential part of the timing chart shown in FIG. 25 where the inrush current suppression control is conducted.

When a power is supplied to the illumination apparatus 500 and the lighting device 502, the flow illustrated in FIGS. 24A and 24B is started, so that the initial processing is carried out at step S201. The initial processing in accordance with the present embodiment is as follows. At first, the controller IC2 reads intensity/color adjustment signal data Va(n) stored in the sub memory SM. Further, the controller IC2 reads from the table T6 the burst control time data TA(n), TB(n), TC(n) and TD(n), the output control time data ta(n), tb(n), tc(n) and td(n), and the inrush current suppression control time data Tx(n) in association with the read intensity/color adjustment signal data Va(n) and stores these data items in the main memory MM. These operations are the initial processing of the flowchart in accordance with the fourth embodiment.

As the first embodiment, the intensity/color adjustment signal data Va(n) first read from the sub memory SM after the power supply is the intensity/color adjustment signal data stored last in the sub memory SM in the previous use. In other words, it is data that indicates the number of a combination which is the intensity/color adjustment setting selected last by a user in the previous use.

Then, the controller IC2 resets the timer TM to start it and instructs the burst control circuit 14 to start a chopping operation. In addition, the controller IC2 turns on the light source switch Q3 and turns off the light source switches Q4, Q5 and Q6 at step S202 and time t21 in FIG. 25.

Next, it is determined whether or not the output current I1 has reached an allowable current value I1max at step S203. Herein, the allowable current value I1max is the upper limit of an allowable inrush current range in which the light sources 3 to 6 and the light source switch Q3 to Q6 can ensure with respect to stress or damage. The allowable current value I1max is not necessarily the upper limit of the allowable inrush current range but may be a value lower than the upper limit to leave a little margin.

The output current I1 is detected by the current detection unit 112. Specifically, the controller IC2 receives a voltage across the resistor R5 to calculate the output current I1 based on the received voltage value. Herein, obtaining a value of the output current I1 by the controller IC2 using the current detection unit 112 is simply described as that the output current I1 is detected by the current detection unit 112.

If the detected output current I1 has reached the allowable current value I1max ("Yes" at step S203), the controller IC2 starts the inrush current suppression control to intermittently turn on and off the light source switch Q3 and stores in a memory the value tm of the timer TM at time when the detected output current I1 has reached the allowable current value I1max at step S205 and time tm in FIG. 25.

Subsequently, it is monitored whether or not a Tm which is a value of the timer TM has reached tm+Tx(n) at step S206.

If Tm has reached tm+Tx(n) ("Yes" at step S206), the controller IC2 continuously turns on the light source switch Q3 to thereby complete the inrush current suppression control at step S207 and time t22 in FIG. 25. Accordingly, the inrush current suppression control is conducted during the period Tx(n) (the second inrush current suppression period). In addition, for the period Tx(n), a value is set, the value being sufficiently shorter than the time length obtained by subtracting the period of tm from the period of ta(n), i.e., ta(n)−tm.

Subsequently, it is monitored whether or not the Tm has reached TA(n) at step S208. If Tm has reached TA(n), the controller IC2 instructs the burst control circuit 14 to complete the chopping operation to turn off the switching element Q2 at step S209 and time t23 in FIG. 25. Subsequent steps from S210 to S222 are identical to the steps S5 to S17 illustrated in the flow in FIG. 2 in accordance with the first embodiment and, thus, descriptions thereof will be omitted.

If the output current I1 has not reached the allowable current value I1max at step S203 ("No" at step S203), it is then determined whether or not the Tm has reached TA(n) at step S204.

If Tm has not reached TA(n), the flow returns to step S203 and it is determined whether or not the output current I1 has reached the allowable current value I1max at step S203.

If Tm has reached TA(n) ("Yes" at step S204), the flow proceeds to step S209, and the controller IC2 instructs the burst control circuit 14 to complete the chopping operation to turn off the switching element Q2 at step S209 and time t23 in FIG. 25.

Subsequent steps from S210 to S222 are identical to the steps S5 to S17 illustrated in the flow in FIG. 2 in accordance with the first embodiment and, thus, descriptions thereof will be omitted.

If no new intensity/color adjustment signal data Va(n) is received at step S223 ("No" at step S223), the flow returns to step S202 and the processes from steps S202 to S223 are repeated. When the flow proceeds to step S202 from step S223, the light source switch Q3 is turned on instead of the light source switch Q6.

If new intensity/color adjustment signal data Va(n) is received at step S223 ("Yes" at step S223), the controller IC2 stores the newly received intensity/color adjustment signal data Va(n) in the sub memory SM. Further, the controller IC2 reads from the table T6 the burst control time data TA(n), TB(n), TC(n) and TD(n), the output control time data ta(n), tb(n), tc(n) and td(n), and the inrush current suppression control time data Tx(n) in association with the newly received intensity/color adjustment signal data Va(n). Then, the controller IC2 stores the read data items in the main memory MM at step S224.

Then, the flow returns to step S202, and the processes from steps S202 to S223 are repeated. In addition, by the control at steps S224 and S202, the light source switch Q3 is turned on instead of the light source switch Q6.

Further, in accordance with the present embodiment, the output control time data ta(n), tb(n), tc(n) and td(n) and the inrush current suppression control time data Tx(n) are constant values. Therefore, when new intensity/color adjustment signal data Va(n) is received, at step S224, only the burst control time data TA(n), TB(n), TC(n) and TD(n) may be read from the table T6 and be stored in the main memory MM.

As described above, in accordance with the present embodiment, the controller IC2 continuously turns on the light source switch Q3 until the output current I1 reaches the allowable current value I1max. Then, when the output current I1 reaches the allowable current value I1max, the controller IC2 conducts turning on and off the light source switch Q3 repeatedly and intermittently. This control is the inrush current suppression control in accordance with the present embodiment.

In the inrush current suppression control in accordance with the present embodiment, by continuously turning on the light source switch Q3 until the output current I1 reaches the allowable current value I1max, the following effects can be achieved.

In the timing chart of FIG. 26 in which the output current I1 and the like is presented, I1s indicated by the dashed line shows a change in the output current assumed when the inrush current suppression control of turning on and off the light source switch Q3 repeatedly and intermittently is performed simultaneously with the switchover of the light source switches as in the fourth modification. For the inrush current suppression control in accordance with the present embodiment, increase in the output current I1 after the switchover is faster, and accordingly the sufficient amount of light emitted from the light source can be obtained immediately after the switchover. Specifically, in FIG. 26, the amount of light immediately after the switchover is more than that in the inrush current suppression control in accordance with the fourth modification by the amount corresponding to the area filled with oblique lines. Accordingly, flicker may be less observed. Moreover, since the output current I1 does not exceed beyond the allowable current value I1max, stress or damage to the light sources or the light source switches can be avoided.

(Summary of Fourth Embodiment)

The features of the illumination apparatus 500 and the lighting device 502 in accordance with the fourth embodiment can be summarized as follows.

The illumination apparatus 500 and the lighting device 502 in accordance with the fourth embodiment includes the current detection unit 112 to detect a current flowing the series load circuits 30, 40, 50 and 60. For the inrush current suppression control, the controller IC2 turns on the light source switch Q3 included in the series load circuit 30 to be subjected to the inrush current suppression control, until the current value I1 detected by the current detection unit 112 reaches the allowable current value I1max. If the current value I1 detected by the current detection unit 112 reaches the allowable current value I1max, the controller IC2 intermittently turns on and off the light source switch Q3 during the second inrush current suppression period Tx(n). The second inrush current suppression period Tx(n) is shorter than the time length obtained by subtracting the period tm in which the light source switch Q3 is turned on until the output current I1 reaches the allowable current value I1max from the ON-period ta(n) of the light source switch Q3 included in the series load circuit 30 to be subjected to the inrush current suppression control.

Accordingly, an inrush current can be suppressed while sufficient amount of light is obtained immediately after switchover of the light source switches. Therefore, the light sources or the light source switches can be less stressed or damaged, and lifespans of the lighting device and the illumination apparatus can be prolonged. Further, flickering can be prevented.

(Applications of Illumination Apparatus 100)

Figure 27A:
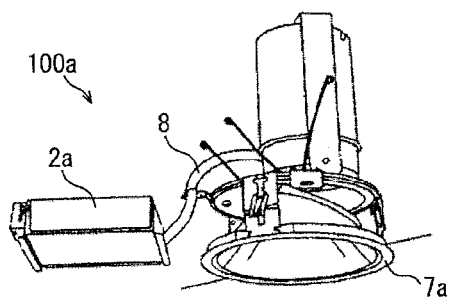
FIGS. 27A to 27C are views of lighting apparatuses 100a to 100c employing the illumination apparatus 100, respectively.
Figure 27B:
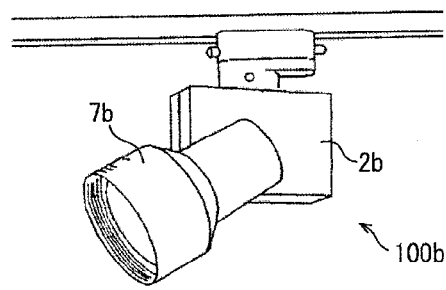
Figure 27C:
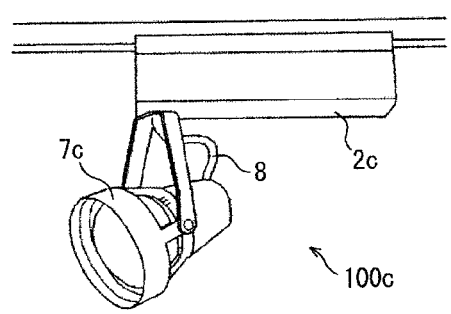

FIGS. 27A to 27C are external views of illumination devices 100a, 100b and 100c employing the illumination apparatus 100 having the above-described configurations. (In FIGS. 27A to 27C, the illumination apparatus 100 in accordance with the first embodiment is employed as a representative example. However, any one of the illumination apparatuses in accordance with the embodiments and modifications may be employed.) The lighting devices 2a to 2c of the illumination devices 100a to 100c respectively shown in FIGS. 27A to 27C are formed by housing the circuit of the lighting device 2 in FIG. 1 in a case made of metal, resin or the like. They are basically identical except for the differences in appearance. FIG. 27A shows an example in which the illumination device 100a is applied for a downlight. The illumination device 100a includes the lighting device 2 and a lamp body 7a, which are connected to each other by a wiring 8. In addition, a light source unit 1 is installed in the lamp body 7a.

FIGS. 27B and 27C show examples in which the illumination devices 100b and 100c are applied for spotlights.

The illumination device 100b also includes a lighting device 2b and a lamp body 7b which are connected to each other by a wiring (not shown). In addition, a light source unit 1 is installed in the lamp body 7b.

The illumination device 100c also includes a lighting device 2c and a lamp body 7c which are connected to each other by a wiring 8. In addition, a light source unit 1 is installed in the lamp body 7c.

Each of the lamp bodies 7a to 7c respectively shown in FIGS. 27A to 27C includes a light source unit 1, a base to which the light source unit 1 is installed, a reflection member that reflects a light emitted from the light source unit 1 in a desired direction, a cover to protect the light source unit from the outside and the like.

In FIGS. 27A to 27C, the light source unit 1 and the base are not shown since they are covered by the reflection member and the cover. The wiring 8 shown in each of FIGS. 27A and 27C establishes electric connection between the light source unit 1 and each of the lighting devices 2a to 2c. In FIG. 27B, the wiring 8 is not visible because it is located inside (the case of) the lighting device 2b and the lamp body 7b.

In addition to the above-mentioned applications, the illumination apparatus 100 can be applied for products such as a ceiling light of which color is adjusted to be within a range from soft white to daylight along the black body locus or to be along the CIE daylight locus.

As such, by applying the illumination apparatus 100 to various types of illumination devices, the devices can be smaller and can be protected from overcurrent or the like, so that the lifespan of the apparatuses can be prolonged.

<Other Modification Examples>

The present invention has been described with reference to the embodiments and the modifications described above. However, the present invention is not limited there to but may have variants to be described below.

1. In accordance with the above embodiments and the like, when the light source switches are switched, the chopping operation of the switching element Q2 is stopped before every switchover. However, the present invention is not limited thereto. When a voltage drop of LED group connected to a light source switch after the switchover is greater than a voltage drop of LED group connected to a light source switch before the switchover, no inrush current occurs and, therefore, the chopping operation may not be stopped before the switchover.

The above configurations can be applied for either an illumination apparatus including a light source unit or a lighting device without a light source unit, and the same effects can be achieved in either application.

To summarize, in the lighting device and the illumination apparatus of the present modification example, the controller IC2 performs the following control. Namely, in the repeated order of turning on and off the light source switches, the chopping operation is not stopped before switching over the light source switch connected to the LED group of a relatively small voltage drop to the light source switch connected to the LED group of a relatively great voltage drop.

With this, one cycle in the repeated order in which light source switches are sequentially switched is short, so that flickering can less occur.

2. In the above modification example, it has been described that when a voltage drop of LED group connected to the light source switch turned on after switchover of the light source switches is greater than a voltage drop of LED group connected to the light source switch turned on before the switchover, no inrush current occurs and, therefore, the chopping operation may not be stopped before the switchover. However, if a current flows at the time of switchover of the light source switches, the LEDs or the light source switches can be stressed. Accordingly, it is also preferable to stop chopping operation before the switchover even when the voltage drop after switchover is greater than that before the switchover.

However, in this case, it is not necessary to stop the chopping operation until the output voltage becomes lower than the voltage drop across an LED group connected to the light source switch to be turned on next. Accordingly, the stop period when a voltage drop after switchover of the light source switches is greater than a voltage drop before the switchover may be shorter than that when a voltage drop after switchover of light source switches is smaller than a voltage drop before the switchover.

The above configuration can be applied for either an illumination apparatus including a light source unit or a lighting device without a light source unit, and the same effects can be achieved in either application. That is, if a stop period of chopping operation when a voltage drop after switchover of light source switches greater than a voltage drop before the switchover is referred to as a second period, it can be described in other words as follows.

In a lighting device and an illumination apparatus of the present modification example, the controller IC2 stops a chopping operation during the second period which is shorter than the first period. In the repeated order of switchover of the light source switches, the controller IC2 performs the control before switching over from a light source switch connected to an LED group of a relatively small voltage drop to a light source switch connected to an LED group of a relatively great voltage drop. Then, the controller IC2 resumes the chopping operation of the switching element Q2 simultaneously with the switching over.

In addition, the illumination apparatus in accordance with the present modification includes at least three LED groups (light sources), e.g., the LED groups 3 to 6 having different voltage drops for the same current flow and a lighting device having the above features.

Accordingly, the one cycle becomes shorter in the repeated order of switchover of the light source switches, so that flickering can be reduced.

3. In the illumination apparatus and the lighting device in accordance with the above embodiments and the like, when a component of DC power source circuit has a failure or the circuit operates abnormally, a control circuit may further perform a specific operation. For example, in order to cope with a case in which an abnormal heat is generated at a switching element in a DC power source circuit, a sensor to detect a heat is disposed in the control circuit. If it is detected that an abnormal heat is generated at the switching element in the DC power source circuit, the control circuit disconnects all of the light sources from the DC power source circuit. With this, breakdown of the light sources due to an excessive current output can be prevented.

4. In the illumination apparatus and the lighting device in accordance with the above embodiments and the like, a chopping operation is executed at the switching element Q2. However, the present invention is not limited thereto. The switching element Q2 may not perform a chopping operation. For example of the illumination apparatus 100 and the lighting device 2 in accordance with the first embodiment, during each period of the burst control time data TA(n), TB(n), TC(n) and TD(n), the switching element Q2 may not perform a chopping operation but remain in an on-state continuously.

The same effects can be achieved as the above embodiments and the like even with the configuration of the present modification example.

5. Further, e.g., in the sixth to ninth modifications, the switching element Q2 may not be turned off before switchover of the light source switches but remain in an on-state. In this instance, since a current flows at the time of the on-off states of the light source switches, the light source switches or the LEDs may be somewhat stressed. However, in the sixth to ninth modifications, a case in which a light source switch connected to a LED group of the smallest voltage drop is turned on next to a light source switch connected to a LED group of the greatest voltage drop does not exist, so that an excessive inrush current is suppressed. As a result, stress or damage to the light source switches or the LEDs due to an excessive inrush current can be prevented.

6. Light Source

In the above embodiments, four LED groups emitting lights of different colors are used as the light sources. However, the present invention is not limited thereto. The colors of lights emitted from the light sources may be three or two colors, or even five or more colors. If there are at least three the light sources, it is possible to dispose a light source of a median voltage drop between one of the greatest voltage drop and one of the smallest voltage drop, so that an inrush current can be suppressed. (At least three light sources are preferable for the sixth to ninth modifications.)

Further, if there are at least three the light sources, the color of combined light from LEDs can be adjusted in a curve shape on a chromaticity diagram. If it is possible to adjust colors in a curve shape on the chromaticity diagram, e.g., the illumination apparatus may be applied for products of which colors of emitted light are adjusted to be within a range from soft white to daylight along the black body locus or to be along the CIE daylight locus. As a semiconductor light emitting element used for the light sources, an organic EL (Electro Luminescence) element, a laser diode or the like can be used, other than a LED.

In addition, in accordance with the above embodiments, light sources emit different colors. However, some of them may emit lights of the same color.

In the above embodiments, LEDs emit lights of R (red), G (green), B (blue) and W (white) colors. However, an LED group emitting a light of another color (e.g., yellow), or an LED group emitting an ultraviolet light may be used. For example, LEDs emitting white lights of different color temperatures may be used.

7. DC Power Source Circuit

In the above embodiments, a step-up chopper circuit is used as the smoothing circuit. However, a smoothing capacitor alone may be used, for example. Additionally, although a step-down chopper circuit is used as the output control circuit, other DC-to-DC converters such as a flyback circuit may be used.

8. Light Source Switches

In the above embodiments and the like, MOSFETs are used as the light source switches. However, a switching element such as a bipolar transistor or the like may be used.

9. Control Circuit

In the above embodiments, time periods for which the LED groups 3 to 6 emit lights, or the output control current data IA(n) are stored in the table by the control unit 20. However, the present invention is not limited thereto. For example, the present invention may be practiced equally in a such manner that the burst control time data TA(n), TB(n), TC(n) and TD(n) and the output control time data ta(n), tb(n), tc(n) and td(n), and the output control current data IA(n) may be included in the intensity/color adjustment signal and then the control unit 20 receives it.

Moreover, a signal to adjust the intensity of a light and a signal to adjust the color of the light may be separately input to the control unit 20, and the control unit 20 may perform the same control based thereon.

The above-described embodiments and modifications are merely preferable examples. The numerical values, shapes, materials, elements, arrangement of elements, connection manner, processes, and orders of processes are merely illustrative but is not limiting. Additionally, among the elements described in the embodiments, those not recited in the broadest independent claims are mean to be selective elements for preferable aspects.

For the sake of better understanding of the present invention, the elements of the drawings provided for the embodiments are not necessarily to scale. The drawings are schematic views but not precisely depicted. The scope of the present invention is not limited by the descriptions on the embodiments but may be modified appropriately without departing from the scope of the present invention. For example, an illumination apparatus can be implemented by combining partial configurations of the illumination apparatus in accordance with the first to fourth embodiments and the configurations in accordance with the modifications.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device for lighting a light source unit including light sources which emit lights of different colors, each of the light sources being a semiconductor light emitting element, the lighting device comprising:
   a DC power source circuit;
   an output control circuit including a chopping switch disposed on a power line extending from the DC power source circuit to the light source unit and configured to adjust an output current by a chopping operation of repeatedly turning on and off the chopping switch;
   a plurality of light source switches respectively connected in series to the light sources to form series load circuits; and
   a control unit configured to control a time period for which a current flows in each of the light sources,
   wherein each of the series load circuits is connected in parallel to output terminals of the output control circuit,
   wherein the control unit is configured to control the output control circuit such that an operation period for which the chopping operation is conducted and a stop period for which the chopping operation is stopped are repeated alternately and to perform switchover of the light source switches to be selectively and sequentially turned on, and
   wherein the switchover is conducted during the stop period with a lapse of time after a beginning of the stop period.

2. The lighting device of claim 1, wherein the control unit is configured to adjust the operation period and time lengths for which the respective light sources emit lights.

3. The lighting device of claim 1, wherein the output control circuit further includes a capacitor that smoothes a ripple current generated by the chopping operation; and
   wherein a time period from the beginning of the stop period until the switchover is set to be greater than a time constant when electric charges in the capacitor are released toward the series load circuits during the stop period.

4. The lighting device of claim 1, further comprising a discharge circuit which is disposed between the output terminals of the output control circuit in parallel to the series load circuits.

5. The lighting device of claim 1, wherein the control unit performs the switchover before completion of the stop period.

6. The lighting device of claim 1, wherein the control unit sets a target current value based on an instruction inputted from an outside, and the output control circuit performs the chopping operation so that the output current is adjusted to the set target current value.

7. An illumination apparatus comprising:
   the light source unit; and
   the lighting device of claim 1.

8. A lighting device for lighting a light source unit including at least three light sources having different voltage drops for a same current flow, the lighting device comprising:
- an output control circuit configured to adjust an output DC power;
- at least three light source switches respectively connected in series to the at least three light sources to form series load circuits; and
- a control unit configured to control a current flowing in each of the at least three light sources,
- wherein each of the series load circuits is connected between output terminals of the output control circuit in parallel;
- wherein the control unit switches over the at least three source switches in a repeated predetermined order such that ON-periods of the at least three light source switches do not overlap with each other; and
- wherein, in the repeated predetermined order, among the at least three light sources, any light source switch other than a light source switch connected to a light source having a smallest voltage drop is turned on next to a light source switch connected to a light source having a greatest voltage drop to suppress an inrush current flowing in the series load circuits.

9. The lighting device of claim 8, wherein, in the repeated predetermined order, among the at least three light sources, the light source switch connected to the light source having the greatest voltage drop is turned on next to the light source switch connected to the light source having the smallest voltage drop.

10. The lighting device of claim 8, wherein the control unit adjusts a length of the ON-period of each of the at least three light source switches.

11. The lighting device of claim 8, further comprising a DC power source circuit,
- wherein the output control circuit includes a chopping switch connected between output terminals of the DC power source circuit; and
- wherein the control unit adjusts an output current from the output control circuit by a chopping operation of turning on and off the chopping switch repeatedly.

12. The lighting device of claim 11, wherein the control unit adjusts an operation period of the chopping operation in the ON-period of each of the at least three light source switches.

13. The lighting device of claim 11, wherein, in the repeated predetermined order, before switchover of the at least three light source switches in which a voltage drop of a light source switch connected to a light source turned on after the switchover is smaller than a voltage drop of a light source switch connected to a light source turned on before the switchover, the control unit turns off the chopping switch to stop the chopping operation during a stop period and resumes the chopping operation simultaneously with the switchover.

14. The lighting device of claim 13, wherein, in the repeated predetermined order, before switchover of the at least three light source switches in which the voltage drop of the light source switch connected to the light source turned on after the switchover is larger than the voltage drop of the light source switch connected to the light source turned on before the switchover, the control unit stops the chopping operation during a period shorter than the stop period and resumes the chopping operation simultaneously with the switchover.

15. The lighting device of claim 13, wherein, in the repeated predetermined order, before switchover of the at least three light source switches in which the voltage drop of the light source switch connected to the light source turned on after the switchover is larger than the voltage drop of the light source switch connected to the light source turned on before the switchover, the control unit does not stop the chopping operation.

16. The lighting device of claim 8, further comprising an impedance element which is connected between the output terminals of the output control circuit in parallel to the series load circuits.

17. The lighting device of claim 8, wherein the at least three light sources emit lights of different colors.

18. An illumination apparatus comprising:
- the light source unit; and
- the lighting device of claim 8.

19. A lighting device for lighting a light source unit including at least three light sources having different voltage drops for a same current flow, the device comprising:
- an output control circuit configured to adjust an output DC power;
- at least three light source switches respectively connected in series to the at least three light sources to form series load circuits; and
- a control unit configured to control a current flowing in each of the at least three light sources,
- wherein each of the series load circuits is connected between output terminals of the output control circuit in parallel,
- wherein the control unit configured to perform switchover of the at least three light source switches in a repeated predetermined order such that ON-periods of the at least three light source switches do not overlap with each other; and
- wherein, in the repeated predetermined order, when switching over the at least three light source switches such that a light source switch connected to a light source having a first voltage drop is turned off and a light source switch connected to a light source having a second voltage drop which is smaller than the first voltage drop is turned on, the control unit performs an inrush current suppression control to a series load circuit including the light source having the second voltage drop
- wherein, in the inrush current suppression control, the control unit intermittently turns on and off the light source switch included in the series load circuit subjected to the inrush current suppression control during an inrush current suppression period shorter than the ON-period of the light source switch.

20. The lighting device of claim 19, further comprising an inrush current suppression circuit which is connected between the output terminals of the output control circuit in parallel to the series load circuits, wherein the inrush current suppression circuit includes:
- an impedance element; and
- a switching element connected in series to the impedance element, and
- wherein the control unit turns on the switching element in the inrush current suppression control.

21. The lighting device of claim 19, further comprising a current detection unit configured to detect a current flowing in each of the series load circuits,
- wherein, in the inrush current suppression control, the control unit turns on the light source switch included in the series load circuit subjected to the inrush current suppression control until a current value detected by the current detection unit reaches an allowable current value and, wherein, when the current value detected by the current detection unit reaches the allowable current value, the control unit intermittently turns on and off the light source switch during the inrush current suppression period which is shorter than a period obtained by subtracting a period for which the current value reaches the allowable current value after turning on the light source switch from the ON-period of the light source switch.

22. The lighting device of claim 19, wherein, in the repeated predetermined order, the at least three light source switches are sequentially turned on in ascending order from a light source switch connected to a light source having a smallest voltage drop to a light source switch connected to the light source having a greatest voltage drop; and wherein the control unit, upon a lapse of the ON-period of the light source switch connected to the light source having the greatest voltage drop, returns to turn on again the light source switch connected to the light source having the smallest voltage drop and performs the inrush current suppression control.

23. The lighting device of claim 19, wherein the control unit adjusts a length of the ON-period of each of the at least three light source switches.

24. The lighting device of claim 19, further comprising: a DC power source circuit, wherein the output control circuit includes a chopping switch connected between output terminals of the DC power source circuit; and wherein the control unit adjusts an output current from the output control circuit by a chopping operation of turning on and off the chopping switch repeatedly.

25. The lighting device of claim 24, wherein the control unit adjusts an operation period of the chopping operation in the ON-period of each of the at least three light source switches.

26. The lighting device of claim 24, wherein, in the repeated predetermined order, before switchover of the at least three light source switches in which the light source switch connected to the light source having the first voltage drop is turned off and the light source switch connected to the light source having the second voltage drop is turned on, the control unit turns off the chopping switch to stop the chopping operation during a stop period and resumes the chopping operation simultaneously with the switchover.

27. The lighting device of claim 26, wherein, in the repeated predetermined order, before switchover of the at least three light source switches in which the light source switch connected to the light source having the second voltage drop is turned off and the light source switch connected to the light source having the first voltage drop is turned on, the control unit stops the chopping operation during a period shorter than the stop period and resumes the chopping operation of the chopping switch simultaneously with the switchover.

28. The lighting device of claim 26, wherein, in the repeated predetermined order, before switchover of the at least three light source switches in which the light source switch connected to the light source having the second voltage drop is turned off and the light source switch connected to the light source having the first voltage drop is turned on, the control unit does not stop the chopping operation.

29. The lighting device of claim 19, wherein the at least three light sources emit lights of different colors.

30. An illumination apparatus comprising:
the light source unit; and
the lighting device of claim 19.

31. The lighting device of claim 1, wherein the light sources include at least three light sources having different voltage drops for a same current flow;

wherein the light source switches include at least three light source switches respectively connected to the at least three light sources; and wherein the control unit performs the switchover of the at least three light source switches in a repeated predetermined order, wherein the repeated predetermined order is set such that, among the at least three light sources, any light source switch other than a light source switch connected to a light source having a smallest voltage drop is turned on next to a light source switch connected to a light source having a greatest voltage drop.

32. The lighting device of claim 1, wherein the light sources include at least three light sources having different voltage drops for a same current flow;

wherein the light source switches include at least three light source switches respectively connected to the at least three light sources;

wherein the control unit performs the switchover of the at least three the light source switches in a repeated predetermined order; and wherein, when switching over the at least three light source switches such that a light source switch connected to a light source having a first voltage drop is turned off and a light source switch connected to a light source having a second voltage drop which is smaller than the first voltage drop is turned on in the repeated predetermined order, the control unit performs an inrush current suppression control to a series load circuit including the light source having the second voltage drop.

* * * * *